US011721085B2

(12) United States Patent
Yang

(10) Patent No.: US 11,721,085 B2
(45) Date of Patent: Aug. 8, 2023

(54) GENERATING AND EVALUATING MAPPINGS BETWEEN SPATIAL POINT SETS IN MULTI-LEVELS

(71) Applicant: Tianzhi Yang, Westbury, NY (US)

(72) Inventor: Tianzhi Yang, Westbury, NY (US)

( * ) Notice: Subject to any disclaimer, the term of this patent is extended or adjusted under 35 U.S.C. 154(b) by 474 days.

(21) Appl. No.: 17/128,135

(22) Filed: Dec. 20, 2020

(65) Prior Publication Data

US 2022/0207758 A1    Jun. 30, 2022

(51) Int. Cl.
| | |
|---|---|
| *G06V 10/75* | (2022.01) |
| *G06T 7/33* | (2017.01) |
| *G06T 7/73* | (2017.01) |
| *G06T 1/20* | (2006.01) |
| *G06T 3/00* | (2006.01) |
| *G06F 18/22* | (2023.01) |

(52) U.S. Cl.
CPC ............ *G06V 10/757* (2022.01); *G06F 18/22* (2023.01); *G06T 1/20* (2013.01); *G06T 3/0006* (2013.01); *G06T 7/337* (2017.01); *G06T 7/74* (2017.01)

(58) Field of Classification Search
None
See application file for complete search history.

(56) References Cited

U.S. PATENT DOCUMENTS

| | | | |
|---|---|---|---|
| 6,272,245 | B1 | 8/2001 | Lin |
| 6,640,201 | B1 | 10/2003 | Hahlweg |
| 6,823,286 | B2 * | 11/2004 | Yuste .................... G06F 18/295 |
| | | | 702/179 |
| 7,010,158 | B2 | 3/2006 | Cahill et al. |

(Continued)

OTHER PUBLICATIONS

Yang et al. An Affine Energy Model for Image Registration Using Markov Chain Monte Carlo. Technical Report.

(Continued)

*Primary Examiner* — Anand P Bhatnagar

(57) ABSTRACT

A method for generating and evaluating N-to-1 mappings between spatial point sets in nD, n=2 or 3, implemented on a computing device comprising a programmable general purpose processor and a programmable data-parallel coprocessor and a memory coupled with them. Embodiments of the method comprises using the computing device to carry out steps comprising receiving a first and a second spatial point sets in 2D or 3D, the first spatial point set comprising a first non-empty non-isolated portion of non-isolated points and a second constrained portion of constrained points, receiving an extended array of fixed correspondents comprising a first not-yet-fixed portion for the non-isolated portion of the first spatial point set and a second fixed portion for the constrained portion of the first spatial point set, a CCISS or padded CCISS between the first non-empty non-isolated portion and the second spatial point set, dividing the first non-empty non-isolated portion into a number of sub-portions, and dividing the first not-yet-fixed portion of the extended array of fixed correspondents and the CCISS or the padded CCISS accordingly, iteratively generating optimal N-to-1 mappings between the members of the sub-portions of the first non-empty on-isolated portion and updating the respective sub-portions of the extended array of fixed correspondents one sub-portion at each iteration.

20 Claims, 21 Drawing Sheets

(56) References Cited

U.S. PATENT DOCUMENTS

| | | | |
|---|---|---|---|
| 7,373,275 B2 | 5/2008 | Kraft | |
| 8,144,947 B2 | 3/2012 | Kletter et al. | |
| 8,233,722 B2 | 7/2012 | Kletter et al. | |
| 8,571,351 B2* | 10/2013 | Yang | G06V 10/757 382/294 |
| 8,811,772 B2* | 8/2014 | Yang | G06V 10/757 382/302 |
| 9,020,274 B2* | 4/2015 | Xiong | G06T 7/344 382/201 |
| 11,164,325 B2* | 11/2021 | Yang | G06T 7/33 |
| 2004/0015310 A1* | 1/2004 | Yuste | G06T 7/0012 702/80 |
| 2012/0275722 A1* | 11/2012 | Yang | G06V 10/757 382/294 |
| 2012/0314974 A1* | 12/2012 | Yang | G06T 7/33 382/294 |
| 2020/0327683 A1* | 10/2020 | Yang | G06T 3/0006 |
| 2022/0172395 A1* | 6/2022 | Yang | G06T 7/74 |
| 2022/0207758 A1* | 6/2022 | Yang | G06T 3/0006 |

OTHER PUBLICATIONS

Timothy R. Linden. A Triangulation-Based Approach to Nonrigid Image Registration. Masters Thesis (Wright State University). 2011.
Seetharaman et al. A piecewise affine model for image registration in nonrigid motion analysis. Proc 2000 IEEE Int Conf Image Processing.
Ourselin et al. Reconstructing a 3D structure from serial histological sections. Image and Vision Computing 19(1-2): 25-31.
Mixed Radix. In Wikipedia. Retrieved Dec. 30, 2019, from https://en.wikipedia.org/wiki/Mixed_radix.
Kim et al. "Multiple Hypothesis Tracking Revisited." 2015 IEEE International Conference on Computer Vision (ICCV) (2015): 4696-4704.
David G. Lowe. Distinctive Image Features from Scale-Invariant Keypoints. Int. J. Comput. Vision 60, Nov. 2, 2004, 91-110.
Multiple Object Tracking. Matlab Online Documentation. Retrieved from mathworks.com on May 8, 2019.
D. Huber. Automatic 3D Modeling Using Range Images Obtained from Unknown Viewpoints. 3DIM 2001, pp. 153-160. May 2001.
Andrew E. Johnson. "Spin-Images: A Representation for 3-D Surface Matching." (1997). PhD thesis. Carnegie Mellon University.
Direct linear transformation. In Wikipedia. Retrieved Apr. 23, 2019, from https://en.wikipedia.org/wiki/Direct_linear_transformation.
AoS and SoA. In Wikipedia. Retrieved Nov. 23, 2020, from https://en.wikipedia.org/wiki/AoS_and_SoA.
Batista et al. Parallel Geometric Algorithms for Multi-Core Computers. Computational Geometry. 43. 663-677. 2010.
Rong et al. Computing two-dimensional Delaunay triangulation using graphics hardware. I3D 2008, pp. 89-97.
Nanjappa. Delaunay triangulation in R3 on the GPU. PhD Thesis. 2012.
Alcantara et al. Building an Efficient Hash Table on the GPU. GPU Computing Gems Jade Edition. pp. 39-53. ISBN 9780123859631.
Kirsch et al. More Robust Hashing: Cuckoo Hashing with a Stash. Algorithms—ESA 2008. Lecture Notes in Computer Science, vol. 5193.
Overview of CUDPP hash tables. Online Documentation. Retrieved Dec. 20, 2019, from cudpp.github.io/cudpp/2.0/hash_overview.html.
Kreveld et al. Efficient Settlement Selection For Interactive Display. 1997. Retrieved Dec. 8, 2020.
Buchin et al. Vertex Deletion for 3D Delaunay Triangulations. Retrieved Dec. 14, 2020.
Devillers. On Deletion in Delaunay Triangulations. Int. J. Comput Geom. Appl., World Scientific Publishing, 2002, 12, pp. 193-205.
Devillers. Vertex Removal in Two Dimensional Delaunay Triangulation: Speed-up by Low Degrees Optimization.Comput. Geom. 2011,44, 169-177.

\* cited by examiner

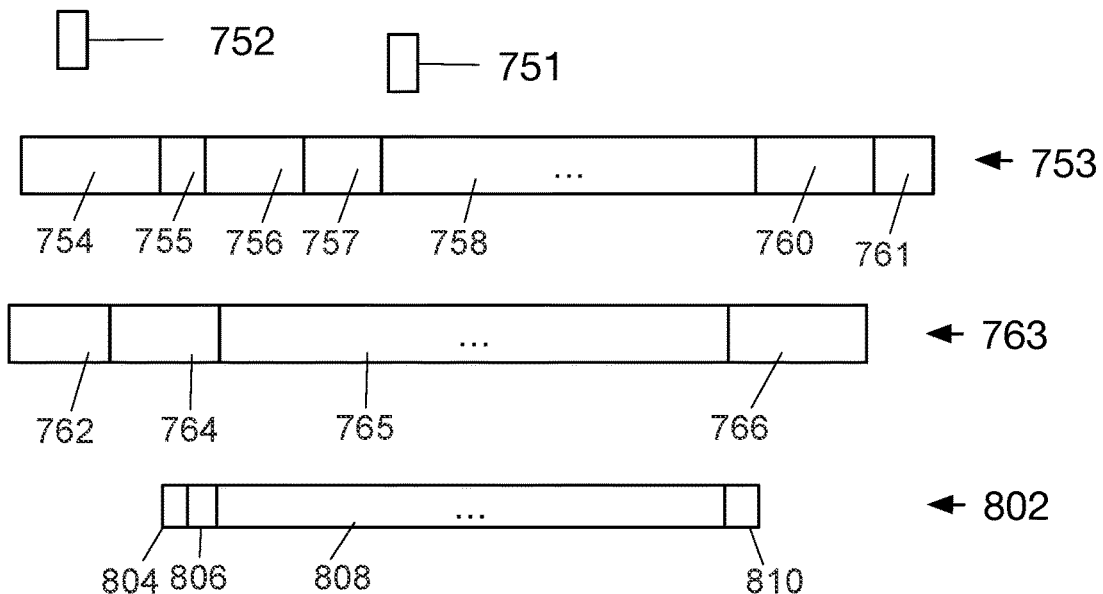

FIG. 15a

ALLOCATE AND FILL ARRAY OF PRODUCTS AND FILL ARRAY OF BASES DEPENDING ON WHETHER THE MEMBERS ARE CONSTRAINED OR NOT 770

COMPUTE AND STORE PADDED LENGTH, AND OPTIONALLY COMPUTE AND STORE LENGTH OF THE ARRAY AT THE SECOND LEVEL 772

ALLOCATE AN ARRAY AT THE SECOND LEVEL IN DEVICE MEMORY 774

FILL THE ARRAY AT THE SECOND LEVEL IN DEVICE MEMORY INCLUDING CALLING SUBPROCESS 1050 USING THE SIMD CORES 776

FIG. 15b

GENERATING AND EVALUATING MAPPINGS BETWEEN SPATIAL POINT SETS IN MULTI-LEVELS

CROSS-REFERENCE TO RELATED APPLICATIONS

This application is a CIP of U.S. application Ser. No. 17/107,348 filed on Nov. 30, 2020 by the present inventor.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND—PRIOR ART

The following is a tabulation of some prior art that presently appears relevant:

U.S. patents

| Pat. No. | Kind Code | Issue Date | Patentee |
| --- | --- | --- | --- |
| 6,272,245 | B1 | Aug. 7, 2001 | Lin |
| 6,640,201 | B1 | Oct. 28, 2003 | Hahlweg |
| 7,010,158 | B2 | Mar. 7, 2006 | Cahill et al. |
| 7,373,275 | B2 | May 13, 2008 | Kraft |
| 8,233,722 | B2 | Jul. 31, 2012 | Kletter et al. |
| 8,144,947 | B2 | Mar. 27, 2012 | Kletter et al. |
| 8,571,351 | B2 | Oct. 19, 2013 | Yang |
| 8,811,772 | B2 | Aug. 19, 2014 | Yang |
| 9,020,274 | B2 | Apr. 28, 2015 | Xiong et al. |

Nonpatent Literature Documents

Yang, Tianzhi and Keyes, David E. (2008). An Affine Energy Model for Image Registration Using Markov Chain Monte Carlo. Submitted to SIAM Journal of Imaging Sciences in July 2008, in March 2009 we were told that it was rejected, in the mean while it has been placed on the first author's web page (http://www.columbia.edu/~ty2109) for a while, then removed.

Linden, Timothy R. (2011). A Triangulation-Based Approach to Nonrigid Image Registration. Masters Thesis (Wright State University). [online] [retrieved on Jan. 31, 2012] Retrievable from http://rave.ohiolink.edu/etdc/view?acc-num-wright1310502150.

Seetharaman, G., G. Gasperas, et al. (2000). A piecewise affine model for image registration in nonrigid motion analysis. Proceedings 2000 International Conference on Image Processing. (Cat. No. 00CH37101)

Ourselin, S., A. Roche, et al. (2001). Reconstructing a 3D structure from serial histological sections. Image and Vision Computing 19(1-2): 25-31.

Kim, Chanho & Li, Fuxin & Ciptadi, Arridhana & Rehg, James. (2015). Multiple Hypothesis Tracking Revisited. 2015 IEEE International Conference on Computer Vision (ICCV) (2015): 4696-4704.

Lowe, D. G. Distinctive Image Features from Scale-Invariant Keypoints. Int. J. Comput. Vision 60, 2 (November 2004), 91-110.

Multiple Object Tracking. Matlab Online Documentation. Retrieved May 8, 2019, from https://www.mathworks.com/help/vision/ug/multiple-object-tracking.html.

D. F. Huber. Automatic 3D modeling using range images obtained from unknown viewpoints. Proceedings Third International Conference on 3-D Digital Imaging and Modeling, Quebec City, Quebec, Canada, 2001, pp. 153-160.

Johnson, Andrew Edie. "Spin-Images: A Representation for 3-D Surface Matching." (1997). PhD thesis, Robotics Institute, Carnegie Mellon University. [online] [retrieved on May 29, 2019] Retrievable from http://www.ri.cmu.edu/pub_files/pub2/johnson_andrew_1997_3/johnson_andrew_1997_3.pdf.

Direct linear transformation. In Wikipedia. Retrieved Apr. 23, 2019, from https://en.wikipedia.org/wiki/Directlinear_transformation.

AoS and SoA. In Wikipedia. Retrieved Nov. 23, 2020, from https://en.wikipedia.org/wiki/AoS_and_SoA.

Batista, Vicente Helano F. & Millman, David & Pion, Sylvain & Singler, Johannes. (2010). Parallel Geometric Algorithms for Multi-Core Computers. Computational Geometry. 43. 663-677.

Rong, Guodong & Tan, Tiow-Seng & Cao, Thanh-Tung & Stephanus. (2008). Computing two-dimensional Delaunay triangulation using graphics hardware. Proceedings of the Symposium on Interactive 3D Graphics and Games, I3D 2008. 89-97.

Nanjappa, Ashwin. (2012). Delaunay triangulation in R3 on the GPU. PhD Thesis. Retrieved Dec. 29, 2019, from https://www.comp.nus.edu.sg/~tants/gdel3d_files/AshwinNanjappaThesis.pdf.

Dan A. Alcantara, Vasily Volkov, Shubhabrata Sengupta, Michael Mitzenmacher, John D. Owens, Nina Amenta. (2012). Building an Efficient Hash Table on the GPU. GPU Computing Gems Jade Edition. Pages 39-53. ISBN 9780123859631.

Kirsch A., Mitzenmacher M., Wieder U. (2008) More Robust Hashing: Cuckoo Hashing with a Stash. In: Halperin D., Mehlhorn K. (eds) Algorithms—ESA 2008. ESA 2008. Lecture Notes in Computer Science, vol 5193. Springer, Berlin, Heidelberg.

Overview of CUDPP hash tables. Online Documentation. Retrieved Dec. 20, 2019, from cudpp.github.io/cudpp/2.0/hash_overview.html.

Mixed Radix. In Wikipedia. Retrieved Dec. 30, 2019, from https://en.wikipedia.org/wiki/Mixed-radix.

Kreveld, M. V. and R. V. Oostrum. "EFFICIENT SETTLEMENT SELECTION FOR INTERACTIVE DISPLAY." (1997). Retrieved Dec. 8, 2020, from https://cartogis.org/docs/proceedings/archive/auto-carto-13/pdf/efficient-settlement-selection-for-interactive-display.pdf.

Buchin, Kevin & Devillers, Olivier & Mulzer, Wolfgang & Schrijvers, Okke & Shewchuk, Jonathan. (2013). Vertex Deletion for 3D Delaunay Triangulations. Retrieved Dec. 14, 2020, from https://page.mi.fu-berlin.de/mulzer/pubs/dtDel3DESA.pdf Olivier Devillers. (2011). On Deletion in Delaunay Triangulations. International Journal of Computational Geometry and Applications, World Scientific Publishing, 2002, 12, pp. 193-205.

Olivier Devillers. Vertex Removal in Two Dimensional Delaunay Triangulation: Speed-up by Low Degrees Optimization. Computational Geometry, Elsevier, 2011, 44, pp. 169-177.

In image registration, one wants to align a template image with a reference image. In feature-based image registration methods, a finite set of feature points is selected from each image, then the features points of the template image are mapped to those of the reference image. A feature point typically represents an outstanding feature of an image, e.g. a corner of a shape, local maxima and minima of differences of Gaussians, and a point of maximal curvature. Feature points are usually 2D or 3D spatial points that carry with them feature specific information in addition to their coordinates.

Feature-based image registration methods can be used when deformations are relatively large; on the other hand, non-parametric registration methods, such as the elastic and the fluid registration methods, are used when deformations are small. Because of this, feature-based registration is sometimes carried out as a pre-processing step that precedes non-parametric registration.

The matching of spatial point sets is also an important problem in various computer vision and pattern recognition areas such as motion tracking, localization, shape matching, and industrial inspection. In such applications, digital images are captured using various devices such as medical imaging machines, digital cameras, Radars, Lidars, or any other devices that converts physical signals into images reflecting the spatial distribution of the physical signals. For example the MRI machine that uses a powerful magnetic field to produce greyscale images, and the infrared camera that generates images based on infrared radiations. As another example, being widely used in Robotics and Self-Driving Vehicle applications, RGBD cameras are used to capture color images as well as depth maps. A depth map may contain distance information from the targets to a plane that is parallel to the image plane and passes through the camera center. To generate a depth map, various hardwares and algorithms have been developed. For example, the Intel RealSense D400 camera uses the active stereoscopy technology, where a light projector projects light patterns onto objects and capture the same patterns using two cameras from different perspectives. The depth information is computed using a triangulation based method. In comparison, the StereoLabs ZED uses the passive stereoscopy technology, where it tries to match natural patterns at key points in natural environments using a triangulation based method. The Kinect V2 uses the Time-Of-Flight (TOF) technology, where a receiver receives photons emitted from a light transmitter and then reflected back from subjects' surfaces. The delay is used to compute the depth. The Orbbec Astra S camera employs the structured light technology, where a laser projector projects structured patterns that is triangulated using a camera. As another example, the radar uses an antenna to transmit and receive radio waves. In addition to the depth information, it can measure velocity using the Doppler effect. The radar is suitable for self-driving vehicles when harsh weather conditions prevents the other technologies from fully functioning.

Often a set of measurement points are extracted from some captured images using various interest point or bounding box detectors (e.g. the SIFT, SURF, various corner or blob detectors, various object detection neural networks etc.), and the measurement points are then matched against a given point set. For example, in multi-object tracking (MOT), each moving object can be tracked by a Bayesian Filter. At each time step, a set of filters are used to generate a set of predictions for a set of objects based on their past trajectories and the elapsed times. The predictions can be multivariate statistical distributions with respective means and covariances. Examples of Bayesian Filters are the Kalman Filter, the Extended Kalman Filter, the Unscented Kalman Filter, and the Particle Filter, etc. The predictions are then matched with a set of measurement points such that for each prediction is associated with a best measurement point according to a certain criterion. This step is also called data association. Finally, the coordinates of the best measurements are used to update the respective filters. For a more detailed example please refer to "Multiple Object Tracking" retrieved from Matlab Online Documentation.

In localization, a vehicle can use a Bayesian Filter to estimate its own pose. At each time step the vehicle receives various readings and actuation information, where such readings could include for example previous poses, various odometry readings, GPS readings etc., and such actuations could be given in the form of linear and angular accelerations, and/or forces and torques combined with a dynamic model of the vehicle, etc. Combine these information with elapsed times, the vehicle can predict its current pose, which is typically represented as a statistical distribution. The pose can be used to transform a set of landmarks in a digital map that is downloaded or computed ahead of time from the map's frame to the vehicle's frame. The transformed landmarks are then matched against a set of measured landmarks. The coordinates of the associated best measurements are then used to update the Bayesian Filter. Alternatively measurements can be transformed from the vehicle's frame to the map's frame to match with the landmarks.

As another example, data association can be applied to multi-sensor data fusion. In Localization or MOT, when multiple sensors are present, one often needs to identify measurements generated by the different sensors. This is sometimes not straight forward due to the presence of noises in the measurements.

One simple approach for data association is the Nearest Neighbor Association algorithm, which involves choosing for each landmark the closest measurement that is also a candidate correspondence (for example by satisfying a gating criterion). Referring to FIG. 1, there is shown an example where there is a vehicle 50. Landmarks 54, 58, 64, and 68 are obtained from a digital map stored in memory, and 52, 56, 60, 62, and 66 are obtained from vehicle 50's measurements. Assuming that both of the measurements 56 and 60 are candidate correspondents of landmark 58, the Nearest Neighbor Association algorithm associates measurement 52 with landmark 54, measurement 60 with landmark 58, measurement 62 with landmark 64, and measurement 66 with landmark 68. But if one takes into account the geometry, landmark 58 is more likely to be associated with measurement 56.

Associating two spatial point sets usually involves minimizing an energy function, that is, select from a set of candidate mappings a mapping that minimizes the energy function. Similar problems have received attentions in the computer vision community, and various energy functions has been proposed. For example, the Hausdorff distance has been used to match two point clouds. Another example is the bottleneck distance, which is the maximum distance between any two matched points.

Given an energy function, sometimes an exact optimal mapping can be obtained in the sense that it actually minimizes the energy function among all possible mappings according to a certain criterion, for example being 1-to-1 or N-to-1. For example when the total number of such mappings is small, then one can do an exhaustive search. Efficient optimization methods may be applied when the energy function is linear with linear constraints, or sometimes when the energy function is quadratic. On the other hand, if the total number of such mappings is large and the energy landscape is rough with lots of local minima (or maxima), then these methods may cease to be applicable. In such situations, sometimes heuristics based methods may be applied. Examples include Simulated Annealing (SA), Generic Algorithm (GA), Tabu Search (TS), and the greedy algorithm.

It is understood that heuristics usually are not guaranteed to generate the best solutions for complex problems, hence most of the times the goal is rather approximate solutions that hopefully are close to the best ones. Hybrid methods that combine exact methods and heuristics have been applied in different areas such as the designing of mobile networks and power systems. For example, a greedy simulated annealing algorithm combines greedy local search and SA to improve the convergence speed.

In medical imaging literatures, matching of point sets sometimes precedes finer registration techniques that establishes pixel-level correspondences. The matching of point sets is sometimes carried out by a least square regression or its variations, based on the assumption that there exists a global affine transformation. For example, referring to "A piecewise affine model for image registration in nonrigid motion analysis" by Seetharaman (2000), a global affine transformation is estimated by using a scatter matrix, which measures how the point sets as a whole are distributed in space; local points are then matched by a nearest-neighbor technique. Referring to the Block matching method in "Reconstructing a 3D structure from serial histological sections" by Ourselin et al. (2001), it repeats the regression step multiple times using an iterative scheme. In image alignment literatures, for example referring to "Distinctive Image Features from Scale-Invariant Keypoints" by Lowe (Int. J. Comput. Vision 60(2): 91-110, 2004), candidate point correspondences are first identified by comparing feature vectors, then a least square problem is solved to extract the parameters of an affine-transformation based on the assumption of a global affine transformation. In computer vision literatures, the Iterative Corresponding Point (ICP) algorithm registers two point clouds by iteratively applying the least square technique to the sums of point to point distances to estimate a global affine transformation at each iteration, and at each iteration updating point-to-point correspondences according to the estimated global affine transformation. Such methods sometimes stuck at local minimums.

In U.S. Pat. No. 9,020,274 granted Apr. 28, 2015 by Xiong et al., it uses a control network of super points, the disclosed embodiment is not scale invariant. In U.S. Pat. No. 6,640,201 granted Oct. 28, 2003 by Hahlweg, it discloses a method that uses transformation equations whose parameters measure similarities between point sets. The method is affine-invariant if the transformation equation is carefully chosen. In U.S. Pat. No. 7,373,275 granted May 13, 2008 by Kraft, it computes a force field that perturbs one point set to align with the other.

In U.S. Pat. No. 8,233,722 granted Jul. 31, 2012 by Kletter et al., it describes a method for querying documents using their images. Given an image of a document, a set of 2D key points are generated, where each key point corresponds to the centroid location of a connected component in the image. For each key point, a predetermined number of fingerprints are computed, where each fingerprint consists of a series of persistent ratios capturing the local geometry of the point relative to its predetermined number of nearest-neighbor key points. To make it robust w.r.t. noises, various combinations of the nearest neighbors are considered; to make it rotation invariant, various permutations of the nearest neighbors are also considered. Thus a substantial number of fingerprints are needed for a key point to make it robust. Also I think if one wants to consider the geometric relationships among key points that are far away from each other using this method, one may need to consider in addition neighborhoods of different sizes, and this may further increase the number of fingerprints. To speed up fingerprint matching, fingerprints are stored in a Fan Tree, where each path from the root to a leaf node represents a fingerprint. In U.S. Pat. No. 8,144,947 granted Mar. 27, 2017 by the same authors, the same idea is applied to photograph images where keypoints are extracted using scale space methods.

In U.S. Pat. No. 6,272,245 granted Aug. 7, 2001 by Lin, it extracts significant regions from an input image using two-dimensional window search, and generates feature vectors for the significant regions based on their statistical characteristics. The feature vectors are compared to those stored in a database from a model, and if matches are found then the coordinates of the significant regions are placed in a candidate list. Next it compares the geometric relationships among the significant regions in the candidate list and those among the matches found in the model to validate that they are geometrically consistent. Exemplary geometric relationships include the distance between two significant regions, and the angle made by two significant regions to a common third significant region. Thus in the vocabulary of this document, local statistical features are used to find candidate correspondences, and a geometric consistent criterion is used to select compatible correspondences.

In U.S. Pat. No. 7,010,158 granted Mar. 7, 2006 by Cahill et al., it introduces a method for stitching multiple 3D panoramic scene images into a 3D model of the whole scene. After obtaining a plurality of 3D panoramic images, it converts them to surface meshes and uses Huber's algorithm to compute transformations that align the surface meshes. It then aligns and integrates the surface meshes, and finally integrates the textures and intensities. Referring to "Automatic 3D modeling using range images obtained from unknown viewpoints" by Huber, it in turn refers to the "spin-image" representation introduced in "Spin-Images: A Representation for 3-D Surface Matching" by Johnson. Here for each 3D surface point it generates a spin-image which is a rigid transformation invariant representation of the local geometry in the point's object centered coordinate system called the spin-map coordinates. Between the surface points of two surface meshes, it generates (in my own words, not in the authors' words) candidate correspondences by examining the similarities of the points' spin-images. It further checks the consistency between pairs of candidate correspondences including essentially compares the distances in the spin-map coordinates. Candidate correspondences that are geometrically consistent are grouped together to estimate a transformation that is used to align the two meshes. Thus in the vocabulary of this document, local geometric features are compared to find candidate correspondences, and a geometric consistent criterion is used to filter out incompatible correspondences and to select a group of compatible correspondences.

In Simultaneous Localization And Mapping (SLAM), correspondences between feature points are used to estimate essential matrices or fundamental matrices, which are then used to estimate depths using multiview geometry techniques.

Referring to "An Affine Energy Model for Image Registration Using Markov Chain Monte Carlo" by Yang and Keyes (2008), an affine energy model for matching point sets using SA is presented. There, a smoothness constraint is defined in terms of the Euclidean distance between the elements of the matrices of pairs of affine transformations, where the energy function depends only on the location of the points. SA is used to solve the registration problem by iteratively removing and inserting cross-edges. Its potential in avoiding local minima in the presence of global affine and nonlinear transformations is demonstrated by comparing it with non-parametric registration and affine registration models. Referring to "A Triangulation-Based Approach to Non-rigid Image Registration" by Linden (2011) it also uses the Euclidean distance to compare affine transformations for the purpose of image registration. But since the elements of an affine transformation is a mixture of rotation, scaling, displacement and shearing, they may not have much physical meaning before being properly decomposed into physically meaningful entities.

In my first U.S. Pat. No. 8,571,351 granted Oct. 19, 2013, instead of relying on the Euclidean distance, various spatial agents are constructed and transformed by affine transformations, and distance measures are computed by comparing transformed spatial agents. In my second U.S. Pat. No. 8,811,772 granted Aug. 19, 2014, a distance measure is computed for the difference of the left sub-matrices of two affine transformations, where the two affine transformations have been computed for a pair of mapped agreeable (n+1) combinations. Examples of such distance measures include various matrix norms using the difference's singular values and equivalents.

In my previous U.S. Application Ser. No. 16,428,970 filed on Jun. 1, 2019, it describes embodiments that use Match-Pairs. In my previous U.S. Application Ser. No. 16,442,911 filed on Jun. 17, 2019, it describes embodiments that in addition computes conflict lists and correspondence lists as bit fields, and computing the compatibilities among Match-Pairs involves performing bitwise operations on the bit fields. Note that some terms may have been redefined multiple times in this document and in my existing patent applications and patents, if there are any conflicts then the definitions in this document takes precedence when applied to this document.

Referring to my previous U.S. application Ser. No. 16/783,959 filed on Feb. 6, 2020, it discusses embodiments that use a data-parallel coprocessor to generate an optimal mapping given not only two spatial point sets, but also a set of candidate correspondences that are grouped into separate sets according to their end points in the first spatial point set. However consider a dense environment where there are 100 points in a first point set, and each of the 100 points has 2 correspondents in a second point set. This will correspond to a total of 210 possible N-to-1 mappings. The required resources including for example the amount of device memory and the required number of hardware threads for generating the relevant data structures would far exceed the capabilities of today's most advanced commercial grade GPUs.

Referring to my previous U.S. application Ser. No. 17/107,348 filed on Nov. 30, 2020, given a frame, an embodiment treats some constraints (a constraint is defined as a candidate correspondence such that its end point in the first spatial point set has no other candidate correspondences in the set of candidate correspondences associated with it) separately from the other candidate correspondences to save device memory, where the N-to-1 mappings in an array of N-to-1 mappings generated by MGU 106 do not need to keep their own copies of the constraints.

DRAWINGS—FIGURES

FIG. 15*a* is a visual illustration of the memory layouts of an exemplary two-level indexing structure for (n+1) combinations according to one embodiment.

FIG. 15*b* shows a process for constructing the two-level indexing structure for (n+1) combinations according to one embodiment.

Figure 15C:
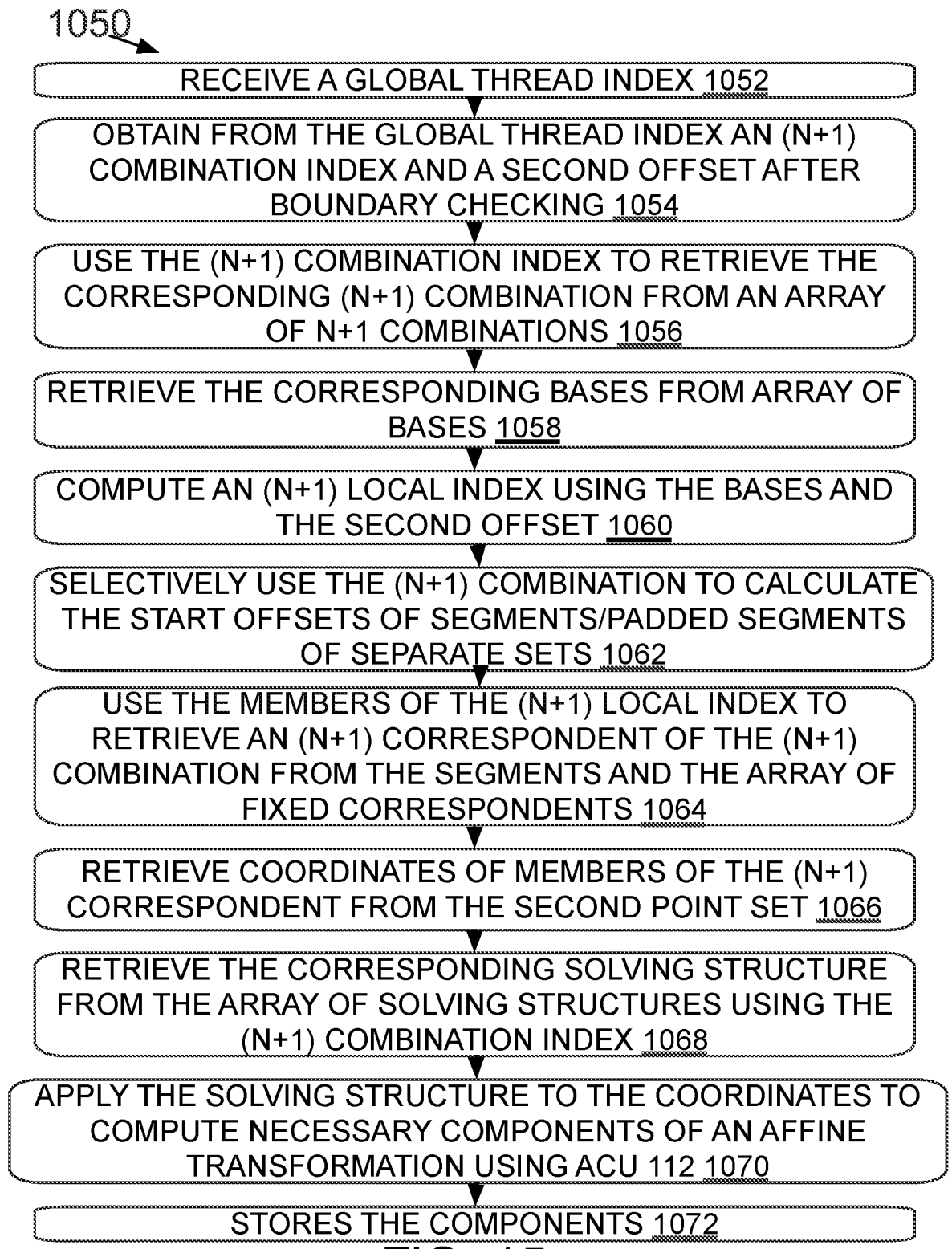

FIG. 15*c* shows a subprocess 1050 for using a hardware thread to compute some necessary components of an affine transformation for a two-level indexing structure for (n+1) combinations carried out at step 776 in FIG. 15*b* according to one embodiment.

Figure 15D:
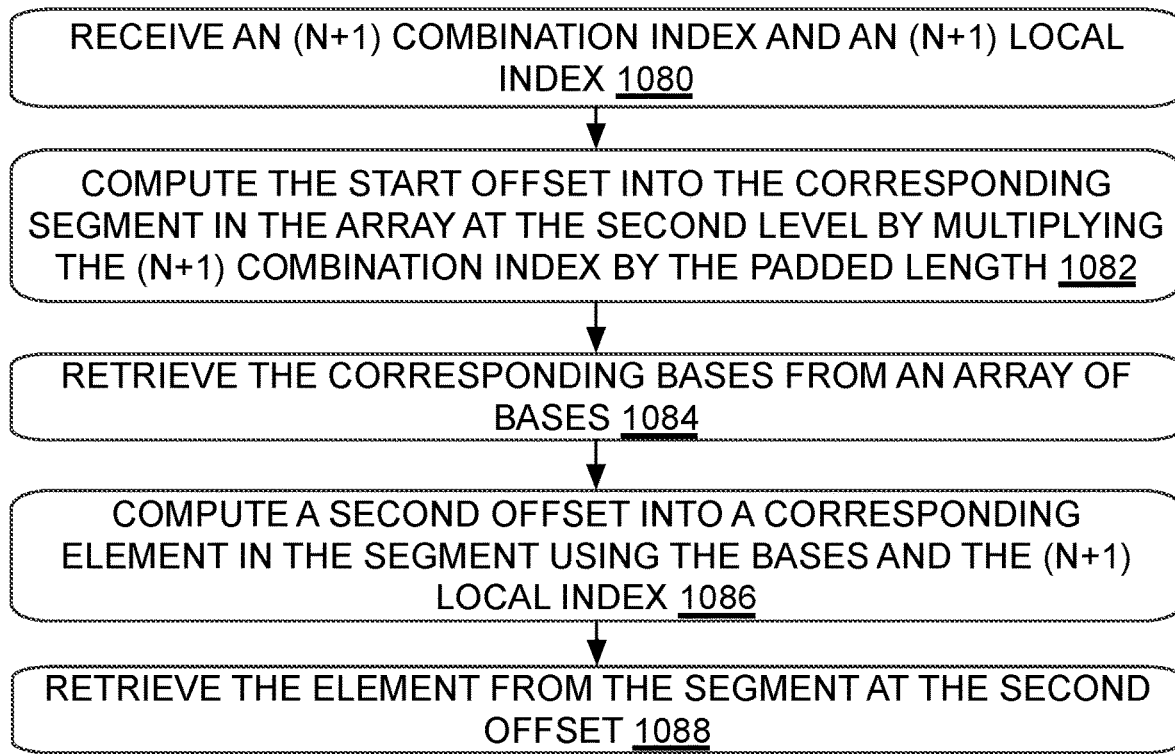

FIG. 15*d* shows a series of steps for using a hardware thread to query a two-level indexing structure for (n+1) combinations according to one embodiment.

Figure 16:
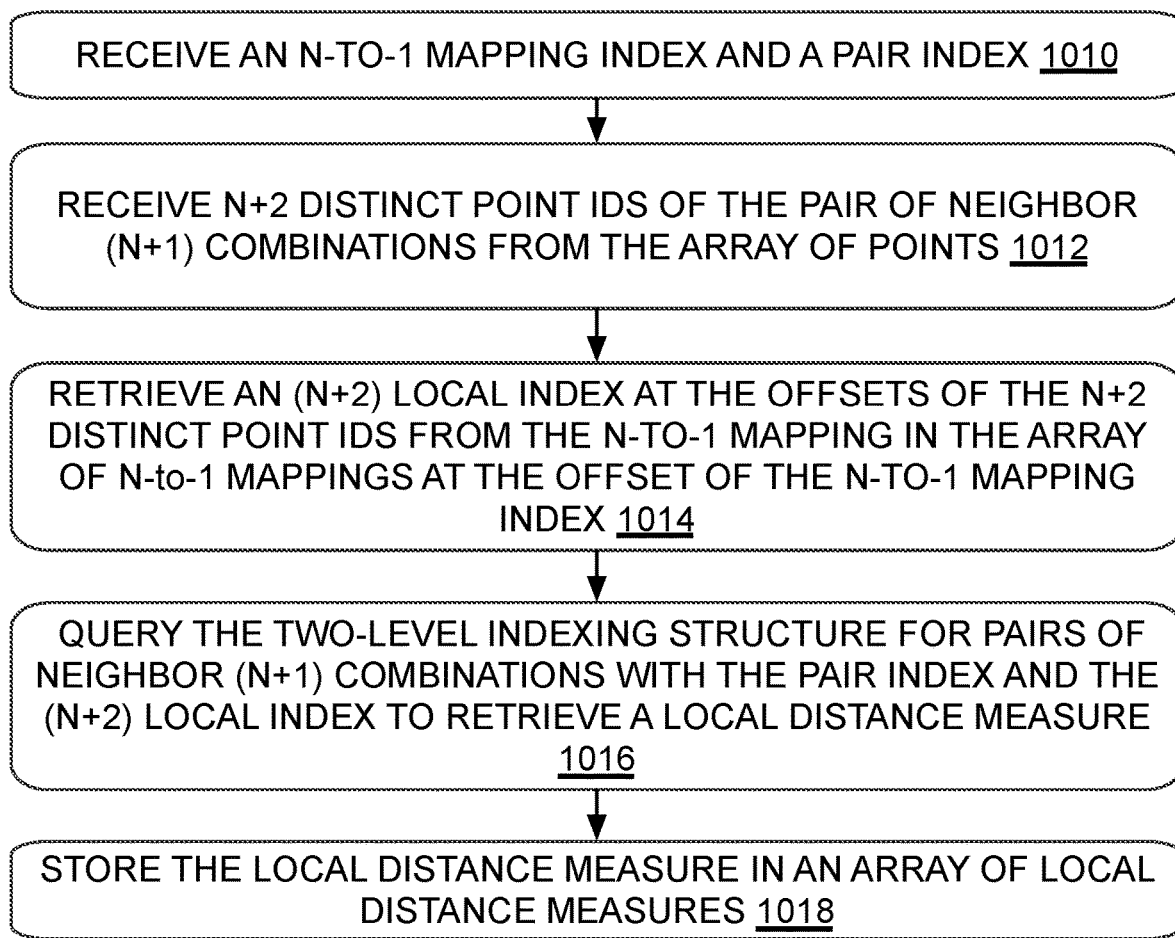

FIG. 16 shows an exemplary process for retrieving a local distance measure from a two-level indexing structure for pairs of neighbor (n+1) combinations according to one embodiment.

Figure 17:
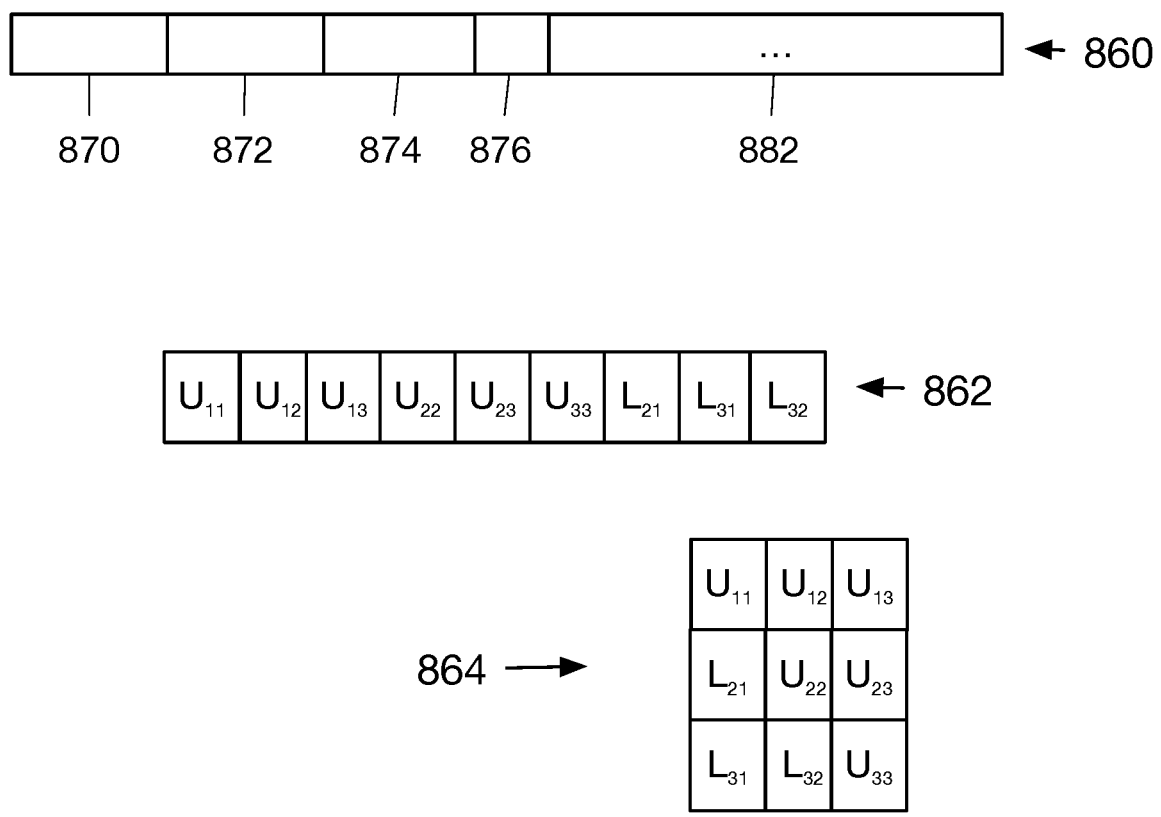

FIG. 17 shows the memory layouts of an AoS of solving structures according to another embodiment.

Figure 18A:
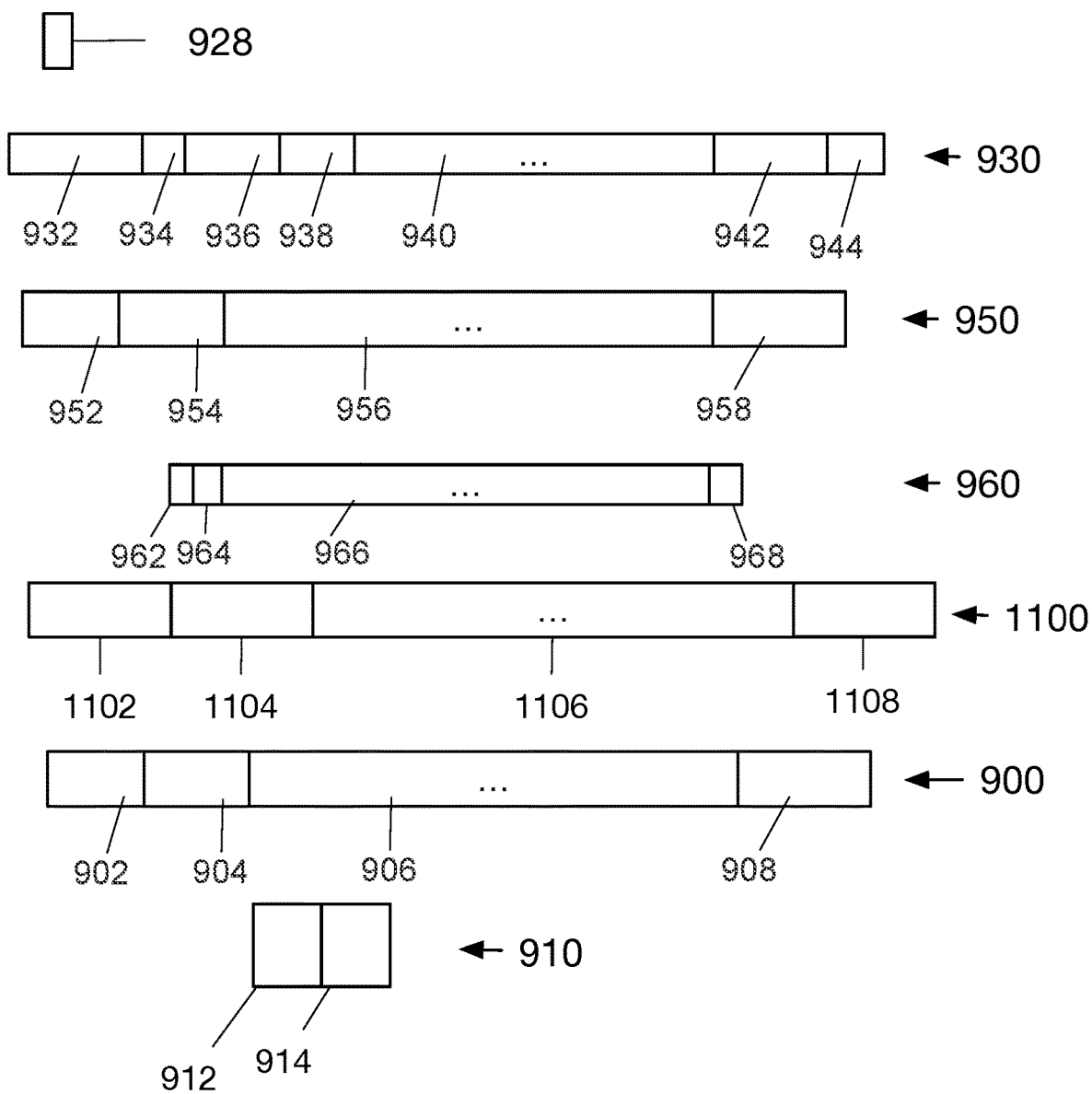

FIG. 18a is a visual illustration of the memory layouts of an exemplary two-level indexing structure for pairs of neighbor (n+1) combinations according to one embodiment.

Figure 18B:
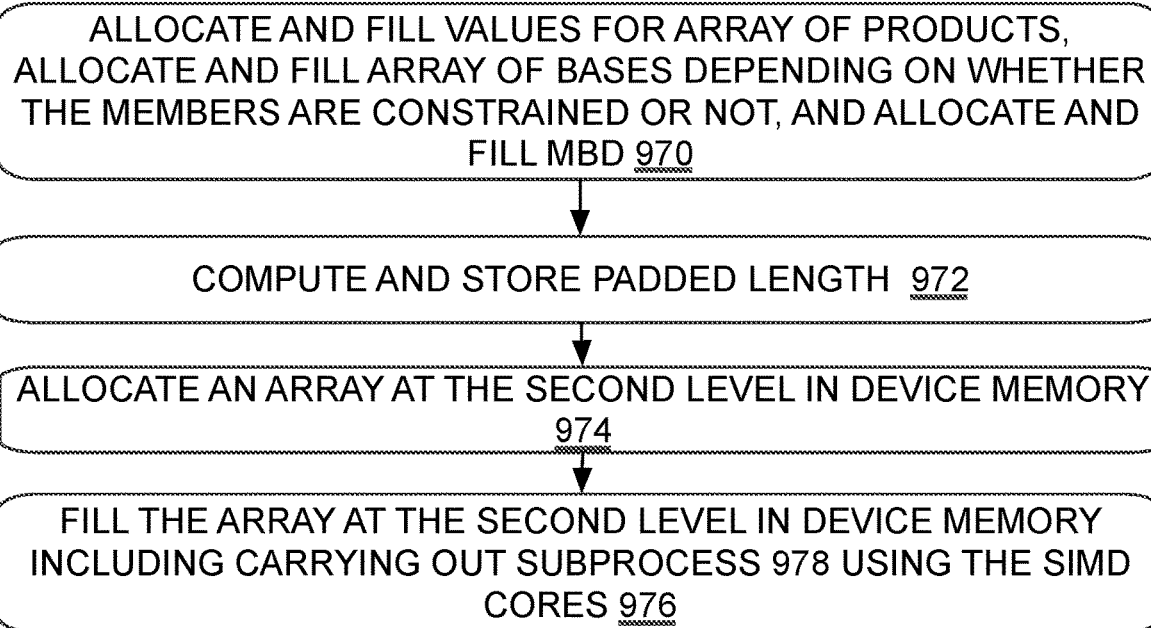

FIG. 18b shows a process for constructing a two-level indexing structure for pairs of neighbor (n+1) combinations according to one embodiment.

Figure 18C:
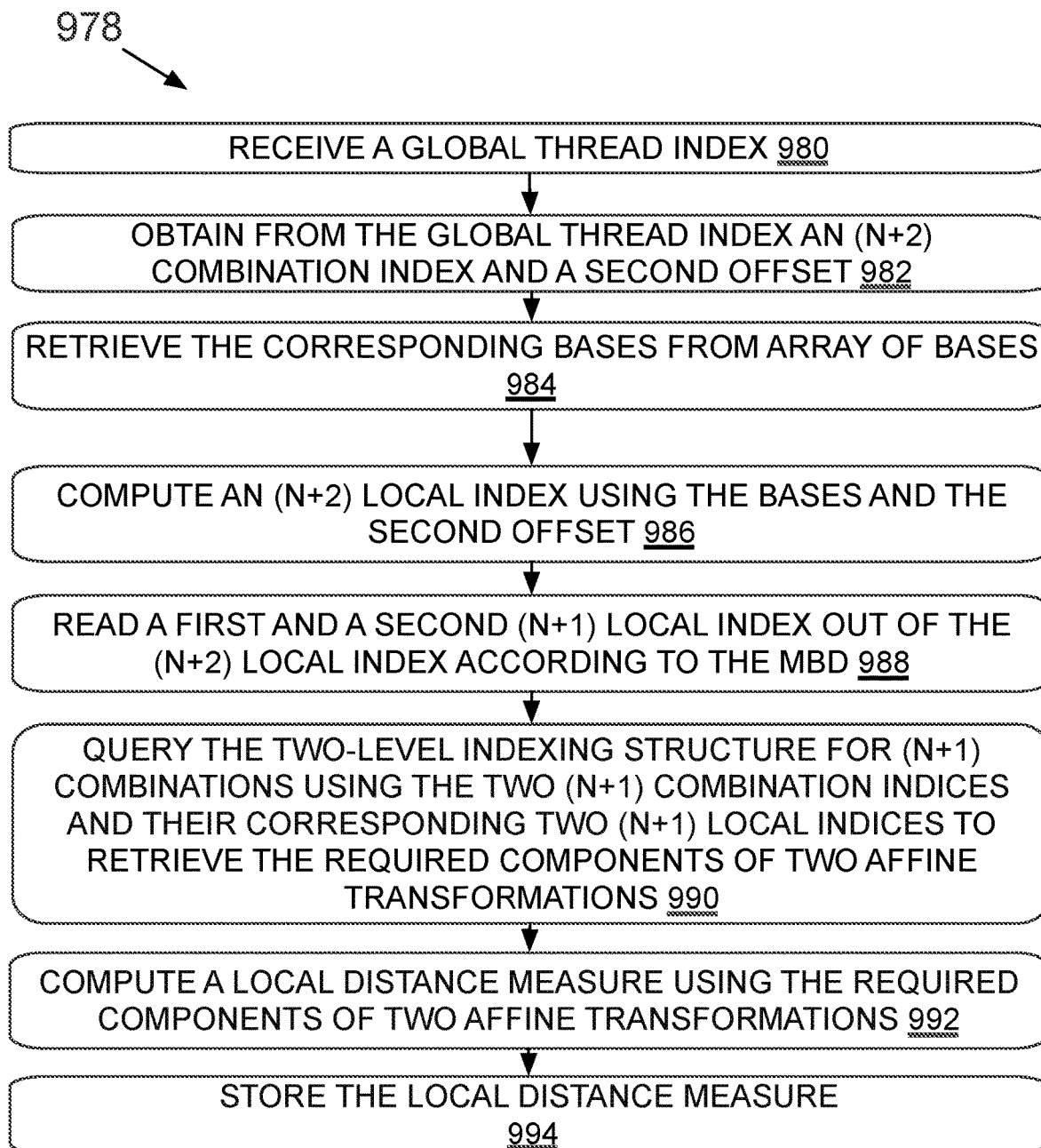

FIG. 18c shows a series of steps for using a hardware thread to compute a local distance measure for a two-level indexing structure for pairs of neighbor (n+1) combinations at step 976 in FIG. 18b according to one embodiment.

Figure 18D:
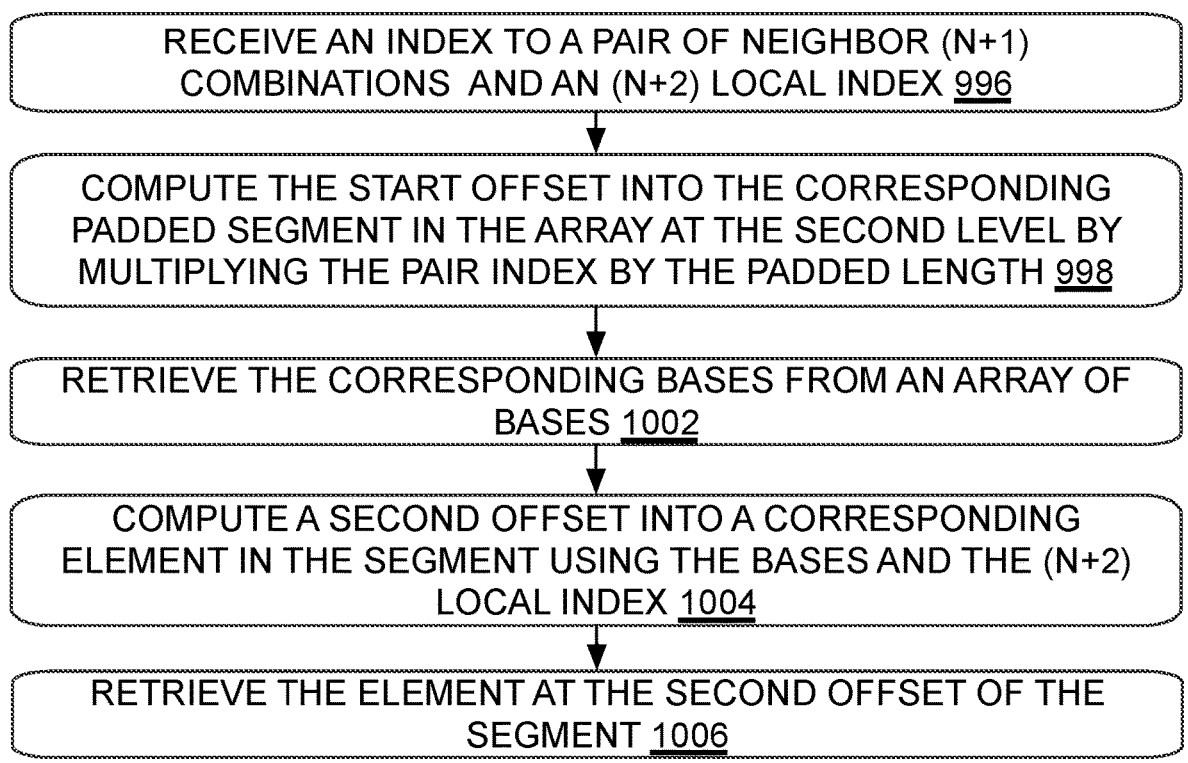

FIG. 18d shows a series of steps for using a hardware thread to query a two-level indexing structure for pairs of neighbor (n+1) combinations according to one embodiment.

Figure 19:
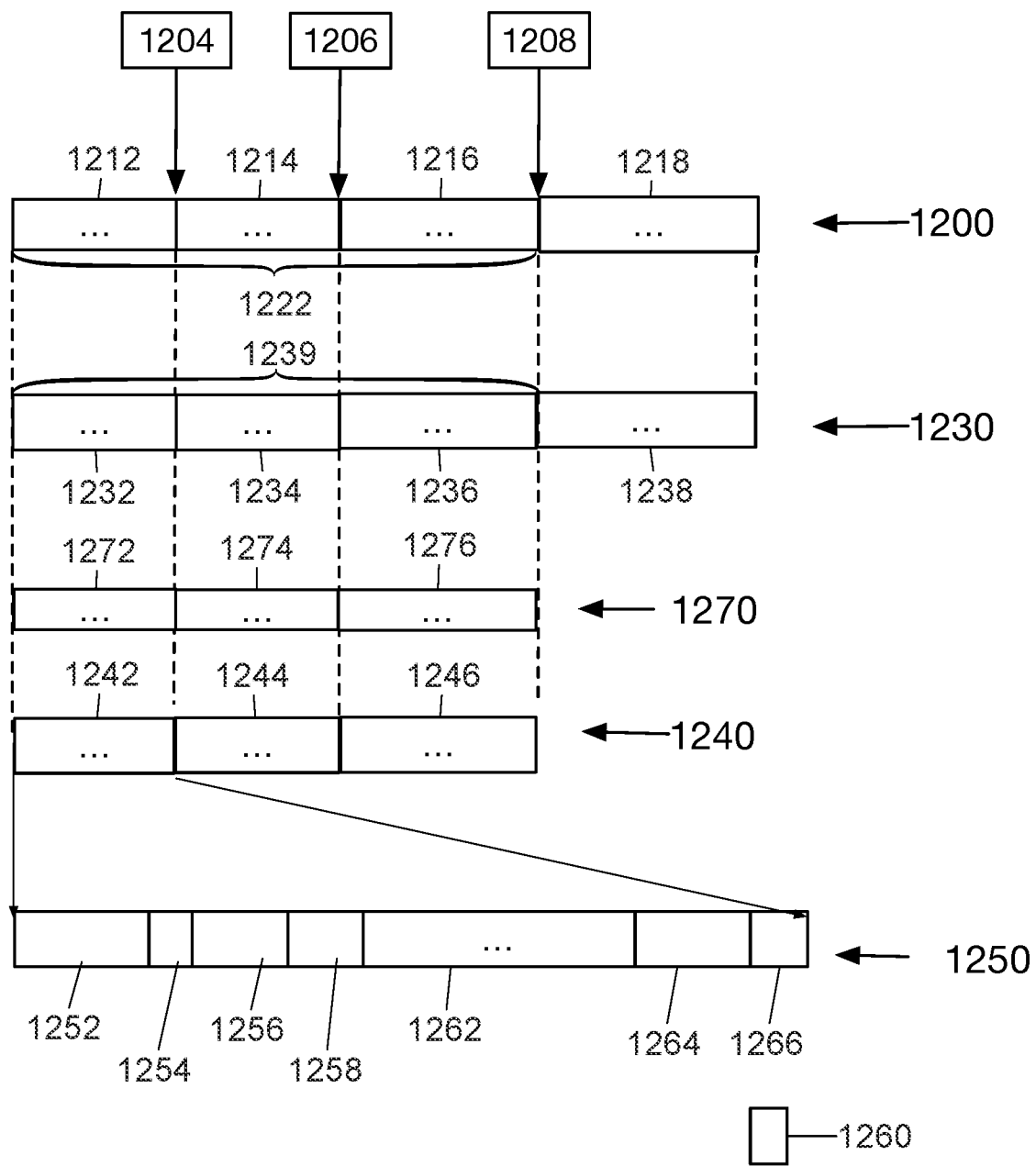

FIG. 19 shows an exemplary frame in 2D, where the frame includes a first spatial point set comprising a first non-empty non-isolated portion and a second constrained portion, a padded CCISS, and an extended array of fixed correspondents comprising a first not-yet-fixed portion and a second fixed portion. The first non-empty non-isolated portion of the first spatial point set is divided into three sub-portions, and both the padded CCISS and the first not-yet-fixed portion are divided into three sub-portions accordingly.

Figure 20:
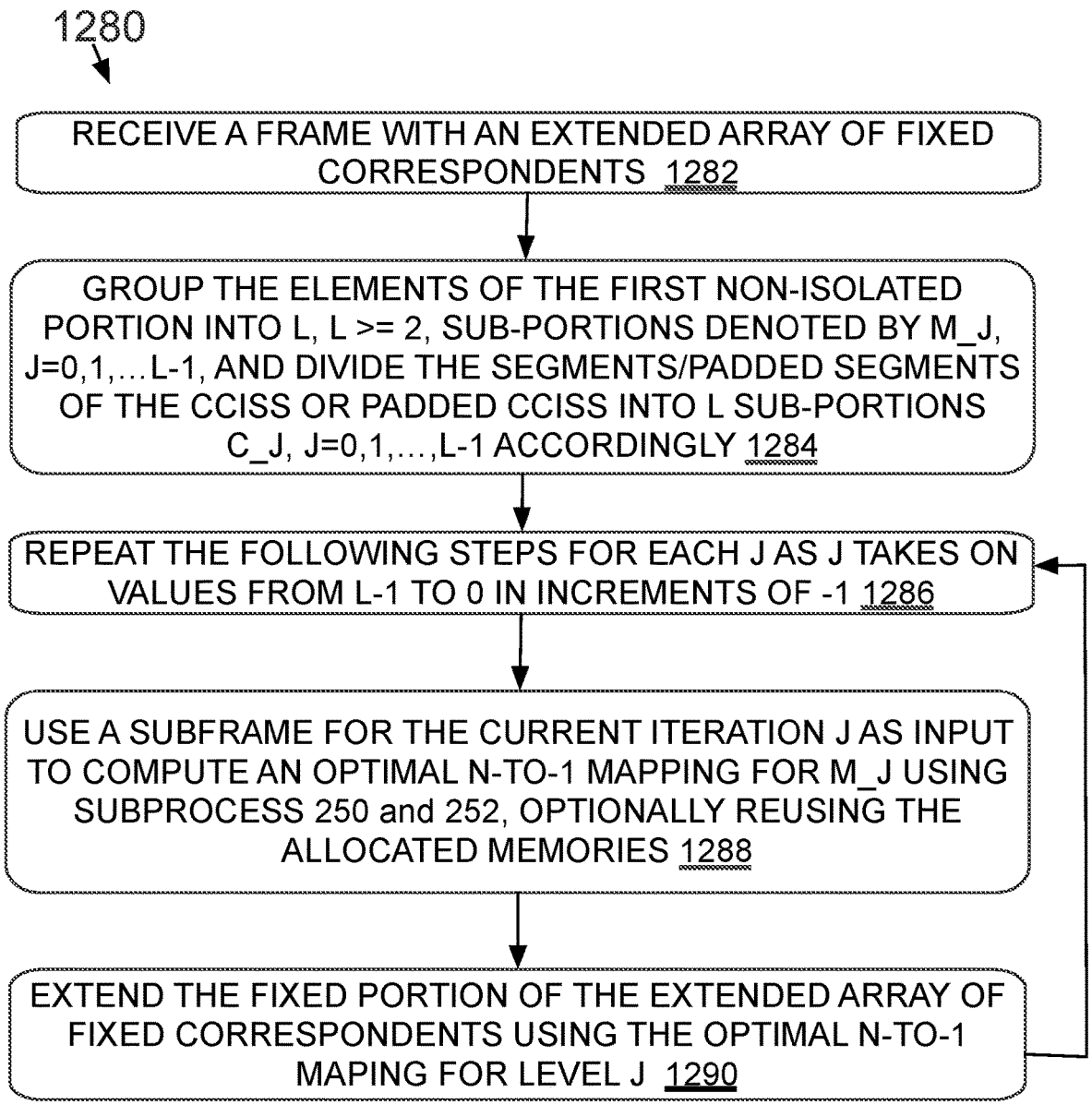

FIG. 20 shows an exemplary process for generating and evaluating N-to-1 mappings between two spatial point sets in multi-levels in 2D.

DETAILED DESCRIPTION

Definitions

The affine transformation in nD, n being a positive integer, is a line-preserving transformation from $R^n$ to $R^n$ that preserves parallelism and division-ratio. An affine transformation T acting on a point whose coordinate vector is $\vec{x}=[x_1, \cdots, x_n]^T \in R^n$ can be denoted by $T(\vec{x})$. We have $$T(\vec{x}) = A(T)\vec{x} + \vec{t}(T),$$

where $A(T)$ is an n-by-n matrix, $\vec{t}(T)$ is an n-by-1 vector, and both are uniquely determined by T. It can be written as a single matrix-vector multiplication in homogeneous coordinates:

$$T(\vec{x}) = \begin{bmatrix} A(T) & \vec{t}(T) \\ 0 & 1 \end{bmatrix} \begin{bmatrix} x_1 \\ \vdots \\ x_n \\ 1 \end{bmatrix}$$

In homogeneous coordinates a point is usually represented in its standard form, which means that its component corresponding to the extra dimension obtained by embedding into a projective space is 1. It is also understood that in homogeneous coordinates two vectors are viewed as equal if one can be obtained by multiplying the other by a non-zero scalar.

For an affine transformation denoted by T, we use $A(T)$ to denote its left sub-matrix, and $\vec{t}(T)$ to denote its displacement component. An affine transformation is said to be nD if the dimension of the associated space is $R^n$. An affine transformation in nD can be represented in homogeneous coordinates by an (n+1)-by-(n+1) matrix. $T(\vec{x})$ denotes the image obtained by applying an affine transformation T to a point $\vec{x}$, and $A(T)(\vec{v})$ denotes the image obtained by applying the left sub-matrix of T to a vector $\vec{v}$. Similarly, if s is a point set, then $T(s)$ denotes the set obtained by applying the affine transformation T to each point of the set, and if $s_2$ is a set of vectors, $A(T)(s_2)$ denotes the set obtained by applying the left sub-matrix of T to each vector of the set $s_2$. Given two affine transformations $T_1, T_2$, the difference of the left sub-matrices of $T_1, T_2$ is denoted by either $A(T_1)-A(T_2)$ or equivalently $A(T_1-T_2)$.

In this document, a spatial point is a point of interest in nD, n=2, 3. A point of interest can be extracted from a digital image using some feature extractor and inserted into the space (by assigning coordinates to the point), inserted by a human operators through a computer user interface, or inserted into the space by some other computer algorithms. Examples include interest points extracted using Scale-Invariant Feature Transform (SIFT), Speeded-Up Robust Features (SURF), and various other corner and blob detectors, centroids and corners detected using object detection neural networks, pre-computed or pre-generated landmarks on digital maps, and predictions made by various Bayesian Filters.

To each received spatial point there is in the input at least its coordinates. Each point has a point id which is either explicitly assigned or implied for example by the point's offset in an SoA or Aos. Sometimes we don't differentiate a point and its point id. Thus when we say "point i", it means the point whose point id is i. For a point whose point id is i, its coordinates is denoted by loc(i). Whether loc(•) is in homogeneous or inhomogeneous coordinates depends on the context.

For example in one embodiment the input coordinates could be integers representing the pixels' row and column indices in 2D. In another embodiment it could include in addition their depth coordinates in 3D. Alternatively for some other embodiments, it can also be in floating points, fixed points, rational numbers etc. In the current embodiment, a point id is a non-negative integer that is the offset of the point's coordinates in an array of coordinates. Alternatively, a point id can be any identifier as long as it uniquely identifies a point within a point set. For example in another embodiment, it is the starting address of the point's coordinates in the device memory. In yet another embodiment, they are computer generated unique ids (GUID) that are keys in a hash table that also stores the points' coordinates.

Referring to "AoS and SoA" retrieved from wikipedia, a sequence of records can be stored as an SoA (structure of arrays) or as an AoS (array of structures). For an SoA, it says: "Structure of arrays (or SoA) is a layout separating elements of a record (or 'struct' in the C programming language) into one parallel array per field." For an AoS, it says "Array of structures (or AoS) is the opposite (and more conventional) layout, in which data for different fields is interleaved." Alternatively a sequence of records can be stored in a hash table or in other suitable data structures. In this document, the memories that stores their lengths are usually not explicitly mentioned in the detailed descriptions of their memories. However in some situations array lengths are needed for purposes beyond maintaining and accessing, for example for launching a grid of a number of hardware threads to process an array's elements/structures where the number is dependent on the array's length. It's in such situations the array's length will be explicitly mentioned. In this document, we use "an element" to refer to a record of an SoA, and "a structure" to refer to a record of an AoS. We also use "an element" to refer to an individual scalar element of a scalar array in an SoA or by itself.

In an SoA, we define the offset of an element as the number of elements preceding it or equivalently the number of scalars preceding any of its components in the respective scalar array relative to the starting of the scalar array. A padding in an SoA pads each of its scalar arrays at the same offset with the same number of scalars, where the number is referred to as the number of padding elements of the padding. For an AoS, the components of each of its structures are stored together, and each structure or every fixed number of consecutive structures could be padded by extra bytes so that each structure starts at an offset that satisfies the alignment requirement of the hardware architecture where the AoS is stored. An AoS may further include one or more padding structures. The offset of a structure refers to the number of structures stored before it in the AoS. When we say an array of some struct, if that some struct is not a scalar, then the array can be stored either as an AoS or an as SoA unless explicitly specified otherwise. In this document, notations such as "0-th", "1-st", "2-nd" are used to denote the elements for SoA or structures for AoS at respective offsets 0, 1, and 2. A unit of an AoS refers to a collection of structures that are stored together with a possible padding in the AoS such that the first structure of the unit satisfies the alignment requirement and the other structures of the unit don't.

An "index" refers to an identifier that can be used to retrieve a certain value from a collection of scalars or structs, where each of the scalars or structs is associated with a unique identifier. For an AoS or an SoA, the offsets of the structures or elements can be used as the indices. Alternatively, other suitable indexing structures such as the hash table can be used as we'll discuss later.

In this document, an N-to-1 mapping is a mapping between a first point set and a second point set with the restriction such that for each point in the first point set there is one corresponding point in the second point set, but for each point in the second point set there can be zero, one, or more corresponding points in the first point set. When a point from the first point set is associated with a point from the second point set, we refer to this association as a correspondence with each point being the other's correspondent. Together the two points are referred to as the end points of the correspondence. When a point from the second point set is associated with more than one point from the first point set, there is a correspondence between the point from the second point set and each of its associated points in the first point set. Thus an N-to-1 mapping comprises a set of correspondences subjecting to the restriction.

An N-to-1 mapping between two point sets in $R^n$ can also be represented by a displacement field, where to each non-isolated point of the first point set there is attached a displacement vector, such that the point's correspondent's coordinates can be calculated by adding the displacement vector to the point's coordinates.

Given a first and a second point sets, a candidate correspondence is a possible association between a point in the first point set and a point in the second point set. As an example, in some embodiments, candidate correspondences are generated by a tracker for multi-object tracking (MOT). In MOT, each observed trajectory could be tracked by a Bayesian Filter for example a Kalman Filter or an Extended Kalman Filter, etc. At each time step, the tracker generates a new set of predictions for the objects using the Bayesian filters according to their past trajectories and elapsed times. The predictions are sometimes given as multivariate normal distributions, from which gate areas can be defined as all points whose Mahalanobis distances to the means are smaller than a predetermined threshold(s). At each time step it also provides a set of measurements from various sensors. If a measurement falls into the gate area of a prediction, the prediction and the measurement defines a candidate correspondence. Please refer to "Multiple Hypothesis Tracking Revisited" by Kim et al. for more details about the tracking problem. Given a first, a second point sets, and a set of correspondences between them, a point of either point sets is called isolated if it does not appear in any of the correspondences.

As another example, referring to "Distinctive Image Features from Scale-Invariant Keypoints" by David Lowe, associated with each interest point a SIFT feature vector of 128 elements is computed. A vector summarizes the local textures surrounding an interest point. Thus a candidate correspondence is generated between two interest points in two images only if the Euclidean distance between the two feature vectors is below a certain predetermined threshold. As another example, in U.S. Pat. No. 6,272,245 granted Aug. 7, 2001 by Lin, distances between local statistical features are used to find candidate correspondences. Referring to yet another example, in "Spin-Images: A Representation for 3-D Surface Matching" by Johnson, local geometries captured in spin-images are used to find candidate correspondences. Various embodiments according to this invention can be applied to such applications to select from candidate correspondences that are geometrically consistent.

As we'll see later, an N-to-1 mapping can also be represented as a tuple of indices of candidate correspondences in their separate sets for the points of a non-isolated portion in a first spatial point, plus an array of fixed correspondents for the points of a constrained portion in the first spatial point set.

In nD, n=2,3, an (n+1) combination of a point set is a subset of n+1 distinct points (or equivalently n+1 distinct point ids, and same below), where in 2D they are not all on the same line and in 3D they are not in the same plane. An (n+1) combination can define a simplex in nD. For example, in 2D, three non-collinear points define a triangle, and in 3D four non-coplanar points define a tetrahedron. If two (n+1) combinations have n points in common, then they are said to be neighbors. Thus a pair of neighbor (n+1) combinations contain exactly n+2 distinct points. The intersection of a pair of (n+1) combinations refers to the set of points that belong to both (n+1) combinations. In 2D, two (n+1) combinations having two points in common means the corresponding triangles share a common edge, which we will refer to as the common edge of the two (n+1) combinations. Similarly, in 3D, two (n+1) combinations having three points in common means the corresponding tetrahedra share a common triangle, which we will refer to as the common triangle of the two (n+1) combinations. In nD, an (n+2) combination in a point set is a subset of n+2 distinct points, where in 2D they are not all on the same line and in 3D they are not all in the same plane. It's obvious that a pair of neighbor (n+1) combinations comprises an (n+2) combination.

A "common line" refers to the line passing through a common edge (of a pair of neighbor (n+1) combinations) in 2D, and a "common surface" refers to the surface passing through a common triangle (of a pair of neighbor (n+1) combinations) in 3D. Moreover, depending on the context a "common hyperplane" refers to either a common edge in 2D or a common triangle in 3D.

In this document, in 2D, an (n+1) combination is often denoted by a tuple. For example, an (n+1) combination denoted by $(i_1, i_2, i_3)$ contains three distinct points $i_1, i_2, i_3$. An (n+1) combination can contain for example the vertices of a triangle. Similarly, in 3D a tuple containing four points is used to denote an (n+1) combination, which for example could contain the vertices of a tetrahedron. A tuple containing four points is also used to denote an (n+2) combination in 2D. A line segment is often denoted by a tuple of two end points. For example, $(p_1, p_2)$ represents a line segment whose two end points are $p_1$ and $p_2$. This notation is also used to denote a candidate correspondence. The exact meaning shall be clear from the context. When using a tuple, an order among its points is assumed unless it is clarified in its context. In the C/C++ programming languages, a tuple of n+1 components can be stored in a scalar array of length n+1, in a struct containing n+1 scalar components, or in n+1 scalar variables referenced by different symbols. Although we haven't defined them yet, an (n+1) local index, an (n+2) local index, and an (n+1) correspondent can be programmed similarly.

Given a first point set, a second point set, a set of candidate correspondences between the two point sets, and an (n+1) combination in the first point set, an (n+1) correspondence of the (n+1) combination comprises the indices of n+1 candidate correspondences, where the n+1 candidate correspondences together have n+1 distinct end points in the first point set, the n+1 distinct points in the first point set forms the (n+1) combination, and the mapping from the distinct points to their correspondents in the second point set in the n+1 candidate correspondences is N-to-1. Given a pair of neighbor (n+1) combinations, we define an (n+2) correspondence of the pair of neighbor (n+1) combinations to include the distinct members of two (n+1) correspondences such that their corresponding (n+1) combinations are the two (n+1) combinations of the pair of neighbor (n+1) combinations, and when the two (n+1) correspondences are combined together they still define an N-to-1 mapping.

To make things clear, unless specified otherwise in the context, "n+1 candidate correspondences" refers to a set of candidate correspondences where the number of candidate correspondences is n+1, and "(n+1) correspondences" refers to a set of elements where each element is an (n+1) correspondence that in turn comprises the indices of n+1 candidate correspondences. An (n+1) correspondence includes through its n+1 candidate correspondences n+1 end points in the second point set, where the n+1 end points in the second point set may not be distinct since the mapping is N-to-1. Thus two candidate correspondences in an (n+1) correspondence can have the same end point in the second point set, nevertheless we'll refer to the n+1 end points in the second point set as an "(n+1) correspondent". Similarly we refer to the end points of an (n+2) correspondence in a second point set an "(n+2) correspondent".

If we replaces the indices of the n+1 candidate correspondences in an (n+1) correspondence with the candidate correspondences' indices in their separate sets of candidate correspondences (to be clarified in detail later), the collection of the n+1 indices in their separate sets of candidate correspondences will be referred to as an "(n+1) local index". Similar we define an "(n+2) local index".

Hardware Components

Figure 7:
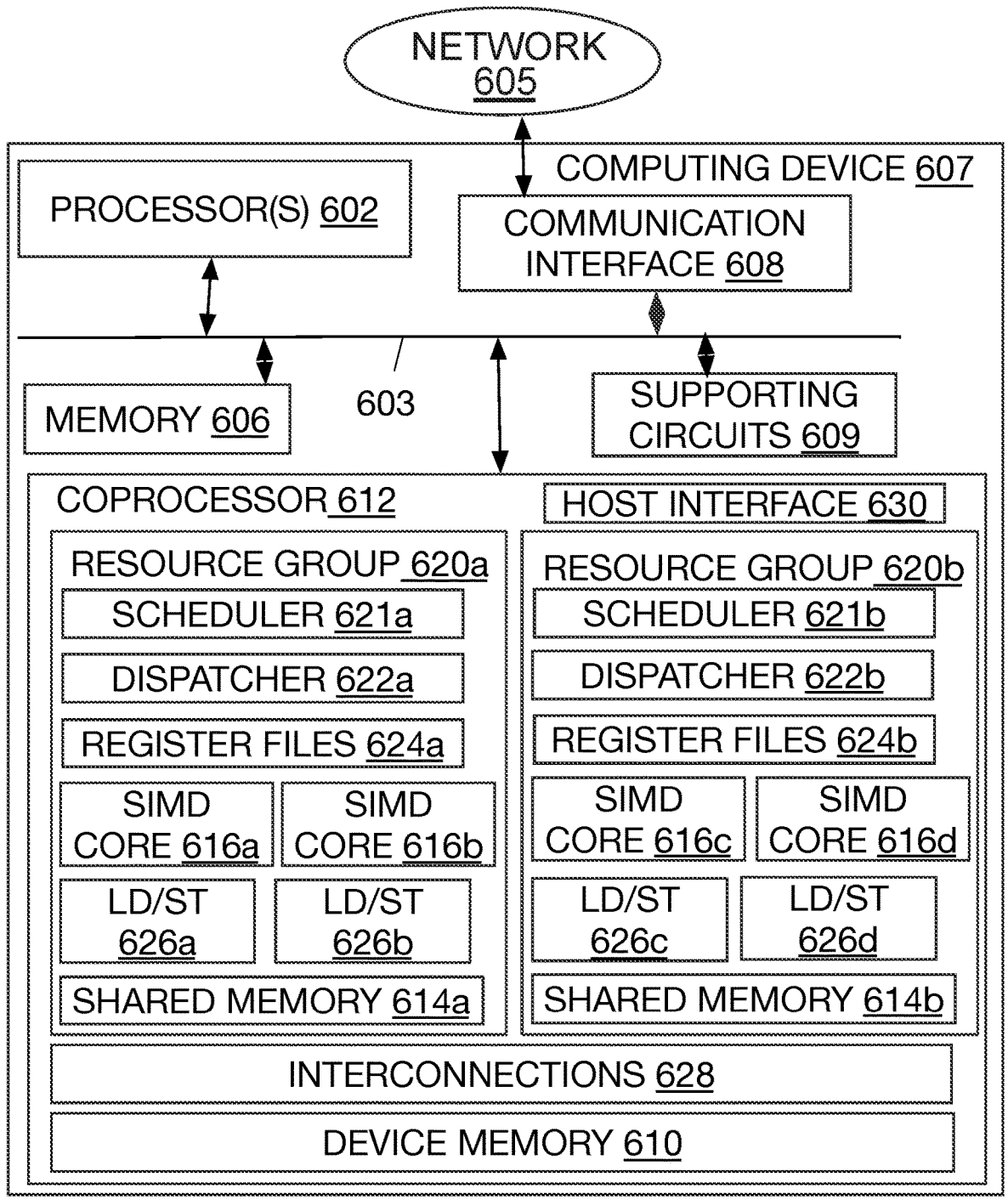
FIG. 7 shows a block diagram of an exemplary computing device including a data-parallel coprocessor according to one embodiment.
Figure 9:
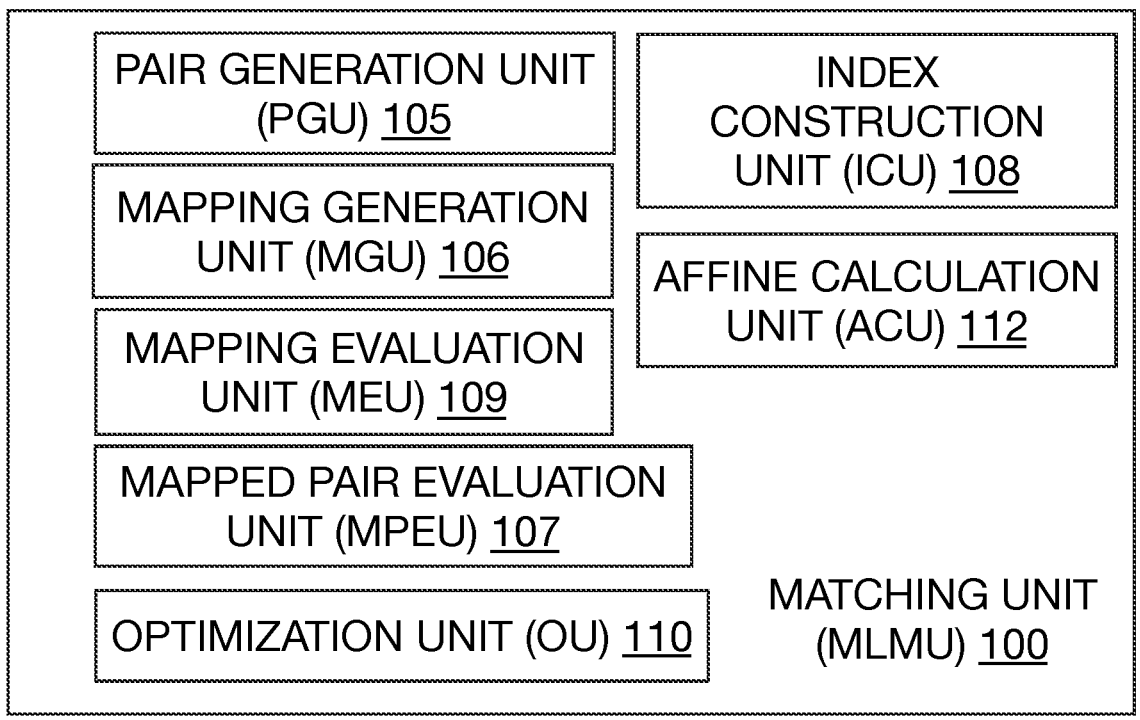
FIG. 9 is a block diagram of an exemplary Matching Unit according to one embodiment.

A computing device implements a Matching Unit for example as the one shown in FIG. 9 in the form of software, hardware, firmware, ASIC, or combinations thereof. FIG. 7 depicts an exemplary computing device 607 comprising one or more general purpose processor(s) 602, host memory module(s) 606, buses 603, supporting circuits 609, and a data-parallel coprocessor 612. Some embodiments may further include a communication interface 608 that receives inputs from and send outputs to a server (not shown) through an external network 605. Processor(s) 602 comprises one or more general purpose microprocessors, where such general purpose microprocessors can be one of those found in desktop machines, in embedded systems, virtual CPUs such as those found in cloud computing environments, or any other suitable type of general purpose processors for executing required instructions. Each processor comprises one or more cores, where each core has its own functional units, registers, and caches. All cores in a processor share a common memory module of host memory module(s) 606, and may also shared a common cache. Supporting circuits 609 comprise well-known circuits such as various I/O controllers, power supplies, and the like. Bus 603 comprises data buses and instruction buses between the general purpose processors, the host memory, the coprocessor, communication interfaces, and various peripherals.

Host memory 606 comprises storage devices for example read-only memory (ROM), dynamic random-access memory (DRAM), and the like. Memory 606 provides storage for operation system instructions that provide an interface between the software applications being executed and the hardware components. Memory 606 is further loaded with instructions for various embodiments of Matching Units including those that program coprocessor 612, processors 602, or both.

Examples of operating systems include for example MICROSOFT WINDOWS, LINUX, UNIX, various real time operating systems (RTOS) and the like. They also include necessary device drivers and runtimes so that coprocessor 612 can be programmed from the host. In some embodiments, computing device 607 may further comprise storage devices (not shown) for recording instructions of computer programs into a record medium, or loading instructions from a record medium into memory. For example, such record medium may include internal hard drive, external hard drives, FLASH drives, optical disks, and cloud based storages accessible through Internet.

Data-parallel coprocessor 612 comprises a host interface 630 for receiving data and instructions and sending data between the host and the device. It also comprises one or more SIMD (Single Instruction Multiple Data) cores 616a-616d, where each SIMD core comprises a number of lanes of functional units, where a lane is sometimes refer to as a "CUDA core" in NVIDIA devices and "Processing Elements" in OpenCL contexts. Multiple SIMD cores share a dispatcher unit that fetches, decodes, and dispatches instructions. Multiple SIMD cores also share a scheduler unit that schedules and assigns computation tasks to the SIMD cores. For an illustrative example in FIG. 7, data-parallel coprocessor 612 comprises dispatcher units 622a and 622b and scheduler units 621a and 621b. SIMD cores 616a and 616b share dispatcher unit 622a and scheduler unit 621a; SIMD cores 616c and 616d share dispatcher unit 622b and scheduler unit 621b. Compare to CPU cores, CUDA cores or Processing Elements are much simpler but appear in larger numbers, and hardware threads can be switched on and off at very low cost for latency hiding.

In some embodiments, CUDA cores or Processing Elements can be used to emulate threads by masking out branches that are not executing. In some other embodiments, some lanes may read garbages in and write garbages out. A lane of an SIMD core can execute a "hardware thread" at any time, which is a separate copy of a set of states associate with a kernel function. A data-parallel coprocessor executes a grid of hardware threads and the hardware threads are grouped into units of execution, which are called "warp"s in CUDA and "wavefront"s in AMD devices.

In some embodiments, data-parallel coprocessor 612 include a device memory (a.k.a. global memory) 610 that the SIMD cores can read from and write into. Alternatively, a coprocessor can be integrated into the same chip as processor(s) 602, in which case they may access memory 606 via bus 603. Examples include various AMD APUs and Intel CPUs that have integrated GPUs. In the former case we say that device memory 610 is coupled with the coprocessor, and in the later case we say that host memory 606 is coupled with the coprocessor. Even when coprocessor 612 has its own device memory 610, a portion of host memory 606 may still be mapped into the address space of coprocessor 612 and that portion is said to be coupled with the coprocessor. In some embodiments, a portion (not shown) of device memory 610 may be used for constant storage to provide read-only access and broadcast access patterns.

Data-parallel coprocessor 612 also include register files 624a and 624b, load/store units 626a, 626b, 626c and 626d, shared memories 614a and 614b, and inter connections 628. The SIMD cores can load data from coupled memories at the addresses computed by the load/store units into the register files through the inter connections, operate on the register files, and can store the results into coupled memories at the addresses computed by the load/store units through the inter connections.

In some embodiments, hardware resources are grouped into one or more Resource Groups, which are called Compute Units in the vocabulary of OpenCL, and Stream Multiprocessors (SM) for CUDA devices. For example in FIG. 7, Resource Group 620a includes scheduler 621a, dispatcher 622a, register files 624a, SIMD cores 616a and 616b, load/store units 626a and 626b, and shared memory 614a. Resource Group 620b includes scheduler 621b, dispatcher 622b, register files 624b, SIMD cores 616c and 616d, load/store units 626c and 626d, and shared memory 614b. The SIMD cores within a Resource Group share hardware resources including registers, load/store units, and optional shared memories. A Resource Group may optionally have its own cache (not shown), which in a CUDA device corresponds to the L1 cache. Similarly in some embodiments, device memory 610 may optionally have its own cache (not shown), which in a CUDA device corresponds to the L2 cache.

Examples of coprocessor 612 include various NVIDIA® CUDA® devices including GPUs, various discrete AMD® GPUs, GPUs embedded in various AMD APUs and various Intel® CPUs, and various Intel FPGA-based acceleration platforms, GPUs embedded in various ARM devices etc. And examples of computing device 607 including for example the Jetson family of products and workstations with discrete or integrated GPUs. For example, an NVIDIA CUDA device comprises a large amount of CUDA cores that are divided into multiple Stream Multiprocessors (SM). Each SM includes a plurality of CUDA cores and a limited amount of shared memories/L1 cache, register files, special function units (SFUs), and controlling units, where the exact numbers depend on the GPU architecture. The coprocessor includes a global memory that is also referred to as its device memory for storing for example global data that are visible to all hardware threads and kernel code, etc. Defined more abstractly, an OpenCL device includes multiple compute units that correspond to SMs in CUDA, and each compute unit includes multiple processing elements that correspond to multiple CUDA cores. For an OpenCL device its memories are divided into global memories, local memories that correspond to shared memories in CUDA, and private memories that correspond to registers or local memories in CUDA.

According to the CUDA programming model, a user code is divided into a host code that runs on the host side of a computing device and a device code that runs on the coprocessor. The device code is defined into one or more device functions called kernels. Each time a user launches a kernel in a CUDA device, a grid is spawned that contains a number of hardware threads. Kernel launches are asynchronous so that host codes can run concurrently together with device codes after the call returns. A grid is decomposed into multiple thread blocks, and each thread block contains multiple hardware threads. The user specifies the dimensions of a grid in terms of the number of thread blocks in each of the dimensions, and the dimensions of its blocks in terms of the number of hardware threads in each of the dimensions at the time of a kernel launch. The CUDA device receives the kernel parameters and assigns the thread blocks to the SMs, where each thread block is assigned to one SM while each SM can be assigned multiple thread blocks. There is an upper bound that limits the maximum number of thread blocks on an SM at any single time, and this number varies among different GPU architectures. In practice, at any time the actual number of thread blocks that can be assigned to an SM is also restricted by the supplies and demands of its shared resources such as memories and registers. The hardware threads in a thread block are further decomposed into multiple warps for scheduling and dispatching in its SM. High throughput is achieved by efficiently switching to another warp when one is stalled. At the time of writing, a warp consists of 32 hardware threads. The hardware threads in the same thread block can synchronize and communicate with each other using various mechanisms. From the stand point of a hardware thread, the kernel runs as a sequential program.

A CUDA stream is similar to a queue that can contain multiple operations including for example kernels, data movements, or events. The user adds jobs into the stream and they are executed first in first out (FIFO). Grid level parallelism is achieved by overlapping multiple streams. For example while transferring data between general purpose processor 602 (a.k.a. the host) and coprocessor 612 (a.k.a. the device) for one frame, at the same time the coprocessor can be executing a computing kernel for an earlier frame.

Similar concepts can be found in the OpenCL programming model. Each time a user program enqueues a kernel into the command queue of an OpenCL device, a grid containing work-items that correspond to GPU threads in CUDA is spawned, and the user specifies the dimensions of the work-items by providing an NDRange. An NDRange of work-items are decomposed into work-groups that correspond to thread blocks in CUDA. Within a work-group the work-items can synchronize with each other using various synchronization mechanisms provided by an OpenCL runtime. Work-groups are assigned to compute units where they are further decomposed into wavefronts for AMD GPUs. Compared with warps in CUDA devices, a wavefront for AMD GPUs typically consists of 64 work-items.

In order to communicate with OpenCL devices, a host program creates a context to manage a set of OpenCL devices and a command queue for each of the OpenCL devices. Commands that are enqueued into a command queue could include for example kernels, data movements, and synchronization operations. Compared to streams in the CUDA programming model, commands in an out-of-order queue can be made to depend on events that are associated with other commands. Alternatively a host program can create multiple in-order command queues for the same device. Kernel launches are also asynchronous, and since kernel launches can be associated with events, the OpenCL runtime provides APIs for a host to block on the events until the corresponding operations finish. In addition, the OpenCL programming model provides several mechanisms for exchanging data between hosts and OpenCL devices, such mechanisms including for example buffers, images, and pipes.

Dynamic Parallelism allows a hardware thread to enqueue a grid for another kernel or recursively for the same kernel. The new grid is considered a child of the parent hardware thread. The parent hardware thread can implicitly or explicitly synchronize on the child's completion, at which point the results are guaranteed to be visible to the parent grid. OpenCL version 2 and CUDA version 5.0 onwards support dynamic parallelism.

Shared memories are often used as a faster but smaller intermediary to improve access to global memories. Shared memories as its name suggests are shared by all hardware threads in a same thread block. A shared memory comprises multiple memory banks, and one sometimes needs to pad data arrays in order to avoid bank conflicts.

In this document I'll use "hardware threads" to refer to either GPU threads in CUDA or work-items in OpenCL depending on the context. I'll mostly use CUDA terminologies: for example "thread blocks" refers to thread blocks in the CUDA context or work groups in the OpenCL context, and I'll use "shared memories" to refer to either shared memories in the CUDA context or local memories in the OpenCL context.

Matching Unit

Referring to my previous U.S. application Ser. No. 17/107,348 filed on Nov. 30, 2020, given a frame, an embodiment treats some constraints (a constraint is defined as a candidate correspondence such that its end point in the first spatial point set has no other candidate correspondences in the set of candidate correspondences associated with it) separately from the other candidate correspondences to save device memory, where the N-to-1 mappings in an array of N-to-1 mappings generated by MGU 106 do not need to keep their own copies of the constraints. In this invention we build upon this to develop a multi-level method for matching spatial point sets.

Figure 8:
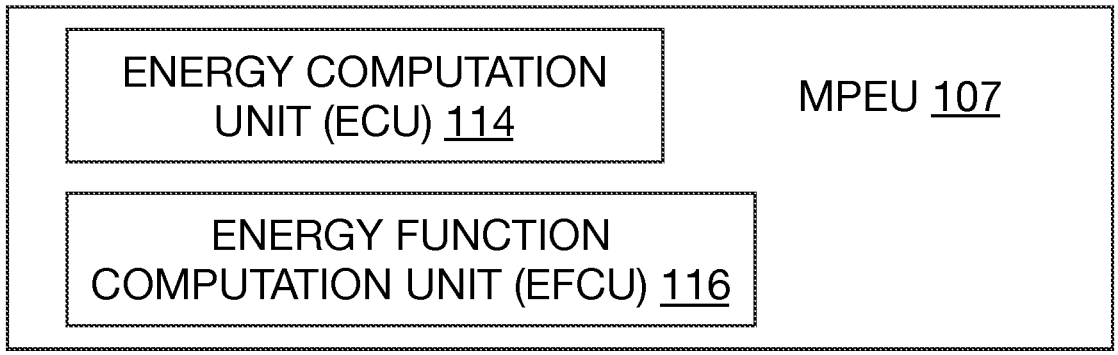
FIG. 8 is a block diagram of an exemplary Mapped Pair Evaluation Unit according to one embodiment.

FIG. 9 is a block diagram of an exemplary embodiment of a Matching Unit (MU) 100 for generating and evaluating mappings between spatial point sets with constraints. As shown in FIG. 9, MU 100 includes a PAIR Generation Unit (PGU) 105, a Mapping Generation Unit (MGU) 106, a Mapping Evaluation Unit (MEU) 109, a Mapped Pair Evaluation Unit (MPEU) 107, a Index Construction Unit (ICU) 108, an Affine Calculation Unit (ACU) 112, and an Optimization Unit (OU) 110. FIG. 8 illustrates MPEU 107 according to one embodiment, where it comprises an Energy Computation Unit (ECU) 114 and an Energy Function Computation Unit (EFCU) 116. MU 100 and its components can be implemented on the computing device 607 shown in FIG. 7 or various components can be implemented in the form of software, hardware, firmware, ASIC, or combinations thereof. The units will be discussed later.

Figure 1:
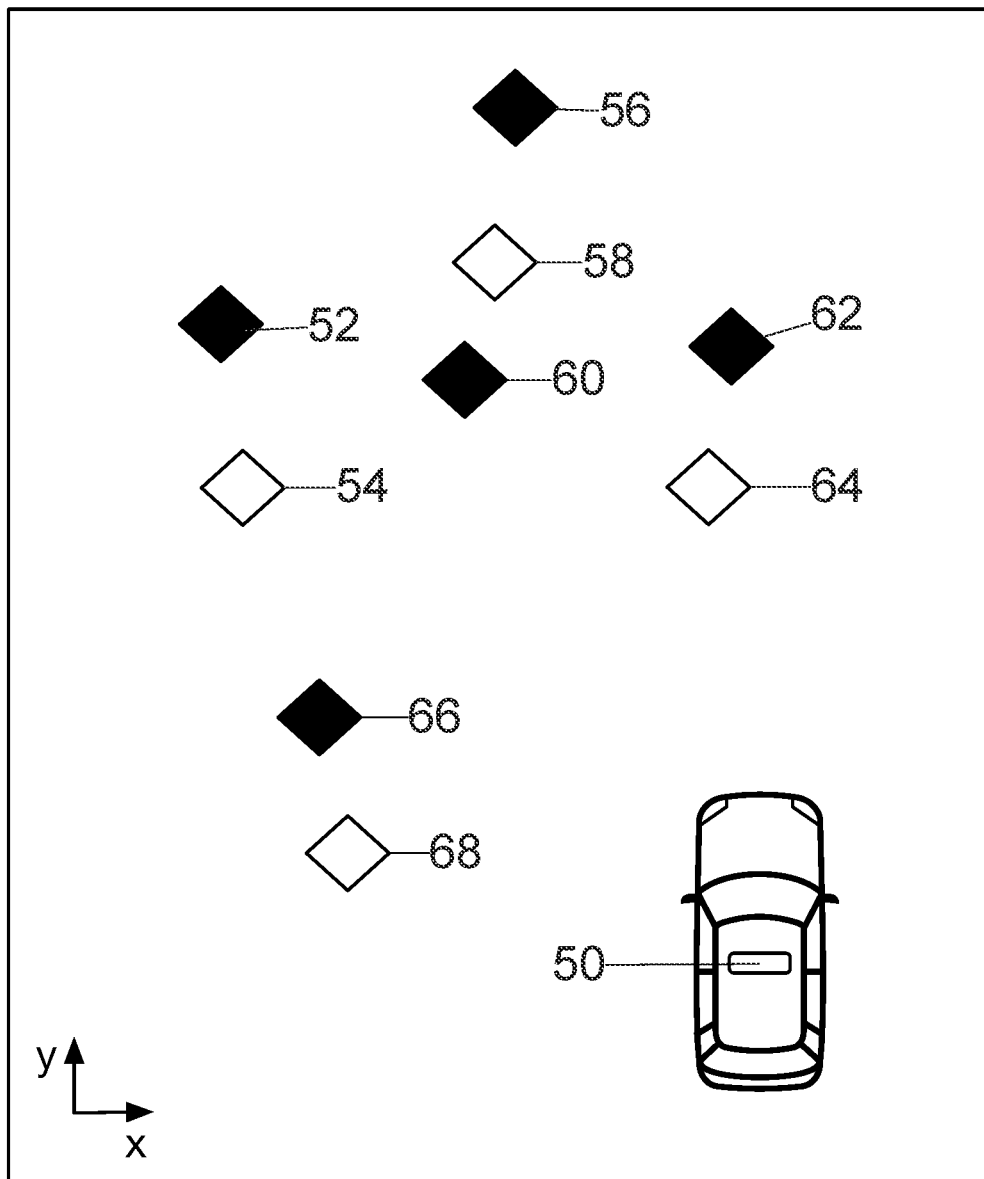
FIG. 1 is an exemplary illustration in 2D of a vehicle, a set of landmarks, and a set of points obtained from the vehicle's measurements.
Figure 2:
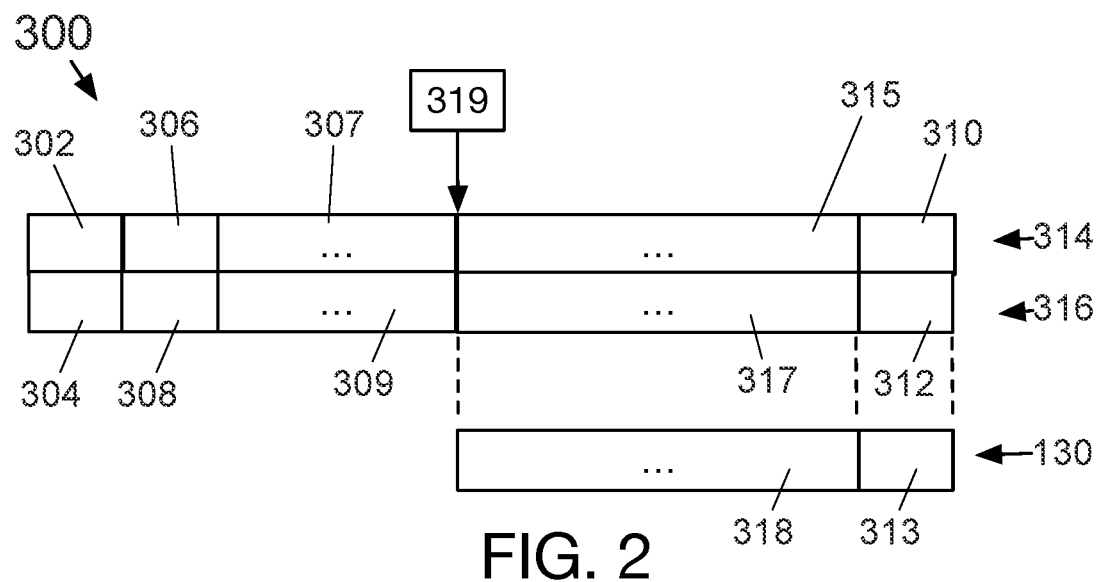
FIG. 2 is a visual illustration of the memory layouts of an exemplary spatial point set in 2D stored as an SoA, a portion divider, and an array of fixed correspondents according to one embodiment.

Referring to FIG. 2, it includes a visual illustration of the memory layouts of an exemplary first spatial point set in 2D, where the x and y coordinates are stored in an SoA 300 that comprises a scalar array 314 that contains the x coordinates and a scalar array 316 that contains the y coordinates, where the x and y coordinates are stored continuously in their respective arrays. Scalar array 314 has a first element 302, a second element 306, a first collection of elements 307, a second collection of elements 315, and a last element 310; scalar array 316 has a first element 304, a second element 308, a first collection of elements 309, a second collection of elements 317, and a last element 312. According to one embodiment, the point ids are the offsets in either scalar arrays. Elements 302 and 304 contain the x and y coordinates of the point whose point id is 0, elements 306 and 308 contain the x and y coordinates of the point whose point id is 1, collection of elements 307 and collection of elements 309 contain the x and y coordinates of a set of points whose point ids start with 2 and so on, until at the end, elements 310 and 312 contain the coordinates of the last point whose point id is M−1, where M is the number of points in the point set. Each element could contain an integer, a floating point number, or a rational number depending on the embodiment and its choice of data formats. In an embodiment in 3D, there is an additional array containing the z coordinates (not shown). Scalar arrays 314 and 316 can be stored one after the other with or without paddings, or at separate places.

Elements 302 and 304 together is also referred to as the first element or the 0-th element of SoA 300, Elements 306 and 308 together is also referred to as the second element or the 1-st element of SoA 300 and so on. Elements 302, 306, collection of elements 307 together with their counter parts 304, 308 and 309 in scalar array 316 as a whole is referred to as the first non-isolated portion of SoA 300. Collection of elements 315, element 310 together with their counter parts 317 and 312 in scalar array 316 as a whole is referred to as the second constrained portion of SoA 300.

Each point in the first non-isolated portion is non-isolated, meaning it has one or more candidate correspondences associated with it. Each point in the second constrained portion is associated with a constraint, the point id of whose end point in the second spatial point set is stored at a respective element in an array of fixed correspondents 130. For example for the point whose coordinates are stored at the first element in the second portion (the first element is not shown), the point id of its constraint's end point in the second spatial point set's point id is stored at the first element of array of fixed correspondents 130 (the first element is also not shown), for the point whose coordinates are stored at the second element in the second portion (the second element is not shown), the point id of its constraint's end point in the second spatial point set is stored at the second element of array of fixed correspondents 130 (the second element is also not shown), and so on, until for the point whose coordinates are stored at the last element that consist of elements 310 and 312 in the second portion, the point id of its constraint's end point in the second spatial point set is stored at last element 313 in array of fixed correspondents 130.

FIG. 2 also shows a portion divider 319. Portion divider 319 is a scalar that stores the offset of the first element of the second portion of SoA 300 relative to the start of SoA 300. It can be used to tell which portion a point id belongs to.

For an exemplary second spatial point set that's stored as an SoA, it needs neither a portion divider nor an array of fixed correspondents, and it doesn't need to be divided into portions.

Figure 12:
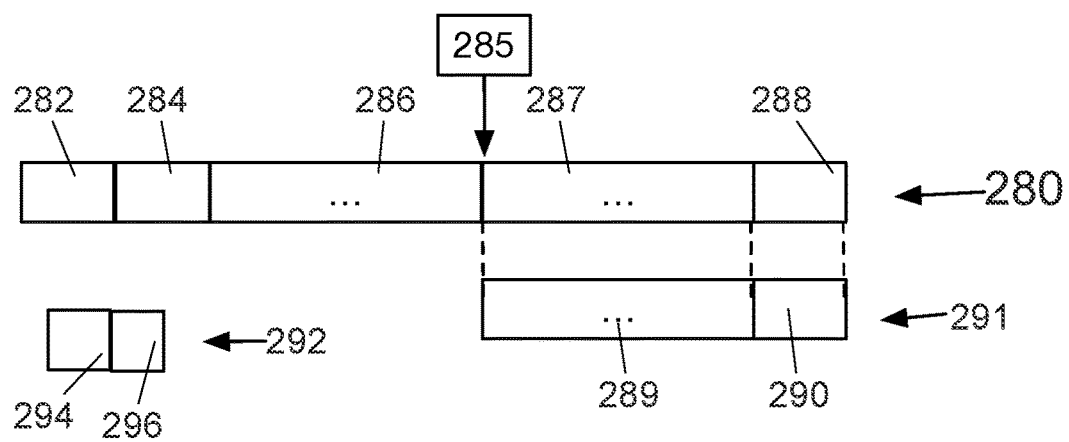
FIG. 12 is a visual illustration of the memory layouts of an exemplary spatial point set in 2D stored as an AoS, a portion divider, and an array of fixed correspondents according to another embodiment.

Referring to FIG. 12, it includes a visual illustration of the memory layouts of an exemplary first spatial point set in 2D, where the x and y coordinates are stored in an array 280 as an AoS. For each point its x and y coordinates are stored together in one 32 bits word containing two FP16 floats. Array 280 has a first structure 282, a second structure 284, a first collection of structures 286, a second collection of structures 287, and a last structures 288. The point ids are the structures' offsets in AoS 280.

Structure 282 contains the x and y coordinates of the point whose point id is 0, structure 284 contains the x and y coordinates of the point whose point id is 1, and so on, until at the end, structure 288 contains the coordinates of the last point whose point id is M−1, where M is the number of points in the first point set. Block 292 shows the details of first structure 282, where its first 16-bits component 294 stores the x coordinate of the point whose point id is 0, and its second 16-bits component 296 stores the y coordinate of the point whose point id is 0.

Structures 282, 284, collection of structures 286 is referred to as the first non-isolated portion of AoS 280. Collection of structures 287 and structure 288 is referred to as the second constrained portion of AoS 280. Each point in the first non-isolated portion has at least one candidate correspondences associated with it. Each point in the second constrained portion is associated with a constraint, the point id of whose end point in the second spatial point set is stored at a respective element in an array of fixed correspondents 291. For example for point whose coordinates are stored at the first structure in the second portion (the first structure is not shown), the point id of its constraint's end point in the second spatial point set is stored at the first element of array of fixed correspondents 291 (the first element is also not shown), for the point whose coordinates are stored at the second structure in the second portion (the second structure is not shown), the point id of its constraint's end point in the second spatial point set is stored at the second element of array of fixed correspondents 291 (the element is also not shown), and so on, until for the point whose coordinates are stored at the last structure 288 in the second portion, the point id of its constraint's end point in the second spatial point set is stored at last element 290 of array of fixed correspondents 291.

FIG. 12 also shows a portion divider 285. Portion divider 285 is a scalar that stores the offset of the first structure of the second portion of AoS 280 relative to the start of AoS 280. It can be used to tell which portion a point id belongs to.

For an exemplary second spatial point set that's stored as an AoS, it needs neither a portion divider nor an array of fixed correspondents, and it doesn't need to be divided into portions.

Figure 3:
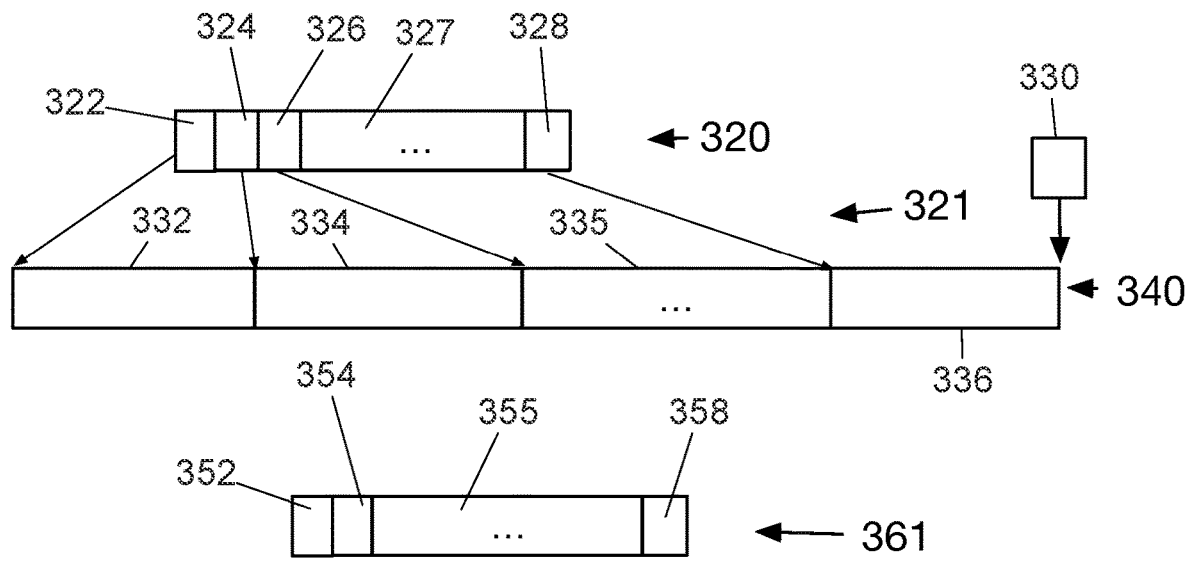
FIG. 3 is a visual illustration of the memory layouts of an exemplary CCISS according to one embodiment where the segments are not uniformly padded.

In this document, a CCISS contains a set of candidate correspondences between the non-isolated portion of a first spatial point set and a second spatial point set, and the set of candidate correspondences are grouped into separate sets according to their non-isolated end points in the first non-isolated portion of the first point set. Referring to FIG. 3, it includes a visual illustration of the memory layouts of an exemplary candidate-correspondences-in-separate-sets (CCISS). According to one embodiment, the separate sets of candidate correspondences comprise two scalar arrays 320 and 340, and it also includes an optional array of bases 361. Array 340 concatenates non-overlapping segments 332, 334, an aggregation of one or more segments 335, and last segment 336. The number of segments in array 340 is equivalent to the number of the members of the first portion of non-isolated points of the first point set.

According to one embodiment, the offsets of the scalar elements (not the values of the elements) in array 320 are the same as the point ids of the non-isolated portion of a first spatial point set for example as shown in FIG. 2, i.e., an offset i that is used to access the coordinates of a non-isolated point whose point id is i in the first non-isolated portion of SoA 300 is used to access the respective element in array 320 that contains the start offset of the corresponding segment in array 340, where the segment contains the point ids of the end points in the second point set of point i's separate set of candidate correspondences. Thus the first segment in array 340 contains the point ids in the second point set of all of the candidate correspondences whose end points in the first point set all have point id 0 and the coordinates are stored in elements 302 and 304, the second segment in array 340 contains the point ids in the second point set of all of the candidate correspondences whose end points in the first point set all have point id 1 and the coordinates are stored in elements 306 and 308 and so on until last segment 336 in array 340 and the last element (not shown) in the first portion of SoA 300. Each segment in array 340 together with the offset of its corresponding element in array 320 define one separate set of the separate sets of candidate correspondences. (Alternatively, if using FIG. 12 the relationship can be derived similarly by replacing SoA 300 with AoS 280 and replacing the elements with corresponding structures.) As illustrated in the figure using arrow-headed lines 321, array 320 has a first element 322 that contains the start offset of first segment 332 (the start offset in this case is 0 and it can be omitted in another embodiment, so that when looking for the start offset of the respective segment of point id 0, 0 is directly returned without looking into array 320); a second element 324 that contains the start offset of second segment 334 in array 340; a third element 326 that contains the start offset of the first segment (not shown) of aggregation of one or more segments 335; collection of elements 327 that contain the start offsets of the remaining segments in aggregation of one or more segments 335; and last element 328 that contains the start offset of last segment 336 in array 340. Finally, in some embodiment there is an optional separate element 330 that contains the offset right after last segment 336, that is, if one appends one more segment right after last segment 336 in array 340, it would contain the offset into the beginning of this appended segment. Separate element 330 can be used for example for boundary checking. Thus the value stored at each element in array 340 together with the offset of the corresponding element in array 320 that contains the start offset of the element in array 340's segment are the two point ids of the two end points of a candidate correspondence, and each candidate correspondence can be uniquely identified by its offset in array 340. A candidate correspondence can also be uniquely identified within its segment and equivalently its separate set of candidate correspondences by its offset from the start of its segment. It's important to differentiate between the index of a candidate correspondence and the index of the candidate correspondence in its separate set of candidate correspondences: the former identifies the candidate correspondence within all the candidate correspondences and the later identifies it within those that share with it the same end point in the first point set.

Alternatively according to another embodiment, array 340 is itself an SoA or AoS of candidate correspondences, where each element or structure contains two point ids of a candidate correspondence, and the elements or structures are grouped into segments indexed by the elements of array 320 as described above.

FIG. 3 also shows an optional array of bases 361 containing the number of the candidate correspondences defined by the respective segments in array 340 in the order that the segments appear in array 340. It has a first element 352, second element 354, a collection of elements 355, and a last element 358. Element 352 contains the number of the candidate correspondences defined by the elements of first segment 332 and the offset of the segment's corresponding element in array 320, element 354 contains the number of the candidate correspondences defined by the elements of second segment 334 and the offset of the segment's corresponding element in array 320, a collection of elements 355 contain the numbers of the candidate correspondences defined in the segments contained in aggregation of one or more segments 335, and last element 358 contains the number of the candidate correspondences defined by the elements of last segment 336 and the offset of the segment's corresponding element in array 320.

Figure 4:
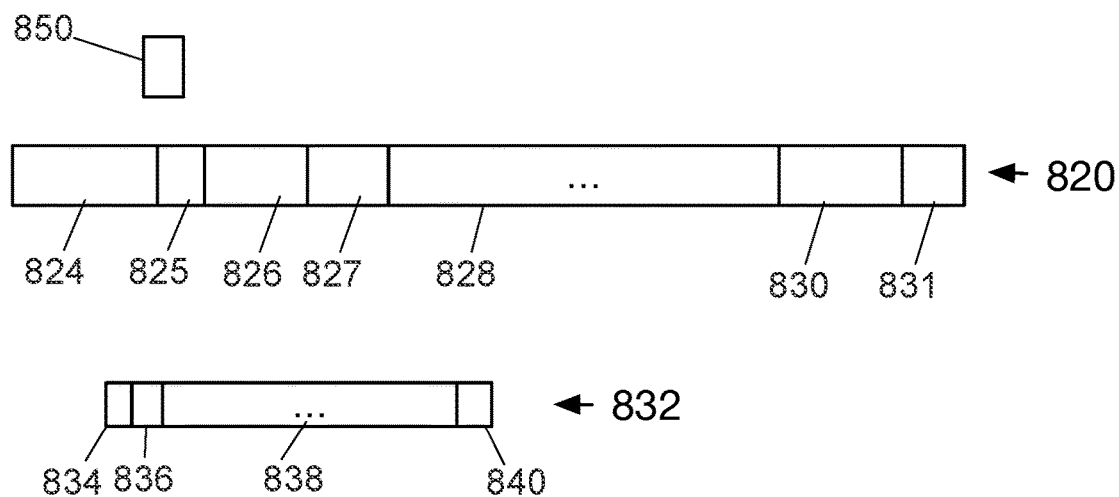
FIG. 4 shows the memory layouts of an exemplary uniformly padded CCISS according to one embodiment.

Referring to FIG. 4, it shows a CCISS containing uniformly padded segments according to another embodiment. The CCISS includes a padded length 850, a scalar array 820, and an array of bases 832.

Scalar array 820 concatenates one or more non-overlapping segments and their paddings. In this example, it includes a first segment 824, a first padding 825, a second segment 826, a second padding 827, a collection of segments and paddings 828, a last segment 830, and a last padding 831. First segment 824 and first padding 825 together is referred to as the first padded segment of array 820, second segment 826 and second padding 827 together is referred to as the second padded segment of array 820 and so on.

In this document we differentiate the "start offset" of a padded segment and the "index" of the padded segment. The start offset of a padded segment refers to the number of structures (for an AoS) or elements (for an SoA) before the first structure or element of the padded segment in the array that the padded segment belongs to; the index of a padded segment refers to the number of padded segments before the padded segment in the array that the padded segment belongs to. The length of a segment refers to the number of elements/structures stored in the segment, while the padded length of a padded segment refers to the number of elements/structures including padding elements/padding segments stored in the padded segment.

The number of (padded) segments in array 820 is equal to the number of the members of the first non-isolated portion in a first point set, and the indices (not offsets) of the padded segments are the same as the point ids of the members of the non-isolated portion in the first spatial point set, i.e., an offset i that is used to access the coordinates of the point whose point id is i in the first non-isolated portion of SoA 300 or AoS 280 is used to access the respective padded segment in scalar array 820, the segment of the padded segment contains the point ids of the end points in the second point set of point i's separate set of candidate correspondences.

First segment 824 in array 820 contains the point ids in the second point set of all the candidate correspondences whose end points in the first point set have point id 0, second segment 826 contains the point ids in the second point set of all the candidate correspondences whose end points in the first point set have point id 1 and so on. Each segment corresponds to one of the separate sets of candidate correspondences. Padded length 850 is computed similarly as that of a two-level indexing structure for (n+1) combinations discussed later in this document. For example it can be an integer that's at least as much as the maximum segment length and also satisfies the alignment requirement when converted to bytes. Array of bases 832 is similar to array of bases 361. It contains the number of candidate correspondences defined by the respective segments or equivalently the length of the segments in array 820, where the numbers are stored consecutively in the same order that the respective segments appear in array 820. It has a first element 834 containing the number of candidate correspondences defined by the elements of first segment 824 and the index of its corresponding padded segment in array 820, a second element 836 containing the number of candidate correspondences defined by the elements of second segment 826 and the index of its corresponding padded segment in array 820, a collection of elements 838 containing the numbers of candidate correspondences in the segments contained in collection of segments and paddings 828, and a last element 840 containing the number of candidate correspondences defined by the elements of last segment 830 and the index of its corresponding padded segment in array 820. For a uniformly padded CCISS, the padding elements in array 820 don't store ends points in the second spatial point set for candidate correspondences, and array of bases 832 is used for boundary checking.

Similar to the alternatives of the CCISS shown in FIG. 3, alternatively according to other embodiments, elements in array 820 may contain tuples representing candidate correspondences.

Figure 5:
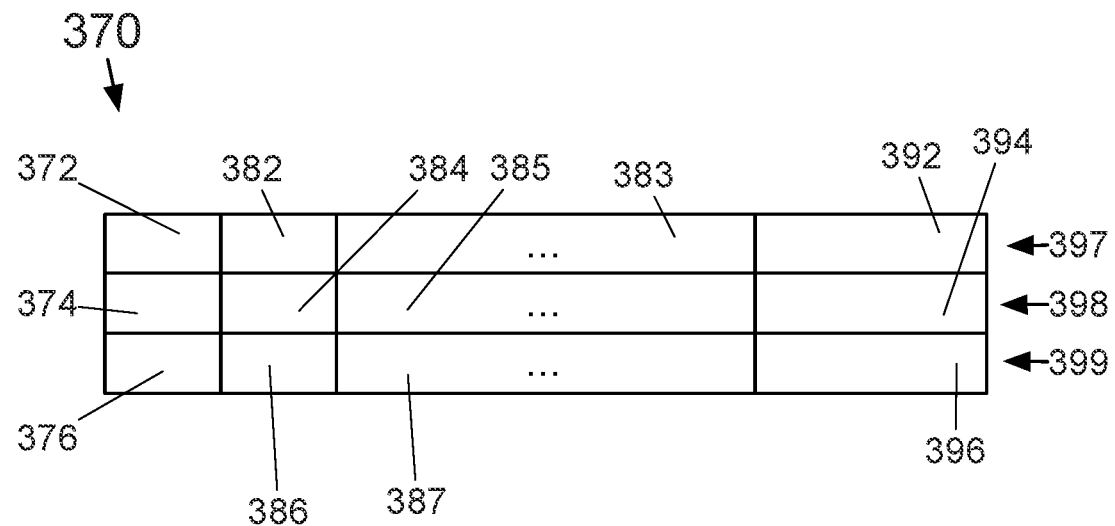
FIG. 5 is a visual illustration of the memory layouts of an exemplary array of (n+1) combinations in 2D stored as an SoA according to one embodiment, where for each (n+1) combination, its vertices are arranged according to the counter clockwise order.

Referring to FIG. 5, it is a visual illustration of the memory layouts of an exemplary array of (n+1) combinations 370 in 2D stored as an SoA, where for each (n+1) combination its vertices are arranged according to the counter clockwise order. SoA 370 comprises a first scalar array 397 containing the point ids of the first vertices of the (n+1) combinations, a second scalar array 398 containing the point ids of the second vertices of the (n+1) combinations, and a third scalar array 399 containing the point ids of the third vertices of the (n+1) combinations. First array 397 contains a first element 372, a second element 382, a collection of elements 383, and a last element 392; second array 398 contains a first element 374, a second element 384, a collection of elements 385, and a last element 394; third array 399 contains a first element 376, a second element 386, a collection of elements 387, and a last element 396. First elements 372, 374, 376 contain the point ids of the three vertices of the first (n+1) combination according to the counter clockwise order, meaning if one traverses the points contained in first elements 372, 374 and 376 in this order in a plane, the order will be counter clockwise. The first elements are indexed by 0, which is just the first elements' offsets in the scalar arrays. The collection of first elements 372, 374 and 376 are referred to as the first element at offset 0 of SoA 370. Second elements 382, 384, 386 contain the point ids of the three vertices of the second (n+1) combination stored according to the counter clockwise order, and they are indexed by 1. The collection of second elements 382, 284, 386 are referred to as the second element at offset 1 of SoA 370. Last elements 392, 394, and 396 contain the point ids of the three vertices of the last (n+1) combination stored according to the counter clockwise order, they are indexed by N−1, where N is the number of (n+1) combinations. Alternatively in another embodiment (not shown) in 2D, an array of (n+1) combinations is stored as an AoS, where each padded structure of 32 bits contains 3 components each of 8 bits followed by a padding component of 8 bits. For each padded structure, the first 3 components store an (n+1) combination's vertices' point ids according to the counter clockwise order.

Alternatively, referring to my previous U.S. application Ser. No. 16/783,959 filed on Feb. 6, 2020, vertices can be stored in the ascending order, descending order, or other orders that are suitable as long as other functional units that depend on the order is aware of this and use it consistently.

Figure 6:
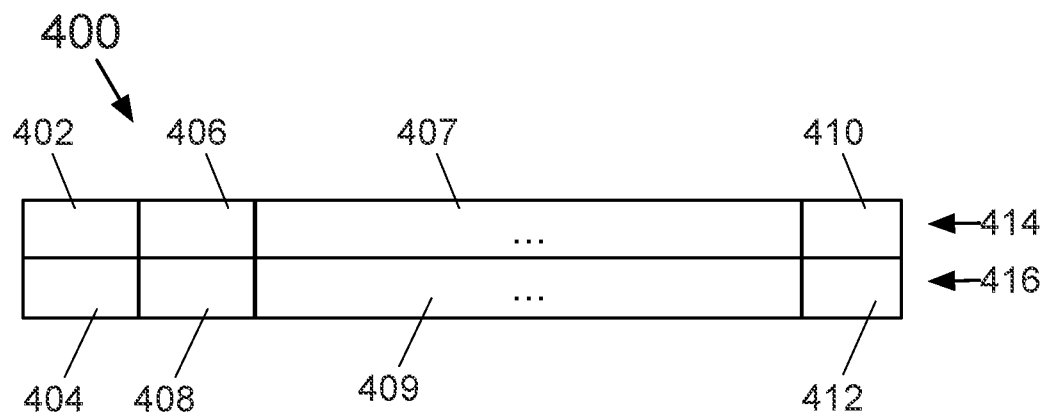
FIG. 6 is a visual illustration of the memory layouts of an exemplary array of pairs of neighbor (n+1) combinations stored as an SoA according to one embodiment.

Referring to FIG. 6, it is a visual illustration of the memory layouts of an exemplary array of pairs of neighbor (n+1) combinations 400 stored as an SoA. SoA 400 comprises a first scalar array 414 containing the first (n+1) combination indices of the array of pairs of neighbor (n+1) combinations, and a second array 416 containing the second (n+1) combinations indices of the array of neighbor (n+1) combinations. First array 414 contains a first element 402, a second element 406, a collection of elements 407, and a last element 410. Second array 416 contains a first element 404, a second element 408, a collection of elements 409, and a last element 412. First elements 402 and 404 contain the two (n+1) combination indices of the first (a.k.a. 0-th) pair of neighbor (n+1) combinations; second elements 406 and 408 contain the two (n+1) combination indices of the second (a.k.a. 1-st) pair of neighbor (n+1) combinations and so on. Last elements 410 and 412 contain the two (n+1) combination indices of the last pair of neighbor (n+1) combinations, which is indexed by index K−1, where K is the number of pairs of neighbor (n+1) combinations. We'll refer to the offset/index of a pair of neighbor (n+1) combinations in an array of pairs of neighbor (n+1) combinations a pair index. Alternatively an array of pairs of neighbor (n+1) combinations can be stored as an AoS, where each 32 bits stores two (n+1) combination indices. Alternatively in another embodiment, an array of pairs of neighbor (n+1) combinations store for each pair of neighbor (n+1) combination the two n+1 point ids of its two (n+1) combinations in an SoA or AoS, where the two n+1 point ids may not be all distinct, and each n+1 point ids of the two n+1 point ids may be stored in various orders according to the embodiment.

According to some embodiments, MU 100 receives a first and a second spatial point sets in nD, n=2 or 3 as an array stored either as an AoS or as an SoA, where there is no isolated points in the first point set, the first spatial point set has a first non-empty non-isolated portion of non-isolated points and a second non-empty constrained portion of constrained points. MU 100 also receives an array of fixed correspondents for the constrained portion and a CCISS or a padded CCISS between the members of the non-isolated portion and the points in the second spatial point set. Use these inputs, MU 100 computes an optimal N-to-1 mapping using its units.

Applications can generate candidate correspondences in the form of a CCISS or a padded CCISS for example either according to the gate areas or by comparing the feature vectors iteratively for each of the points in the first spatial point set. Alternatively procedures were discussed in my previous U.S. Application Ser. No. 16/83,959 filed on Feb. 6, 2020 to generate a CCISS or a padded CCISS from a collection of candidate correspondences that are not already grouped into their separate sets according to their end points in the first spatial point set, except for this time it's limited to the first portion of non-isolated points.

Mapping Generation Unit

Referring to FIG. 9, MU 100 comprises an exemplary Mapping Generation Unit (MGU) 106. Mapping Generation Unit (MGU) 106 receives a CCISS or a padded CCISS between the first non-isolated portion of a first spatial point set (where there is no isolated points) and a second spatial point set and use it to generate a set of tuples representing a set of N-to-1 mappings between the points of the first non-isolated portion and the points of the second spatial point set.

Figure 10:
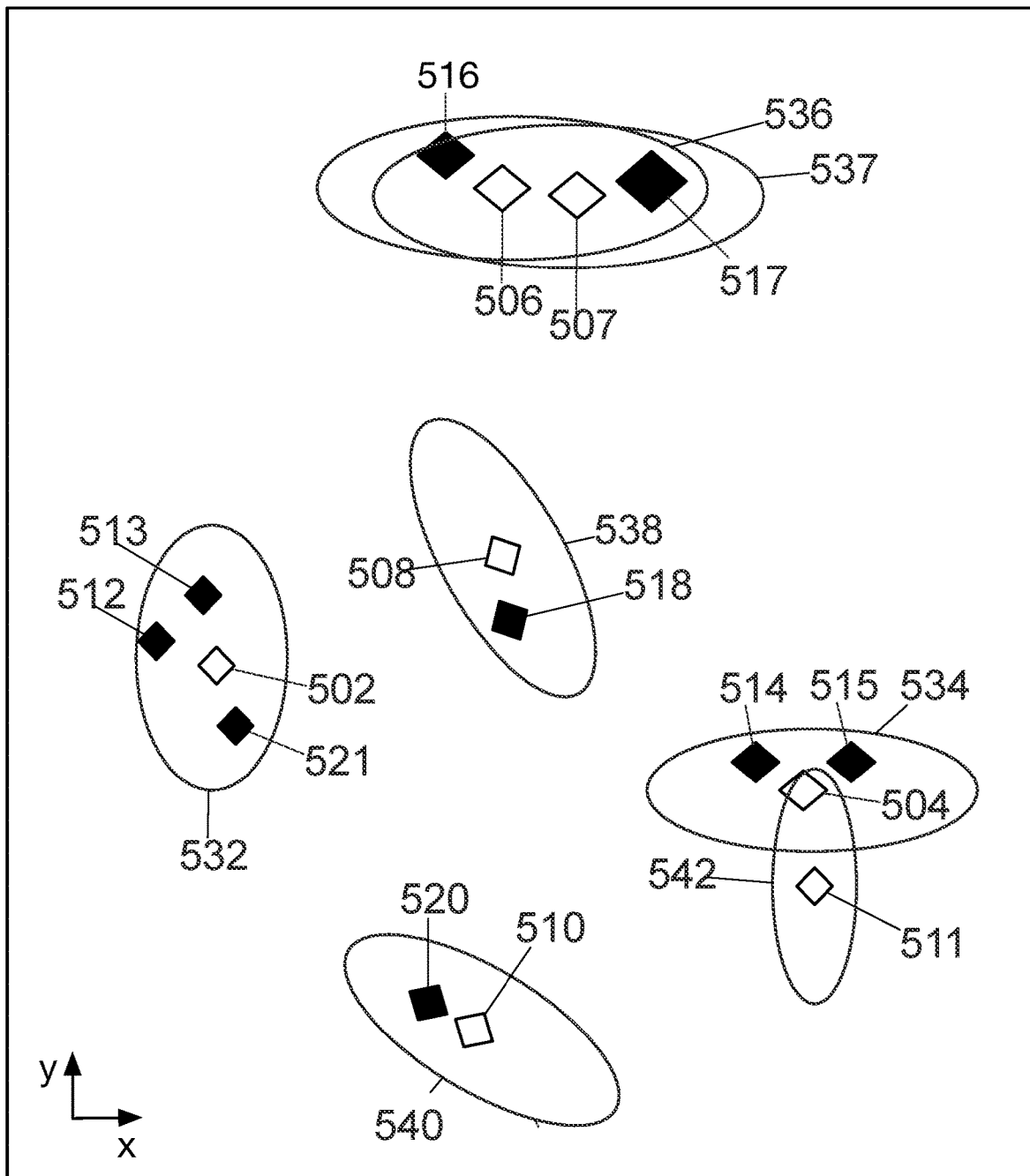
FIG. 10 shows two point sets in 2D where the first point set is represented by white diamonds and the second point set is represented by black diamonds. The points in the first point set are illustrated with their gate areas.

FIG. 10 shows an exemplary scenario in 2D for illustration purpose. It shows a first point set 502, 504, 506, 507, 508, 510, 511, and a second point set 512, 513, 514, 515, 516, 517, 518, 520 and 521. For point 502, there is a gate area 532. Since points 512, 513 and 521 in the second point set are within the gate area, we have one separate set of candidate correspondences for point 502: {(502, 512), (502, 513), (502, 521)}. Similarly, for point 504 it has a gate area 534 that contributes a separate of candidate correspondences {(504, 514), (504, 515)}. Points 506 and 507 has gate areas 536 and 537 respectively, which contributes two separate sets of candidate correspondences {(506, 516), (506, 517)} and {(507, 516), (507, 517)}. Point 508 has gate area 538. It is constrained and its sole correspondent is 518. Point 510 has a gate area 540, it is constrained and its sole correspondent is 520. Point 511 has gate area 542, but since there's no points from the other point set in its gate area, there is no candidate correspondences for this point and it does not enter the computations.

With the separate sets of candidate correspondences: {(502, 512), (502, 513), (502, 521)}, {(504, 514), (504, 515)}, {(506, 516), (506, 517)}, {(507, 516), (507, 517)}, the number of resulting N-to-1 mappings is computed as follows: $\Pi_{j=0, \ldots, (Y-1), n_j \neq 0} n_j = 24$, where $n_j$ is the number of candidate correspondences that have the point of the first non-isolated portion whose point id is j in the first point set as one of its end points, and Y=4 in this case is the total number of points in the first non-isolated portion in the first spatial point set.

The resulting set of N-to-1 mappings contains the Cartesian products of the separate sets: {(502,512),(502,513), (502,521)}×{(504,514),(504,515)}×{(506,516), (506,517)}×{(507,516), (507,517)}, which includes 24 N-to-1 mappings:

{(502,512), (504,514), (506,516), (507,516)},
{(502,513), (504,514), (506,516), (507,516)},
{(502,521), (504,514), (506,516), (507,516)},
{(502,512), (504,515), (506,516), (507,516)},
{(502,513), (504,515), (506,516), (507,516)},
{(502,521), (504,515), (506,516), (507,516)},
{(502,512), (504,514), (506,517), (507,516)},
{(502,513), (504,514), (506,517), (507,516)},
{(502,521), (504,514), (506,517), (507,516)},
{(502,512), (504,515), (506,517), (507,516)},
{(502,513), (504,515), (506,517), (507,516)},
{(502,521), (504,515), (506,517), (507,516)},
. . .

For brevity here I am just listing twelve of the twenty four resultant mappings, the other twelve can be obtained by replacing (507,516) with (507,517) in the first twelve mappings. The results are all N-to-1, and some may not be one-to-one. For example, since point 516 appears simultaneously in two gate areas, in some N-to-1 mappings both points 506 and 507 are associated with it.

The N-to-1 mappings can be computed concurrently by coprocessor 612 using a Mixed Radix Number System that maps between global thread indices of a 1D grid and the N-to-1 mappings. Please refer to "Mixed Radix" retrieved from Wikipedia for more information about Mixed Radix Number Systems. To illustrate this let's still use the scenario shown in FIG. 10 to give a concrete example. One can represent an N-to-1 mapping between the points in the first non-isolated portion of the first spatial point set and the points of the second spatial point set as a tuple of four elements ($i_0$, $i_1$, $i_2$, $i_3$), where $i_0 \in \{0, 1, 2\}$ is an index into the separate set of candidate correspondences associated with point 502: {(502,512), (502,513), (502,521)}, $i_1 \in \{0, 1\}$ is an index into the separate set of candidate correspondences associated with point 504: {(504,514), (504,515)} and so on, assuming that the indices start from 0. Let's denote the size of the separate set of candidate correspondences for point 502 as $n_0=3$, for point 504 as $n_1=2$, for point 506 as $n_2=2$, for point 507 as $n_3=2$. Each tuple can be mapped into an integer as follows:

$$idx = i_0 * \prod_{j=1,2,3} n_j + i_1 * \prod_{j=2,3} n_j + i_2 * n_3 + i_3$$
$$= ((i_0 * n_1 + i_1) * n_2 + i_2) * n_3 + i_3$$

After plugging in the details from this example, we get:

$$idx = i_0 * 8 + i_1 * 4 + i_2 * 2 + i_3$$
$$= ((i_0 * 2 + i_1) * 2 + i_2) * 2 + i_3$$

In general when given M points in the first non-isolated portion of a first spatial point set, and let $n_0, n_1, \ldots, n_{M-1}$ be their respective number of candidate correspondences, then an N-to-1 mapping between the M points and their correspondents can be represented by a tuple of M−1 elements ($i_0, i_1, \ldots, i_{M-1}$), where $0 \le i_j < n_j$, and the tuple can be mapped into an integer as:

$$idx = (\ldots ((i_0 * n_1 + i_1) * n_2 + i_2) \ldots + i_{M-2}) * n_{M-1} + i_{M-1} \quad (1)$$

On the other hand, it's straightforward to map between tuples and Mixed Radix Numbers. For example in the example given above, we can map the tuples into the numbers of a Mixed Radix Number System with four digits, where $i_0$ is mapped to the most significant digit with $n_0$ being its base, and $i_3$ is mapped to the least significant digit with $n_3$ being its base, and the rests in between are mapped accordingly. Alternatively different schemes of mapping can be used. For example in another embodiment the mapping between the digits and the points in the first point set are reversed, $i_0$ now indexes into the separate set of candidate correspondences associated with point 507, $i_1$ now indexes into the separate set of candidate correspondences associated with point 506 and so on. The mapping between the N-to-1 mappings and the integers is also changed accordingly. In fact any one-to-one mapping between the digits and the M points in the first point set can be used as long as it is used consistently.

Back to the general case, this allows us to bijectively map between N-to-1 mappings and a continuous range of integers from 0 to $n_0*n_1* \ldots *n_{M-1}-1$ inclusively through a Mixed Radix Number System with M digits whose j-th digit $i_j$ has base $n_j$. For the other direction, one can iteratively divide a given integer in the range by the bases and record the remainders in the following matter: first divide the integer by the base of the least significant digit and record the remainder, then divide the integral quotient by the base of the second least significant digit and record a second remainder, until all the bases except that of the most significant digit have been divided and all the remainders and the last quotient have been recorded. In order to do this, the bases except for the base of the most significant digit need to be made available, and the number of digits is either stored in memory or it can be hard-coded in the form of the number of iterations if the number of digits is fixed.

This method can be applied to any subset of the first non-isolated portion of a first spatial point set, for example a given (n+1) combination of the first point set where the (n+1) combination's vertices are all members of the first non-isolated portion. The (n+1) local indices of the (n+1) combination can be bijectively mapped into a continuous range of integers from 0 to $n_{m_0}*n_{m_1}* \ldots *n_{m_n}-1$, where $m_0, m_1, \ldots, m_n$ are the point ids of the vertices of the (n+1) combination, through a Mixed Radix Number System of n+1 digits where digit $i_j$ has base $n_{m_j}$.

If one wants to store a fixed sized datum for each of the (n+1) local indices for later retrieval, one can use either an SoA or an AoS that stores $n_{m_0}*n_{m_1}* \ldots *n_{m_n}$ number of elements or structures, where a datum given an (n+1) local index can be stored at the element or structures at the offset of the corresponding integer calculated similar to equation (1) using the Mixed Radix Number System of n+1 digits. I will refer to such an SoA or AoS as a Mixed Radix Indexed Array of the given (n+1) combination. Together the bases of the n least significant digits and the mapping between the digits and the end points of the (n+1) combination is referred to as the Mixed Radix Number System of the Mixed Radix Indexed Array. The Mixed Radix Indexed Array can be queried using the (n+1) combination's (n+1) local indices by converting each of them into a respective integer similar to equation (1). In this case, since the number of digits is fixed to be n+1, it can be hard coded as the number of iterations in both directions.

Similarly the (n+2) local indices of a given pair of neighbor (n+1) combinations of the first point set can be bijectively mapped into a range of integers inclusively from 0 to $n_{m_0}*n_{m_1}* \ldots *n_{m_{n+1}}-1$, where $m_0, m_1, \ldots, m_{n+1}$ are the point ids of the distinct vertices of the pair of neighbor (n+1) combinations and they are all members of the first non-isolated portion. And a Mixed Radix Indexed Array of length $n_{m_0}*n_{m_1}* \ldots *n_{m_{n+1}}$ and its Mixed Radix Number System can be similarly defined. The Array stores a fixed size datum for each (n+2) local index of the pair of neighbor (n+1) combinations.

Now let's generate all the N-to-1 mappings. In the current embodiment, MGU 106 comprises a one dimensional grid whose size is greater than or equal to the number of resulting N-to-1 mappings. Each hardware thread of the grid receives or 'computes and receives' (to be elaborated below) a global thread index, does a necessary boundary checking, then iteratively divides the global thread index by the bases starting from the base associated with the least significant digit until the penultimate base. The remainders and the last quotient are recorded in a tuple that represents an N-to-1 mapping.

Finally, generated tuples are stored in an array of N-to-1 mappings as an SoA or an AoS at the offset of the global thread index in the device memory. In the current embodiment, the N-to-1 mappings are stored in an SoA containing a number of scalar arrays, each scalar array stores the indices into one of the separate sets that MGU 106 receives. For example, the first element (a.k.a. 0-th element) of the first scalar array stores the index into the first separate set of the first/0-th N-to-1 mapping, the second element (a.k.a. the 1-st element) of the first scalar array stores the index into the first separate set of the second/1-st N-to-1 mapping and so on. The first element (a.k.a. the 0-th element) of the second scalar array stores the index into second separate set of the first/0-th N-to-1 mapping and so on. The number of the scalar arrays is the number of the separate sets that MGU 106 receives.

Alternatively block partitioning or cyclic partitioning can be used so that a hardware thread can generate two or more N-to-1 mappings. For example according to another embodiment, each hardware thread of a one dimensional grid receives a global thread index, and use it to generate a predetermined number k of indices using block partitioning from k*idx to (k+1)*idx−1 inclusive where idx stands for the global thread index. The product of the total number of hardware threads of the one-dimensional grid and k is at least the number of resulting N-to-1 mappings. For each of the k indices, if it passes the boundary checking, it generates and stores an N-to-1 mapping as described above.

For a CUDA device, a hardware thread receives a local thread index whose symbol is threadIdx, a block index whose symbol is blockIdx and a block dimensions whose symbol is blockDim. Each of them can be one, two or three dimensional. The local thread index uniquely identifies it within its thread block, and all hardware threads within a thread block share the same block index. In this case of a one dimensional grid the y and z dimensions are trivial, thus a hardware thread computes its global thread index in the x dimension as follows:

idx=blockIdx.x*blockDim.x+threadIdx.x;

For a two or three dimensional grid, the additional dimensions can be accessed in a hardware thread by symbols "blockIdx.y", "blockIdx.z", "blockDim.y", "blockDim.z", "threadIdx.y", and "threadIdx.z", and the global thread indices in the y and z dimensions can be computed similarly.

For an OpenCL device, a hardware thread retrieves the x dimension of its global thread index using the following function call:

idx=get_global_id(0);

For a two dimensional or three dimensional grid, the additional dimensions of the global thread index can be retrieved by calling "get_global_id(1)" and "get_global_id(2)". In addition it can retrieve its local thread indices using "get_local_id(0)", "get_local_id(1)", "get_local_id(2)", and retrieve its block dimensions using "get_local_size(0)", "get_local_size(1)", and "get_local_size(2)".

Pair Generation Unit

PGU 105 receives all the points of a first spatial point set in 2D or 3D stored either as an AoS or as an SoA, where there is no isolated points in the first point set, and generates a triangulation using all the points. Also note that for the purpose of this invention, the triangulation does not need to be Delaunay. For example an approximate Delaunay triangulation can also be used. Then it uses the triangulation to generate a plurality of (n+1) combinations in the first point set and one or more pairs of neighbor (n+1) combinations referencing the plurality of (n+1) combinations.

Referring to my previous U.S. Pat. No. 8,811,772 granted Aug. 19, 2014, and U.S. Pat. No. 8,571,351 granted Oct. 19, 2013, there are various algorithms and software packages that compute Delaunay triangulations. Examples of such algorithms include the radial sweep algorithm, the incremental insertion algorithm, and the divide-and-conquer algorithm. Examples of such packages include Matlab by Mathworks, "Triangle" by Prof. Jonathan Richard Shewchuk at UC Berkley, and the Computational Geometry Algorithms Library (CGAL).

The Delaunay triangulation can be carried out in parallel using multiple CPU cores, using a data-parallel coprocessor, or using a combination of both. For example, referring to "Parallel geometric algorithms for multi-core computers" by Batista et al, it uses a Parallel Incremental Insertion strategy that incrementally inserts new vertices and then uses the Bowyer-Watson method for point insertion that replaces the simplexes in cavities with new ones so that a triangulation remain Delaunay. To do this in parallel, CPU threads lock impacted triangles/tetrahedra while doing insertions to avoid race conditions. Referring to "Computing two-dimensional Delaunay triangulation using graphics hardware" by Rong et al., it uses a hybrid GPU-CPU method to compute Delaunay Triangulations in 2D. Input sites are first mapped to discrete grid points. A GPU is then used to compute a discrete Voronoi diagram using the mapped sites. It then dualizes the discrete Voronoi diagram using an Euclidean coloring of the grid pixels, detects Voronoi vertices, and uses the Voronoi vertices to compute an approximate triangulation. Finally it uses the CPU to transform the approximate triangulation to a Delaunay triangulation. This method can not be easily extended to 3D due to possibly large numbers of combinations of colorings.

As another example, referring to "Delaunay Triangulation in $R^3$ on the GPU" by Ashwin Nanjappa, it introduces a method called gFlip3D that divides input points into batches. The batches are inserted, and then flips are done in parallel on the GPU until no further flips are possible. The result is an approximate Delaunay Triangulation due to the possibility of getting stuck in flipping a NLONT (non-locally-optimal non-transformable) cycles of faces. As yet another example, referring to the same document, it introduces a GPU based method called gStar4D that associates input 3D points with voxels of a discrete grid, builds a discrete Voronoi diagram using the Parallel Banding Algorithm, constructs a working set for each of the input points using the adjacency information in the discrete Voronoi diagram, lifts the input points in a four dimensional space, and then uses the Star Splaying Algorithm in $R^4$ to produce the underside of the convex hull of the lifted input points. The last step involves computing for each lifted input point its 'star' using the points in its working set, and then performing consistency enforcement steps until all the stars are consistent with each other. As yet another example, the same document introduces a hybrid gDel3D algorithm that combines gFlip3D and gStar4D. It first runs gFlip3D on a GPU coupled with a CPU to generate an approximate triangulation, and then runs the Star Splaying Algorithm selectively to repair only the points that are inconsistent on the CPU.

To generate a plurality of (n+1) combinations in the first point set and one or more pairs of neighbor (n+1) combinations referencing the plurality of (n+1) combinations, in 2D it iterates through the internal edges of the triangulation to obtain for each internal edge a pair of neighbor triangles that share the edge. In 3D it iterates through the internal triangles of the 3D triangulation to obtain for each internal triangle a pair of neighbor tetrahedra that share it.

Some embodiments require the vertices of each of the (n+1) combinations be arranged in the counter clockwise order, and the signed area method can be used to rearrange the point ids so they follow the counter clockwise order within each (n+1) combination if not already so.

Index Construction Unit—Two-Level Indexing Structure for (N+1) Combinations

ICU 108 receives a portion divider of a first spatial point set without isolated points stored as in FIG. 2 or FIG. 12, a second spatial point set, a CCISS or a padded CCISS between the first non-isolated portion of the first spatial point set and the second spatial point set, an array of fixed correspondents for the constrained portion of the first spatial point set, an array of (n+1) combinations from PGU 105 generated for a triangulation of the first spatial point set, and an array of solving structures (to be discussed later) generated for the array of (n+1) combinations, and generates a two-level indexing structure for (n+1) combinations to store in it some necessary components of affine transformations (the meaning will also be clarified later) for each (n+1) local index of each of the (n+1) combinations.

According to one embodiment, it comprises two levels where the first level includes a padded length and the second level includes an array of necessary components of affine transformations stored either as an AoS or as an SoA. The array at the second level concatenates one or more non-overlapping segments. It further includes additional paddings between the segments for aligned memory access, so that each segment starts from (or in some other embodiments end with) a byte address that satisfies the alignment requirement, and all of the padded segments contain the same number of elements (or structures for AoS) when we also count their padding elements (or padding structures for AoS). We'll refer to the segments as being uniformly padded, and the number is referred to as the padded length. Different data structures may have different alignment requirements according to not only the hardware architecture but also the size of the structures if it's stored as an AoS.

Each segment in the array at the second level stores a Mixed Radix Indexed Array of necessary components of affine transformations. According to the current embodiment, the number of segments is the number of (n+1) combinations. The length of each segment is equivalent to the number of distinct (n+1) local indices of the corresponding (n+1) combination, which is equivalent to the product of the segment's bases. The lengths are stored in an array of products (to be discussed below).

The indices of the padded segments (in terms of the number of padded segments stored before them) in the array at the second level are the same as the offsets of the respective (n+1) combinations in the array of (n+1) combinations (in terms of the number of (n+1) combinations before them) as for example shown in FIG. 5, i.e., offset i that is used to access the i-th (n+1) combination is also used to access the corresponding padded segment in the array at the second level. Thus given an (n+1) combination index, it can be used to calculate the start offset of the corresponding padded segment in the array at the second level as long as we know the padded length of each padded segment, which can be found in the padded length. If in addition an (n+1) local index of the (n+1) combination is given, it can be used to access the necessary components of a corresponding affine transformation in the segment by calculating a corresponding offset according to the bijective mapping of the Mixed Radix Number System of the segment, assuming that the ordering of the components of the (n+1) local index is consistent with the ordering of the bases.

To compute the padded length, some embodiments find the maximum length of the lengths of all of the segments, where for each segment its length is the number of non-adding elements/non-padding structures in it. The padded length when translated to bytes is the smallest number of bytes satisfying the alignment requirement that is also greater than or equal to the maximum segment length translated to bytes.

Given an (n+1) combination index, to locate the corresponding padded segment in an array at the second level comprising uniformly padded segments stored as an SoA, it involves multiplying the (n+1) combination index by the padded length to obtain the start offset of the start element of the padded segment.

Referring to FIG. 15*a*, it shows an exemplary two-level indexing structure for (n+1) combinations comprising a padded length 752, an array at the second level 753 where the segments are uniformly padded and the padded segments are stored one after the other, an array of products 802, and an optional array of bases 763. Array at the second level 753 is either stored as an AoS or as an SoA. Array at the second level 753 contains a first segment 754, a first padding 755, a second segment 756, a second padding 757, a collection of segments and paddings 758, a last segment 760 and a last padding 761. Thus the total number of structures/elements in first segment 754 together with the number of structures/elements in first padding 755 is equivalent to padded length 752, and same thing can be said for the combined length of each segment and its padding, except that in some embodiments, the last segment's padding may be omitted.

Figure 11:
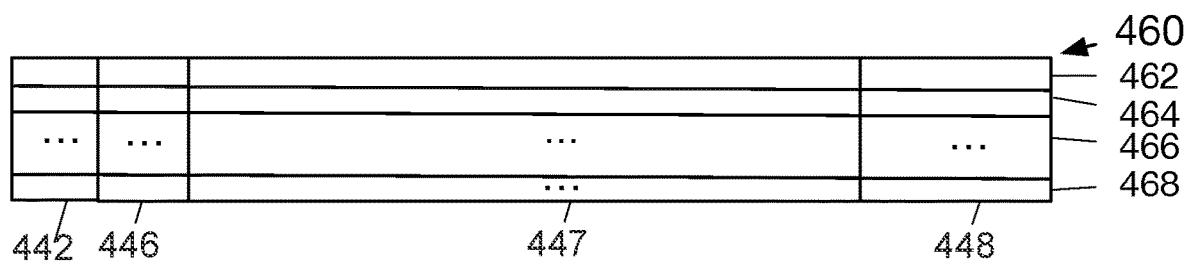
FIG. 11 is a detailed illustration of the memory layouts of first segment 754 in FIG. 15*a* according to one embodiment.

Referring to FIG. 11, block 460 is a more detail illustration of first segment 754 where the array at the second level is stored as an SoA according to one embodiment. It has a first scalar array 462, a second scalar array 464, a collection of scalar arrays 466, and a last scalar array 468, where the scalar arrays have the same length that is equal to the number of elements in the segment. The number of scalar arrays is equal to the number of each element's components. For example in 3D according to one embodiment where it only requires the left sub-matrices of affine transformations for computing local distance measures, 9 scalar arrays are used to record the components of the left sub-matrices. As another example in 3D, affine transformations are used to transform spatial agents, thus 12 scalar arrays are used to store the non-trivial components of the affine transformations.

First segment 754 has a first element 442 whose components are the first elements of the scalar arrays ordered according to the ordering of the scalar arrays. It contains the necessary components of an affine transformation generated for the 0-th (n+1) local index of the 0-th (n+1) combination, meaning the (n+1) local index whose corresponding integer in the range of integers is 0 according to the segment's bijective mapping, a second element 446 whose components are the second elements of the scalar arrays ordered according to the ordering of the scalar arrays. It contains the necessary components of an affine transformation generated for the 1-st (n+1) local index of the 0-th (n+1) combination, meaning the (n+1) local index whose corresponding integer in the range of integers is 1 according to the segment's bijective mapping. It contains a last element 448 that contains the necessary components of an affine transformation generated for the last (n+1) local index of the 0-th (n+1) combination, and a collections of elements 447 that contain the necessary components of the affine transformations of the remaining (n+1) local indices of the 0-th (n+1) combination, where the elements are ordered according to their corresponding integers in the range of integers, and the within each element the components are ordered according to the ordering of their respective scalar arrays.

Similarly imagine a detailed illustration of second segment 756 (not shown), it has the same number of scalar arrays of equal length, and its first element will contain the necessary components of the affine transformation generated for the 0-th (n+1) local index of the 1-st (n+1) combination and so on. Similarly imagine a detailed illustration of first padding 755 (not shown), it contains the same number of scalar arrays as the number of scalar arrays in first segment 754, where the scalar arrays have the same length and the length is equal to the number of the padding elements of the first segment. According to the current embodiment, all the segments and paddings have the same number of scalar arrays. The scalar arrays of first padding 755 are concatenated after the respective scalar arrays of first segment 754, then the scalar arrays of second segment 756 are concatenated after the respective scalar arrays of first padding 755 and so on as illustrated in FIG. 15*a*. Thus the scalar arrays of the segments and the paddings interleaves each other forms a first global scalar array of the array at the second level. Similar things can be said about the other global scalar arrays of the array of the second level.

Still assuming SoA, according to one embodiment where the last segment is also uniformly padded, the global scalar arrays are stored consecutively one after the other, and the global scalar arrays other than the first one can be accessed using an optional global array length 751 shown in FIG. 15*a* that stores the total number of elements in all the padded segments including paddings elements. In another embodiment where the last segment is also uniformly padded, the global array length is omitted and the total number of elements is calculated as the product of the number of (n+1) combinations and the padded length.

Alternatively according to another embodiment but still assuming SoA, it uses a two-level indexing structure for (n+1) combinations where the padded length is replaced by an array at the first level. Padded segments in the array at the second level still satisfy the alignment requirements but are not uniformly padded. The offsets of the elements (not the values of the elements) in the array at the first level are the same as the offsets of the (n+1) combinations in an array of (n+1) combinations for example as shown in FIG. 5, i.e., offset i that is used to access the i-th (n+1) combination is also used to access the i-th element in the array at the first level, where the i-th element contains the start offset of the i-th (n+1) combination's corresponding padded segment in an array at the second level. Thus given an (n+1) combination index, it can be used to retrieve from the array at the first level the start offset of the corresponding padded segment in the array at the second level. Since the first element of an array at the first level contains 0, it can be omitted or used for other purposes. Alternatively, according to yet another embodiment, each element of the array at the first level contains the starting address of a separate segment, where the segments are allocated separately in the device memory instead of being stored one after the other in a single array at the second level with or without paddings.

The two-level indexing structure for (n+1) combinations shown in FIG. 15*a* comprises an optional array of bases 763 stored either as an AoS or as an SoA. For example in one embodiment, array of bases 763 is stored as an SoA. The SoA contains n scalar arrays, where n is the space dimension, and the least significant bases, i.e. the bases of the least significant digits, are stored continuously in the first scalar array, the bases of the second least significant digits are stored continuously in the second scalar array and so on. In an alternative embodiment it may comprise an additional scalar array to store the bases of the most significant digits.

Array of bases 763 contains a first element 762 that contains the bases of (the n least significant digits of the Mixed Radix Number System of the Mixed Radix Index Array stored in) first segment 754, a second element 764 that contains those of second segment 756, a collection of bases 765 for the segments in collection of segments and paddings 758, and a last element 766 that contains the bases of last segment 760, where each element contains the n bases for the n least significant digits of a segment.

The two-level indexing structure for (n+1) combinations comprises an array of products 802. It has a first element 804 that contains the length of first segment 754 that is equal to the product of the n+1 bases of first segment 754, a second element 806 that contains the length of second segment 756 that is equal to the product of the n+1 bases of second segment 756, a collection of elements 808 that contain the lengths of the segments stored in collection of segments and paddings 758, and a last element 810 that contains the length of last segment 760 that is equal to the product of the n+1 bases of last segment 760. Array of products 802 is used for computing grid sizes, computing memory requirements, and doing boundary checkings for hardware threads as we'll see later.

The offsets of the elements in array of products 802 are the same as the offsets of their respective (n+1) combinations in the input array of (n+1) combinations for example as shown in FIG. 5. This also applies to array of bases 763.

Referring to FIG. 15*b*, it shows a series of steps for constructing a two-level indexing structure for (n+1) combinations as shown in FIG. 15*a* according to one embodiment where the array at the second level is stored as an SoA.

At step 770, it receives an input array of (n+1) combinations, allocates and fills array of products 802 and array of bases 763. After allocating array of products 802, it launches a one dimensional grid on the coprocessor, where the size of the grid is at least as much as the number of (n+1) combinations. For example an embodiment uses the CUDA programming model and launches a grid that has a non-trivial x component in its block dimensions and a non-trivial x component in its grid dimensions. The total number of hardware threads is the product of the x component of the block dimensions and the x component of the grid dimensions, assuming that each hardware thread handles one (n+1) combination. Unless the number of (n+1) combinations is an integral multiple of the x component of the block dimensions, there will be extra hardware threads that are not mapped to (n+1) combinations.

A hardware thread of the grid generates a global thread index, does a necessary boundary checking, maps the global thread index into an (n+1) combination index for example by regarding the global thread index as an (n+1) combination index if it passes the boundary checking, retrieves the corresponding (n+1) combination using the (n+1) combination index from the array of (n+1) combinations, retrieves the (n+1) combination's n+1 bases, multiplies together the n+1 bases to obtain a product, and stores the product in array of products 802 at the offset of the (n+1) combination index. If array of bases 763 is also allocated, it also stores the n bases of the n least significant digits into array of bases 763 at the offset of the (n+1) combination index. According to the current embodiment, the ordering of the bases follows the ordering of the corresponding members of the (n+1) combination. Alternatively the products and the bases can be computed and retrieved in the host memory by one or more CPU threads and then copied to the device memory. When it retrieves the (n+1) combination's n+1 bases, it compares the (n+1) combination's members with the portion divider, and for those that belong to the first non-isolated portion their respective bases are retrieved from the CCISS or the padded CCISS, otherwise the bases are fixed to be 1, meaning that all the members of the (n+1) combination that belong to the constrained portion have unique correspondents provided by the array of fixed correspondents.

At step 772, it computes and stores padded length 752. It also optionally computes and stores global array length 751. In one embodiment this involves carrying out a parallel reduction on array of products 802 to find the maximum segment length which can be computed by either iterating through the segment lengths or doing a parallel reduction, converting the maximum segment length to the corresponding number of bytes that is the product of the maximum segment length and the number of bytes in each necessary component, rounding the number of bytes up to the smallest integer satisfying the alignment requirement that is greater than or equal to it, and dividing the smallest integer by the number of bytes in each necessary component to convert it back to a number of elements. Alternatively this can also be carried out by one or more CPU threads, and the result is copied to padded length 752 in device memory. In the current embodiment, global array length 751 stores the product of the number of segments and the padded length. In another embodiment, it evaluates "(number of segments−1)*padded length+length of the last segment" and store the result into global array length 751.

At step 774, it allocates an array at the second level 753 in the device memory using the results computed above, where the start address of the array at the second level satisfies the alignment requirement.

At step 776, it fills in the array at the second level in the device memory with values. To do this, according to one embodiment, ICU 108 launches a one or two dimensional grid on the coprocessor, where the hardware threads carry out the steps in subprocess 1050 in FIG. 15c using the SIMD cores, and the number of hardware threads is at least as much as the global array length discussed earlier, where the global array length is computed at runtime at this step if it's not already computed and stored at step 772.

Referring to FIG. 15c, it illustrates the sub-steps carried out by the grid's hardware threads according to some embodiments. At step 1052 a hardware thread receives a global thread index.

At step 1054, it obtains from the global thread index an (n+1) combination index that is used to locate a padded segment, and a second offset that relative to the start offset of the padded segment and is used to index into the padded segment. If it is a one dimensional grid, the x dimension of the global thread index is divided by the padded length, the integral quotient is regarded as the (n+1) combination index and the remainder is regarded as the second offset.

If alternatively the grid is two dimensional such that its y dimension is at least as much as the number of padded segments, and its x dimension is at least as much as the padded length, then the x component of the global thread index is regarded as the second offset, and the y component is regarded as the (n+1) combination/padded segment index.

The number of (n+1) combinations can be used to boundary check the validity of the (n+1) combination index, and array of products 802 can be used to boundary check if the second offset refers to a padding element.

At step 1056, it uses the (n+1) combination index to retrieve the corresponding (n+1) combination from an array of (n+1) combinations.

At step 1058, it retrieves the corresponding bases from array of bases 763 at the offset of the (n+1) combination index.

At step 1060, it computes an (n+1) local index containing n+1 indices of n+1 candidate correspondences in their separate sets of candidate correspondences by iteratively dividing the second offset by the bases of the n least significant digits and records the remainders and the last quotient.

At step 1062, if a CCISS as shown in FIG. 3 is used, the members of the (n+1) combination retrieved at step 1056 are compared with the portion divider, only for those that belong to the first non-isolated portion their point ids are used as offsets to retrieve from array 320 the start offsets of their respective segments in array 340.

Alternatively if a padded CCISS as shown in FIG. 4 is used, the members of the (n+1) combination retrieved at step 1056 are compared with the portion divider, only for those that belong to the first non-isolated portion their point ids are multiplied with the padded length to obtain the corresponding start offsets of their respective padded segments in the padded CCISS.

At step 1064, for the members of the (n+1) combination retrieved at step 1056 in FIG. 15c that belong to the first non-isolated portion, their correspondents' point ids are retrieved from the respective segments or padded segments whose start offsets are retrieved at step 1062 in FIG. 15c at the offsets of their respective members in the (n+1) local index, otherwise for those that are constrained, their correspondents' point ids are retrieved from the respective elements of the array of fixed correspondents. It's possible that the n+1 correspondents' point ids are not distinct, nevertheless together they make an (n+1) correspondent of the (n+1) combination.

At step 1066, it retrieves the coordinates of the members of the (n+1) correspondent from the second point set.

At step 1068, it retrieves the corresponding solving structure from the array of solving structures at the offset of the (n+1) combination index.

At step 1070, it applies the solving structure to the coordinates retrieved at step 1066 to compute some necessary components of an affine transformation using ACU 112, where exactly what components are necessary depends on the embodiment, and it'll be clarified later.

At step 1072, it stores the components into the array at the second level allocated at step 774. To do this it uses the (n+1) combination index to compute the offset of the corresponding padded segment in the array at the second level. It then locates the element in the segment of the padded segment at the offset of the second offset relative to the start of the segment, and stores the components into the element.

At various steps the orderings of the components of two relevant tuples are required to be consistent with each other, where each start offset computed at step 1062 is paired together with a component of the (n+1) local index such that they correspond to the same component of the (n+1) combination, and the ordering among the correspondents in the (n+1) correspondent retrieved at step 1064 follows the ordering of their respective components in the (n+1) combination.

At step 1066, the coordinates are arranged according to the ordering of the members of the (n+1) correspondent retrieved at step 1064. The solving structure retrieved at step 1068 is computed with the coordinates arranged according to the ordering of the members of the (n+1) combination. Thus at step 1070, the solving structure is applied correctly to the coordinates of the members of the (n+1) correspondent, so that the numerics reflects that each point is transformed to its correspondent. Alternatively other schemes may be used if used consistently, for example another embodiment may require each relevant tuple's members be ordered according to the ascending or descending ordering of the members of the (n+1) combination.

Referring to FIG. 15d, it illustrates the steps carried out by a hardware thread to query a two-level indexing structures for (n+1) combinations as shown in FIG. 15a to retrieve the necessary components of an affine transformation given an (n+1) combination index and an (n+1) local index according to one embodiment.

At step 1080 it receives an (n+1) combination index and an (n+1) local index.

At step 1082, it multiplies the (n+1) combination index by the padded length to compute the start offset of the corresponding padded segment in the array at the second level.

At step 1084 it retrieves the corresponding bases from array of bases 763 at the offset of the (n+1) combination index.

At step 1086, it computes a second offset using the bases and the n+1 members of the (n+1) local index according to equation (1) with M being set to n+1, and the resultant second offset is at the left hand side of the equation. The second offset is relative to the start of the segment of the corresponding padded segment whose start offset was retrieved at step 1082.

At step 1088, it retrieves the element at the second offset computed at step 1086 relative to the start of the segment.

Alternatively in another embodiment the array at the second level of a two-level indexing structure for (n+1) combinations is stored as an AoS, a similar sequence of steps can be constructed by combining the descriptions for AoS in my previous U.S. application Ser. No. 16/783,959 filed on Feb. 6, 2020, and the changes made here for SoA compared to the corresponding steps for SoA in the same previous application. Similarly for when an array at the first level is used. Also please refer to the same previous application for examples of the usages of shared memories and clustering for constructing a two-level indexing structure for (n+1) combinations, using multiple arrays at the second level with a two-level indexing structure for (n+1) combinations, and also the usages of hash tables as alternatives. I also want to mention that instead of loading a whole CCISS or a whole padded CCISS into shared memory, each thread block may only load into the shared memory the respective segments or padded segments of the members of the (n+1) combination(s) that it's handling.

The previous discussion about the ordering of the components of two relevant tuples also applies to the steps in FIG. 15d. For example when the bases retrieved at step 1084 are ordered according to their respective members in the (n+1) combination, it requires that the members of the (n+1) local index retrieved at step 1080 also be ordered according to the respective members of the corresponding (n+1) combination, thus at step 1086 they are combined correctly to compute the second offset.

Index Construction Unit—Two-Level Indexing Structure for Pairs of Neighbor (N+1) Combinations ICU 108 receives a portion divider of a first spatial point set without isolated points stored as for example FIG. 2 or FIG. 12, an array of (n+1) combinations and an array of pairs of neighbor (n+1) combinations referencing the array of (n+1) combinations generated from a triangulation of the first spatial point set by PGU 105, a two-level indexing structure for (n+1) combinations generated for the array of (n+1) combinations, a set of respective bases for the points of the first non-isolated portion of the first point set if they are not already provided by the two-level indexing structure for (n+1) combinations, and generates a two-level indexing structure for pairs of neighbor (n+1) combinations to store in it some local distance measures for each (n+2) local index of each of the pairs of neighbor (n+1) combinations using the inputs and according to a predetermine mapping scheme.

According to one embodiment, a two-level indexing structure for pairs of neighbor (n+1) combinations comprises a padded length, an array at the second level, an array of products, a Mapping Between Digits (MBD), an optional array of points, and an array of bases. The array at the second level concatenates one or more non-overlapping padded segments, where each segment contains local distance measures for all the distinct (n+2) local indices of a pair of neighbor (n+1) combinations. The indices of the padded segments in the array at the second level are the same as the offsets of their respective pairs of neighbor (n+1) combinations in the input array of pairs of neighbor (n+1) combinations (a.k.a. the pair indices), and the number of padded segments is equal to the number of pairs of neighbor (n+1) combinations in the array of pairs of neighbor (n+1) combinations.

Each segment in the array at the second level is a Mixed Radix Indexed Array of local distance measures. The length of each segment is equal to the number of distinct (n+2) local indices of the corresponding pair of neighbor (n+1) combinations. For two (n+2) local indices of a pair of neighbor (n+1) combinations to be equivalent, they need to have the same values at the same components. Two (n+2) local indices of two different pairs of neighbor (n+1) combinations are never equivalent.

Thus given a pair index, it can be used to calculate the start offset of the corresponding padded segment in the array at the second level as long as we know the length of each padded segment, which is stored in the padded length. It involves multiplying the pair index by the padded length.

If in addition an (n+2) local index is given, it can be used to access the corresponding local distance measure in the segment by mapping the (n+2) local index to the corresponding integer according to the bijective mapping defined by the Mixed Radix Number System of the segment, assuming that the components of the (n+2) local index are paired with the bases correctly.

Similar to the case of a two-level indexing structure for (n+1) combinations, the padded length is the rounded maximum segment length that satisfies the alignment requirements when converted to bytes.

Similar to an alternative two-level indexing structure for (n+1) combinations, a two-level indexing structure for pairs of neighbor (n+1) combinations can use an array at the first level instead of a padded length, and in the array at the second level the padded segments may not be uniformly padded.

In the array of products, each element is now the product of the n+2 bases of the Mixed Radix Number System of a pair of the array of pairs of neighbor (n+1) combinations, and in the array of bases each element contains the n+1 bases for the n+1 least significant digits of a segment in the array at the second level.

An MBD contains for each pair of neighbor (n+1) combinations a mapping between the n+2 digits of its corresponding segment's Mixed Radix Number System and the two n+1 digits of the pair's two (n+1) combinations' two corresponding segments' two Mixed Radix Number Systems in the two-level indexing structure for (n+1) combinations, or equivalently an MBD element contains sufficient information to construct such a mapping. In one embodiment where the point ids of all the vertices of each (n+1) combination are stored according to the counterclockwise order of the vertices' coordinates, the MBD contains for each pair of neighbor (n+1) combinations two offsets into its two (n+1) combinations that can be used to construct such a mapping.

Referring to FIG. 18a, it shows a visual illustration of the memory layouts of an exemplary two-level indexing structure for pairs of neighbor (n+1) combinations. It comprises a padded length 928, an array at the second level 930 where the padded segments are stored one after the other, an array of products 960, an array of bases 950, an MBD 900, and an optional array of points 1100. Array at the second level 930 contains a first segment 932, a first padding 934, a second segment 936, a second padding 938, a collection of segments and paddings 940, a last segment 942 and a last padding 944. Thus the sum of the number of elements in first segment 932 and the number of padding elements in first padding 934 is equivalent to padded length 928, and same thing can be said for the combined length of each segment and its padding, except that in some embodiments, the last segment's padding may be omitted.

The two-level indexing structure for pairs of neighbor (n+1) combinations comprises an array of bases 950 stored either as an AoS or as an SoA. For example in one embodiment, array of bases 950 is stored as an SoA. The SoA contains n+1 scalar arrays, where the least significant bases, i.e. the bases of the least significant digits, are stored continuously in the first scalar array, the second least significant bases are stored continuously in the second scalar array and so on. In an alternative embodiment it may comprise an additional scalar array that stores the bases of the most significant digits. First elements of the n+1 scalar arrays are together referred to as the first element of SoA 950, and it stores the n+1 bases of (the n+1 least significant digits of the Mixed Radix Number System of the Mixed Radix Indexed Array of) the first pair of neighbor (n+1) combination in the input array of pairs of neighbor (n+1) combinations, second elements of the n+1 scalar arrays store the n+1 bases of the second pair of neighbor (n+1) combination and so on.

Still referring to FIG. 18a, array of bases 950 has a first element 952 that contains the bases for first segment 932, a second element 954 that contains the bases for second segment 936, a collection of bases 956 for the segments stored in collection of segments and paddings 940, and a last element 958 that contains the bases for last segment 942, where each element contains n+1 bases for the n+1 least significant digits of a corresponding segment. Array of bases 950 can be constructed using for example array of bases 361 shown in FIG. 3, array of bases 763 shown in FIG. 15a, or array of bases 832 shown in FIG. 4. One can access array of bases 763 using an (n+1) combination index while for the other two one needs to first retrieve the corresponding point ids.

Array of products 960 has a first element 962 that contains the length of first segment 932 that is equal to the product of the n+2 bases of first segment 932, a second element 964 that contains the length of second segment 936 that is equal to the product of the n+2 bases of second segment 936, a collection of elements 966 that contains the lengths of the segments stored in collection of segments and paddings 940, and a last element 968 that contains the length of last segment 942 that is equal to the product of the n+2 bases of last segment 942. Array of products 960 is used for boundary checking to tell apart data elements and padding elements.

The offsets of the elements in array of products 960 are the same as the offsets of their respective pairs of neighbor (n+1) combinations in the input array of pairs of neighbor (n+1) combinations as for example shown in FIG. 6. This also be said for array of bases 950.

FIG. 18a also shows a visual illustration of the memory layouts of an exemplary MBD 900 according to one embodiment in 2D. Referring to exemplary MBD 900, it contains a first structure 902, a second structure 904, a collection of one or more structures 906, and a last structure 908. First structure 902 stores two offsets that can be used to construct a mapping between the n+2 digits of the Mixed Radix Number System of first segment 932 and the two n+1 digits of the two Mixed Radix Number Systems of the two segments in the two-level indexing structure for (n+1) combinations of the two (n+1) combinations referenced by the first pair of neighbor (n+1) combinations. Second structure 904 stores two offsets that can be used to construct a mapping between the n+2 digits of the Mixed Radix Number System of second segment 936 and the two n+1 digits of the two Mixed Radix Number Systems of the two segments in the two-level indexing structure for (n+1) combinations of the two (n+1) combinations referenced by the second pair of neighbor (n+1) combinations and so on. Until last structure 908 stores two offsets that can be used to construct a mapping between the n+2 digits of the Mixed Radix Number System of last segment 942 and the two n+1 digits of the two Mixed Radix Number Systems of the two segments in the two-level indexing structure for (n+1) combinations of the two (n+1) combinations referenced by the last pair of neighbor (n+1) combinations. We'll refer to each of the structures 902, 904, 908 as an MBD element.

Block 910 illustrates first structure 902 of MBD 900 in more detail according to an embodiment in 2D where the MBD is stored as an AoS. Block 910 has a first component 912 and a second component 914. According to the current embodiment each MBD element stores 2 components, and each component stores 2 bytes, this makes it a total of 4 bytes per MBD element and there's no paddings between the MBD elements. According to an alternative embodiment in 2D, the MBD is stored as an SoA comprising two scalar arrays.

Optional array of points 1100 contains a first element 1102, a second element 1104, a collection of elements 1106, and a last element 1108. First element 1102 contains the n+2 distinct point ids of the first pair of neighbor (n+1) combinations, second element 1104 contains the n+2 distinct point ids of the second pair of neighbor (n+1) combinations and so on, until last element 1108 that contains the n+2 distinct point ids of the last pair of neighbor (n+1) combinations.

According to one embodiment in 2D where each MBD element stores two offsets as an SoA or AoS, and the point ids of the vertices of any (n+1) combinations in the input array of (n+1) combinations are arranged in the counter clockwise order of their coordinates, in each element of array of points 1100 the n+2 components are arranged such that the first component contains the point id of the corresponding pair of neighbor (n+1) combinations' first (n+1) combination's non-shared vertex (i.e., the vertex whose point id doesn't appear in the pair of neighbor (n+1) combinations' second (n+1) combination). Suppose that the point id is located at the k-th (0≤k≤n) component of the tuple of the pair's first (n+1) combination, then the second component of the element of the array of points contains the point id stored at the pair's first (n+1) combination's (k+1)% (n+1)-th component, and the fourth component of the element of the array of fixed point ids contains the point id stored at the pair's first (n+1) combination's (k+2)% (n+1)-th component, which is also the remaining component. This leaves the third component, which contains the point id of the pair's second (n+1) combination's non-shared vertex. Also suppose that the non-shared vertex in the pair's second (n+1) combination is located at the r-th component in the tuple of the second (n+1) combination. k and r will be recorded into the pair's corresponding MBD element. This ordering corresponds to traversing the boundary of the convex polytope of the pair's four distinct vertices in the counter clockwise order. Alternatively other schemes such as for example traversing in the clockwise order or starting at a shared vertex may be used as long as used consistently.

In the current embodiment array of points 1100 is stored as an AoS, alternatively it can be stored as an SoA. Alternatively another embodiment may receive array of points 1100 as input from the application instead of generating it in a two-level indexing structure for pairs of (n+1) combinations. Alternatively another embodiment does not include array of points 1100, but MEU 109 generates these at run time according to the ordering scheme discussed above or one of its alternatives.

The above scheme only works in 2D. Alternatively in my previous U.S. application Ser. No. 16/783,959 filed on Feb. 6, 2020, different mapping schemes that work in both 2D and 3D and their respective approaches for ordering the components of (n+1) combinations and the components of elements of arrays of point ids, which can be used by different embodiments.

FIG. 18*b* shows a series of steps for constructing a two-level indexing structure for pairs of neighbor (n+1) combinations as shown in FIG. 18*a* according to some embodiments.

At step 970, it allocates array of products 960, array of bases 950, array of points 1100, and MDB 900 in the device memory. It then launches a one dimensional grid by the coprocessor, where the size of the grid is at least as much as the length of the input array of pairs of neighbor (n+1) combinations. A hardware thread of the grid generates a global thread index, does necessary boundary checking, maps the global thread index into a pair index for example by regarding the global thread index as a pair index if it passes the boundary checking, retrieves the two (n+1) combination indices of the corresponding pair of neighbor (n+1) combinations using the pair index from the input array of pairs of neighbor (n+1) combinations for example as shown in FIG. 6.

The hardware thread then retrieves the corresponding two tuples of n+1 point ids from the array of (n+1) combinations for example as shown in FIG. 5. According to one embodiment in 2D where one MBD element stores two offsets as discussed previously, it compares the two tuples of point ids to identify a first non-shared point id as well as its offset k in the first tuple and a second non-shared point id as well as its offset r in the second tuple, and stores the n+2 distinct point ids of the two tuples at the offset of the pair index in array of points 1100 according to the previously discussed ordering scheme. Alternatively in my previous U.S. application Ser. No. 16/783,959, different orders can be used to store the n+2 distinct point ids when different mapping schemes are used.

The hardware thread then retrieves the n+2 bases for the n+2 distinct point ids. The n+2 bases are ordered following the ordering of the point ids to determine a Mixed Radix Number System for the pair of neighbor (n+1) combinations. When it retrieves the n+2 bases, it compares the n+2 distinct point ids with the portion divider, and for those that belong to the first non-isolated portion their respective bases are retrieved from the CCISS, the padded CCISS, or from for example array of bases 763 shown in FIG. 15*a* of the two-level indexing structure for (n+1) combinations. Otherwise the bases are fixed to be 1, meaning that all the members of the n+2 distinct point ids that belong to the constrained portion have unique correspondents provided by the array of fixed correspondents.

It then multiplies together the n+2 bases to obtain a product, and stores the product in array of products 960 at the offset of the pair index. It also stores the n+1 bases corresponding to the n+1 least significant digits in array of bases 950 at the offset of the pair index where the ordering of the n+1 bases follows the ordering of their respective point ids. It also records k and r into the corresponding MBD element at the offset of the pair index.

At step 972, it computes using array of products 960 and stores the padded length 928. In one embodiment this involves in parallel reducing array of products 960 to find the maximum segment length, converting the maximum segment length to a corresponding number of bytes that is the product of the maximum segment length and the number of bytes in each element of the array at the second level of the two-level indexing structure for pairs of neighbor (n+1) combinations, rounding the number of bytes up to the smallest integer satisfying the alignment requirements that is greater than or equal to it, and converting the rounded number back to a number of elements by dividing the smallest integer by the number of bytes in each element. Alternatively this can also be carried out by one or more CPU threads, and the result is stored into padded length 928 in the device memory.

At step 974, it allocates an array at the second level 930 in the device memory using the information computed above.

At step 976, it fills in the array at the second level in the device memory with values. To do this, ICU 108 launches a one or two dimensional grid on the coprocessor.

Referring to FIG. 18*c*, it illustrates the sub-steps carried out by the grid's hardware threads given a two-level indexing structure for (n+1) combinations as for example illustrated in FIG. 15*a* according to some embodiments. At step 980 a hardware thread receives a global thread index.

At step 982, it obtains from the global thread index a pair index that is used to locate a padded segment in the array at the second level of the two-level indexing structure for pairs of neighbor (n+1) combinations as well as retrieve the corresponding bases, and a second offset that is used to index into the padded segment. If it is a one dimensional grid the global thread index is divided by the padded length, then the integral quotient is regarded as the pair index and the remainder is regarded as the second offset.

If it is a two dimensional grid such that its y dimension is at least as much as the number of padded segments, and its x dimension is at least as much as the padded length, then the x component of the global thread index is regarded as the second offset, and the y component is regarded as the pair index. Alternatively the roles of the x and y dimensions and components can be switched.

Then the number of pairs of neighbor (n+1) combinations can be used to boundary check the validity of the pair index, and array of products 960 can be used to boundary check if the second offset refers to a data element or a padding element.

At step 984, it retrieves the corresponding n+1 least significant bases from array of bases 950 at the offset of the pair index.

At step 986, it computes an (n+2) local index where it iteratively divides the second offset by the bases of the n+1 least significant digits and records the remainders and the last quotient in the order that they are generated such that the first remainder is regarded as the value of the least significant digit.

At step 988, the hardware thread then retrieves the corresponding MBD element from MBD 900 using the pair index, and generates a first and a second (n+1) local index out of the (n+2) local index's n+2 components according to the MBD element, where the first (n+1) local index is for the first (n+1) combination of the pair of neighbor (n+1) combinations, the second (n+1) local index is for the second (n+1) combination of the pair of neighbor (n+1) combinations, and n of the (n+2) local index's n+2 components are comprised by both of the (n+1) local indices. According to one embodiment in 2D where an MBD element contains two components storing two offsets as discussed earlier, let's denote the first and second components of the MBD element respectively by "offset1", and "offset2". According to the current embodiment in 2D, to get the i-th (i=0, 1, 2) component of the j-th (j=0,1) (n+1) local index, it reads the m-th (m=0, 1, 2, 3) component of the (n+2) local index, where the relationship between i, j, m are described in the following table:

| i | offset1%3 | (1 + offset1)%3 | (2 + offset1)%3 | offset2%3 | (1 + offset2)%3 | (2 + offset2)%3 |
|---|---|---|---|---|---|---|
| j | 0 | 0 | 0 | 1 | 1 | 1 |
| m | 0 | 1 | 3 | 2 | 3 | 1 |

Alternatively in my previous U.S. application Ser. No. 16/783,959 filed on Feb. 6, 2020, at this step different mapping schemes can be used when different ordering schemes are used for the components of the (n+1) combinations and the components of the elements of the array of points.

At step 990, the two (n+1) combination indices and their (n+1) local indices are used to query the two-level indexing structures for (n+1) combinations to retrieve the required components of two affine transformations according to the steps shown in FIG. 15*d*.

At step 992, it uses MPEU 107 to compute a local distance measure using the required components and at step 994 it stores the result into the array at the second level. For this it uses the pair index to retrieve the start offset of the corresponding padded segment, and then stores the result at the offset of the second offset relative to the start offset of the segment of the padded segment.

Alternatively, similar to some alternative embodiments of two-level indexing structure for (n+1) combinations, according to some embodiments, a two-level indexing structures for pairs of neighbor (n+1) combinations with uniformly padded segments may contain two or more arrays at the second level.

Alternatively in another embodiment the two-level indexing structure for pairs of neighbor (n+1) combinations is constructed without first constructing a two-level indexing structure for (n+1) combinations, a similar sequence of steps can be constructed by combining the corresponding descriptions in my previous U.S. application Ser. No. 16/783,959 filed on Feb. 6, 2020, and the changes made in this document for constructing a two-level indexing structure for (n+1) combinations and a two-level indexing structure for pairs of neighbor (n+1) combinations.

Referring to FIG. 18*d*, it illustrates the steps carried out by a hardware thread to query the two-level indexing structures for pairs of neighbor (n+1) combinations shown in FIG. 18*a* to retrieve a local distance measure given a pair index and an (n+2) local index according to one embodiment.

At step 996, it receives a pair index and an (n+2) local index. The ordering of the members of the (n+2) local index is required to match the ordering of the n+2 digits of the Mixed Radix Indexed Array of the pair of neighbor (n+1) combinations indexed by the pair index.

At step 998, it multiplies the pair index by the padded length to get the start offset of the corresponding padded segment in the array at the second level.

Step 1002 is similar to step 984 in FIG. 18*c*.

At step 1004, it computes a second offset using the bases and the n+2 members of the (n+2) local index according to equation (1), with M being set to n+2, and the resultant second offset is at the left hand side of the equation.

At step 1006, it retrieves the local distance measure at the second offset relative to the start offset of the segment of the padded segment, where the start offset is computed at step 998.

Please refer to my previous U.S. Application Ser. No. 161/83,959 filed on Feb. 6, 2020 for examples of the usages of shared memories for constructing a two-level indexing structure for pairs of neighbor (n+1) combinations.

Affine Calculation Unit

Referring to FIG. 9, MU 100 comprises an Affine Calculation Unit (ACU) 112. ACU 112 receives an (n+1) combination and one of its (n+1) correspondent, and computes some necessary components of an affine transformation that maps the end points of the (n+1) combination to their correspondents in the (n+1) correspondent. In 2D numerically the affine transformation satisfies the following relationship: let A denote the affine matrix, $x_1$, $x_2$, $x_3$ denote the three points of the n+1 combination, $loc(x_1)$, $loc(x_2)$, $loc(x_3)$ denote their coordinates in column vectors in homogeneous coordinates, $loc'(x_1)$, $loc'(x_2)$, $loc'(x_3)$ denote their respective correspondents' coordinates under the affine transformation in column vectors in homogeneous coordinates, and $u_1$, $u_2$, $u_3$ denote their respective displacements under the affine transformation as column vectors with the extra dimensions set to 0:

$$A[loc(x_1), loc(x_2), loc(x_3)] = [loc(x_1), loc(x_2), loc(x_3)] + [u_1, u_2, u_3]$$
$$= [loc'(x_1), loc'(x_2), loc'(x_3)]$$

After the summation, the right hand side just contains the coordinates of the correspondents of $x_1$, $x_2$, and $x_3$. This equation is used to specify a numerical relationship. Although it can be used to compute A, it doesn't necessarily demand that A has to be computed using this matrix equation in homogeneous coordinates. Referring to my previous U.S. Pat. Nos. 8,811,772 and 8,571,351, various approaches to compute necessary components of affine transformations have been discussed. Examples include computing the inverse of the location matrix $[loc(x_1), loc(x_2), loc(x_3)]$ analytically using determinants and cofactors, computing the inverses of the location matrix using the LU or QR decomposition by solving linear systems with the unit vectors at the right hand side, solving the matrix equation using various matrix decomposition methods such as the LU decomposition with or without pivoting or the QR decomposition, using the Gauss Jordan Elimination, or solving the linear system using the Direct linear transformation (DLT) algorithm where the problem is converted to that of solving a linear system where the unknown vector x is composed of the non-trivial elements of an transformation matrix (please refer to "Direct linear transformation" retrieved from Wikipedia for more details), etc. In the current embodiment the floating point arithmetic is used. Alternatives include for example the fixed point arithmetic or the rational number system, etc. An affine transformation can be solved as long as $x_1$, $x_2$, $x_3$ are in general position, although it may be singular if the right hand side is either not in general position, or is not one-to-one. This extends to 3D using four points.

When an (n+1) combination has multiple (n+1) local indices associated with it, multiple instances of the above matrix equation with different right hand sides need to be solved. In such situations it helps to reuse intermediate results. Examples of such intermediate results include inverses of location matrices, lower and upper triangular matrices (which can be stored in the same matrix) computed by the LU decomposition, or Q and R matrices computed by the QR decomposition or their equivalents. We'll refer to these intermediate results as "solving structure"s. Depending on the context, to apply a solving structure could mean for example carrying out forward and backward substitutions using lower and upper triangular matrices, multiplying by the inverses of location matrices, or applying the transposes of Q matrices and then do back substitution with the respective R matrices.

Referring to FIG. 17, it shows a collection of solving structures stored in an AoS of solving structures 860 according to one embodiment. AoS of solving structures 860 includes a first structure 870, a second structure 872, a third structure 874, a first padding 876, and a collection of structures and paddings 882. In 2D, each structure contains the nine L and U components of a solving structure stored continuously. Alternatively in 3D each structure contains the sixteen L and U components of a solving structure stored continuously. Alternatively in 3D it also stores permutation information where pivoted LU decomposition is applied.

In 2D according to one embodiment, three structures 870, 872, 874 contain twenty seven L and U components for three solving structures. Structures and paddings appear in a 3+1 fashion, meaning AoS 860 contains multiple units, each unit contains three structures followed by one padding. Assuming that each component is a float of 4 bytes, by appending a padding of 20 bytes after every three structures, the three structures and the padding together fill a cache line of 128 bytes in a certain coprocessor architecture. To access a corresponding solving structure using an offset requires translating the offset into the corresponding unit for example by dividing it by 3, accessing the unit at the offset (in terms of the number of units in front of it) of the integral quotient, and then accessing the corresponding structure in the unit according to the remainder. When a unit packs more than one structures, multiple concurrent write accesses to the unit need to be put into a critical section, which can be achieved using atomic functions.

In 2D according to another embodiment (not shown), each structure is stored in a unit of 64 bytes, with 36 bytes for the 9 components and another 30 bytes of a padding. To access a corresponding solving structure using an offset requires accessing the unit at the offset in terms of the number of units in front of it, and then accessing the structure in the unit. In the 3D case, according to one embodiment, each structure is stored in its own unit of 32 bytes.

Block 862 shows the details of first structure 870 according to one embodiment in 2D, and matrix 864 contains a visual illustration in matrix form of the components of block 862. Block 862 contains floats denoted by $U_{11}$, $U_{12}$, $U_{13}$, $U_{22}$, $U_{23}$, $U_{33}$, $L_{21}$, $L_{31}$, $L_{32}$ in the order. Among them $U_{11}$, $U_{12}$, $U_{13}$ are the floats in the first row of matrix 864 from left to right, floats $L_{21}$, $U_{22}$, $U_{23}$ are in the second row of matrix 864 from left to right, and floats $L_{31}$, $L_{32}$, $U_{33}$ are in the third row of matrix 864 from left to right. The U components of matrix 864 correspond to the upper triangular matrix generated by the LU decomposition of an input coordinates matrix (not shown) that contains the coordinates of an (n+1) combination's members arranged such that the first column contains the 0-th member's coordinates, the second column contains the 1-st member's coordinates, the third column contains the 2-nd member's coordinates, and the last row are all 1s, and the L components of matrix 864 correspond to the lower triangular matrix generated by the LU decomposition of the coordinates matrix.

Mapped Pair Evaluation Unit

Referring to FIG. 8, it shows an embodiment of Mapped Pair Evaluation Unit (MPEU) 107, which computes local distance measures for (n+2) correspondences of pairs of neighbor (n+1) combinations. In FIG. 8, MPEU 107 comprises Energy Computation Unit (ECU) 114, and optional Energy Function Computation Unit (EFCU) 116.

ECU 114 receives some necessary components of a pair of affine transformations $T_1$, $T_2$ generated from two (n+1) local indices of a pair of neighbor (n+1) combinations, and use the necessary components to compute a local distance measure. A local distance measure is a scalar that is used to capture the difference between two affine transformations. Various local distance measures have been discussed in my earlier patent applications. Referring to my U.S. Pat. No. 8,811,772 granted Aug. 19, 2014, embodiments compute the difference of the left sub-matrices of two affine transformations, and compute a local distance measure based on the difference, including computing its singular values using a Matrix Decomposition Unit (MDU) and then computing matrix norms such as the Ky Fan p-k norm or the (c,p)-norm etc. using a distance computation unit (DCU). The patent also discloses embodiments of ECU 114 that computes local distance measures using the Frobenius norm or the trace norm without using an MDU. In these situations, the necessary components of affine transformations consists of the components of the left-submatrices of the affine transformations.

Alternatively, referring to my U.S. Pat. No. 8,571,351 granted Oct. 19, 2013, embodiments compute a local distance measure by defining a spatial agent, applying two input affine transformations to the spatial agent to generate two transformed spatial agents, and computing a local distance measure based on the transformed spatial agents. In these situations, the necessary components of affine transformations include the non-trivial components of the affine transformations.

Alternatively, referring to "An Affine Energy Model for Image Registration Using Markov Chain Monte Carlo" by Yang and Keyes, there a local distance measure comprises the Euclidean distance between the corresponding elements of the matrices of a given pair of affine transformations. In this situations, the necessary components of affine transformations also include the non-trivial components of the affine transformations.

Optional EFCU 116 receives local distance measures from ECU 114 and adds one or more terms to them as described in my U.S. Pat. No. 8,811,772 granted Aug. 19, 2014.

Mapping Evaluation Unit

Referring to FIG. 9, MU 100 comprises a Mapping Evaluation Unit (MEU) 109 that receives a portion divider of a first spatial point set without isolated points stored as in FIG. 2 or FIG. 12, an array of N-to-1 mappings between the first spatial point set and a second spatial point set, an array of pairs of neighbor (n+1) combinations generated from a triangulation of the first spatial point set, a two-level indexing structure for pairs of neighbor (n+1) combinations generated for an array of one or more pairs of neighbor (n+1) combinations generated using the same triangulation, and generates an overall distance measure for each of the N-to-1 mappings. Referring to my earlier U.S. Pat. No. 8,811,772 granted Aug. 19, 2014 and U.S. Pat. No. 8,571,351 granted Oct. 19, 2013, an overall distance measure is a scalar that summarizes one or more local distance measures by for example computing their arithmetic mean, their geometric mean, their weighted average, or their maximum.

According to one embodiment, MEU 109 allocates a scalar array of local distance measures in the device memory. The array comprises a local distance measure for each of the unique combinations of the pairs of neighbor (n+1) combinations and the N-to-1 mappings. The array concatenates multiple segments, one for each of the pairs of neighbor (n+1) combinations, where the length of each segment is the number of the N-to-1 mappings. Alternatively, the array concatenates multiple padded segments, where the padded length of each padded segment satisfies the alignment requirement when converted to number of bytes and is greater than or equal to the number of the N-to-1 mappings. Alternatively, the array concatenates multiple segments one for each of the N-to-1 mappings, where the length of each segment is the number of the pairs of neighbor (n+1) combinations.

It then launches a two dimensional grid on a data-parallel coprocessor. The x dimension of the grid is at least the number of the N-to-1 mappings, and the y dimension is at least the number of the pairs of neighbor (n+1) combinations. (Alternatively in another embodiment the association is switched.) One can visualize this as a virtual matrix whose row indices are the offsets into the array of pairs of neighbor (n+1) combinations, and column indices are the offsets into the array of N-to-1 mappings. An element at the i-th row and the j-th column stores the local distance measure for the pair of neighbor (n+1) combinations at offset i in the array of pair of neighbor (n+1) combinations and the N-to-1 mapping at offset j in the array of N-to-1 mappings.

Referring to FIG. 16, it illustrates the steps carried out by a hardware thread that queries the two-level indexing structure for pairs of neighbor (n+1) combinations as shown in FIG. 18a to retrieve a local distance measure given a pair index and an N-to-1 mapping index according to one embodiment.

At step 1010, it receives an N-to-1 mapping index and a pair index. For example if a CUDA device is used, a hardware thread of the grid generates a global thread index using the block dimensions, its local thread index, and its block index:

```
int threadx=blockIdx.x*blockDim.x+threadIdx.x;
```

```
int thready=blockIdx.y*blockDim.y+threadIdx.y;
```

It then does a necessary boundary checking so that the x component references a valid N-to-1 mapping and the y component references a valid pair of neighbor (n+1) combinations:

```
if (threadx >= nN21Mappings || thready >= nPairs)
    { return; }
int nTo1MappingIdx = threadx;
int pairIdx = thready;
```

Note that boundary checking is not always necessary using the OpenCL programming paradigm. In the OpenCL programming paradigm, for a kernel launch the NDRange size does not have to be an integral multiple of the corresponding work-group size.

Alternatively, according to another embodiment, a one dimensional grid can be used to generate the indices. Still assuming that a CUDA device is being used:

```
int threadx = blockIdx.x * blockDim.x + threadIdx.x;
if (threadx >= nN21Mappings * nPairs)
    { return; }
int nTo1MappingIdx = threadx % nN21Mappings;
int pairIdx = threadx / nN21Mappings;
```

At step 1012, it receives the n+2 distinct point ids of the pair of neighbor (n+1) combination from array of points 1100 at the offset of the 'pairIdx' in the order the point ids are stored. Alternatively if array of points 1100 is not provided or used, it queries an array of (n+1) combinations using the two (n+1) combination indices of the pair of neighbor (n+1) combination to retrieve two tuples of point ids each of length n+1, and merge the two tuples to obtain n+2 distinct point ids in a similar manner as how the corresponding tuple in array of points 1100 is generated.

At step 1014, it compares the n+2 distinct point ids with the portion divider. For those that belong to the first non-isolated portion have their corresponding members in the n+2 local index retrieved from the tuple representing the N-to-1 mapping in the array of N-to-1 mappings indexed by "nto1mappingidx" at the offsets of their point ids, otherwise they have their corresponding members in the n+2 local index set to 0, meaning that all the members of the n+2 distinct point ids that belong to the constrained portion have unique correspondents provided by the array of fixed correspondents.

The members of the n+2 local index are ordered following that of the corresponding point ids. According to one embodiment as described previously, N-to-1 mappings are stored in an SoA containing a number of scalar arrays. At this step the collection of hardware threads that handle a row of the virtual matrix all retrieve from the same scalar arrays in the array of N-to-1 mappings that correspond to the members of the n+2 distinct point ids that belong to the first non-isolated portion, thus shared memories can be used to facility access if provided. For example according to the current embodiment, each thread block handles one row of the virtual matrix, meaning one of the pairs of neighbor (n+1) combinations. The hardware threads in a thread block cooperatively copy the scalar arrays of the SoA of N-to-1 mappings corresponding to the members of the n+2 distinct point ids that belong to the first non-isolated portion into its shared memory in a coalesced and aligned fashion before this step, then at this step it reads from the copies in the shared memory. Alternatively each thread block can handle two or more rows of the virtual matrix.

At step 1016, it queries the two-level indexing structure for pairs of neighbor (n+1) combinations with the pair index and the (n+2) local index to retrieve a local distance measure according to the steps shown in FIG. 18*d*.

At step 1018, it stores the local distance measure in an array of local distance measures. For example when there is no paddings between local distance measures, it outputs at the offset of:

int outputOffset=pairIdx*$n$NTO1Mappings+$n$To1MappingIdx;

where 'nNTO1Mappings' is a symbol that contains the number of N-to-1 mappings. As another example when the segments (of the array of local distance measures) correspond to the rows of the virtual matrix are padded, the output offset can be computed as follows:

int outputOffset=pairIdx*$p_2$+$n$To1MappingIdx;

where '$p_2$' is a symbol that contains the padded length.

MEU 109 then launches one or more grids to summarize the local distance measures to compute an overall distance measure for each N-to-1 mapping.

To compute overall distance measures, according to one embodiment where there is no padding elements between local distance measures, it involves using a one dimensional grid whose x dimension is no less than the number of N-to-1 mappings, such that each hardware thread that passes boundary checking generates an overall distance measure for one of the N-to-1 mappings. Each hardware thread after doing boundary checking sums up the local distance measures generated for the N-to-1 mapping with all the pairs of neighbor (n+1) combinations, and the hardware threads store the results to the elements of the array of local distance measures corresponding to the first row of the virtual matrix or alternatively an output array of overall distance measures:

```
__global__ void ComputeOverallDistanceMeasures (int *g_idata,
unsigned int nPairs, unsigned int nMappings) {
    // set thread ID
    unsigned int tid = threadIdx.x;
    unsigned int idx = blockIdx.x*blockDim.x + threadIdx.x;
    if (idx < nMappings)
    {
        float a1 = g_idata[idx];
        for (int i = 1; i < nPairs; ++i)
        {
            a1 += g_idata[idx + i * nMappings];
        }
        g_idata[idx] = a1; // alternatively g_odata[idx] = a1
    }
}
```

As another example where the array of local distance measures concatenates multiple padded segments, one for each pair of neighbor (n+1) combinations, where the length of each padded segment is the smallest integer satisfying the alignment requirement that is also greater than or equal to the number of N-to-1 mappings, a similar kernel is used except that $a1$+=$g\_i$data[idx+$i$*$n$Mappings];

is replaced by:

$a1$+=$g\_i$data[idx+$i$*$p_2$];

Alternatively according to another embodiment, the pairs of neighbor (n+1) combinations are divided into two halves according to their offsets in the array of pairs of neighbor (n+1) combinations. Two overall distance measures are generated for each N-to-1 mapping using the two halves according to the embodiments described above. Next for each N-to-1 mapping the two overall distance measures are summarized for example by summing, averaging, or choosing the maximum either using another grid or using a CPU thread after being copied to the host memory to generate another overall distance measure. This can be extended to three or more parts. Also referring to my previous U.S. Pat. No. 8,811,772 granted Aug. 19, 2014, and U.S. Pat. No. 8,571,351 granted Oct. 19, 2013, alternative approaches for summarizing local distance measures were discussed.

Optimization Unit

Optimization Unit (OU) 110 receives an array of N-to-1 mappings and an array of their respective overall distance measures, and finds an N-to-1 mapping with the lowest overall distance measure. In one embodiment a CPU thread copies the overall distance measures from the device memory to the host memory, and then iterates through the overall distance measures while maintaining the running minimal and its offset. It then retrieves the N-to-1 mapping at the offset in the array of N-to-1 mappings. Alternatively a parallel reduction algorithm can be used together with an array of offsets such that for each overall distance measure there's a respective offset in the array of offsets where the offsets range from 0 to nNTO1Mappings−1. Then during the parallel reduction, whenever an overall distance measure is copied from a first location to a second location in the array of overall distance measures, the offset at the first location in the array of offsets is also copied over to the second location in the array of offsets. Alternatively, the CUDA Thrust library also provides a min-element function for this purpose. One skilled in the art will recognize that in order to compare floating point numbers for equivalence it usually involves a small epsilon.

Processes I

Figure 13:
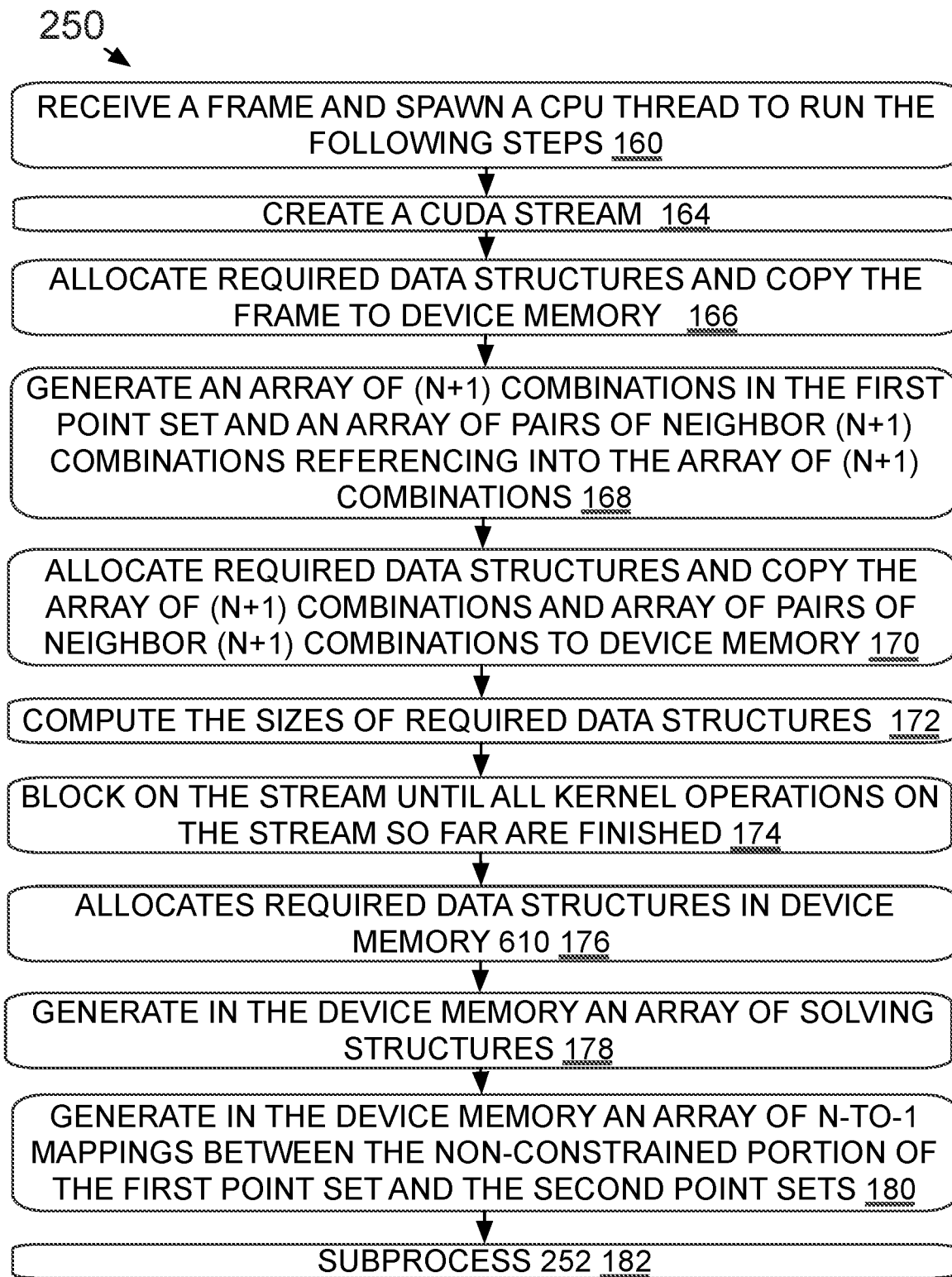
FIG. 13 shows an subprocess 250 that is the first part of a process for generating and evaluating N-to-1 mappings between two spatial point sets in nD, n=2 or 3, according to some embodiments.
Figure 14:
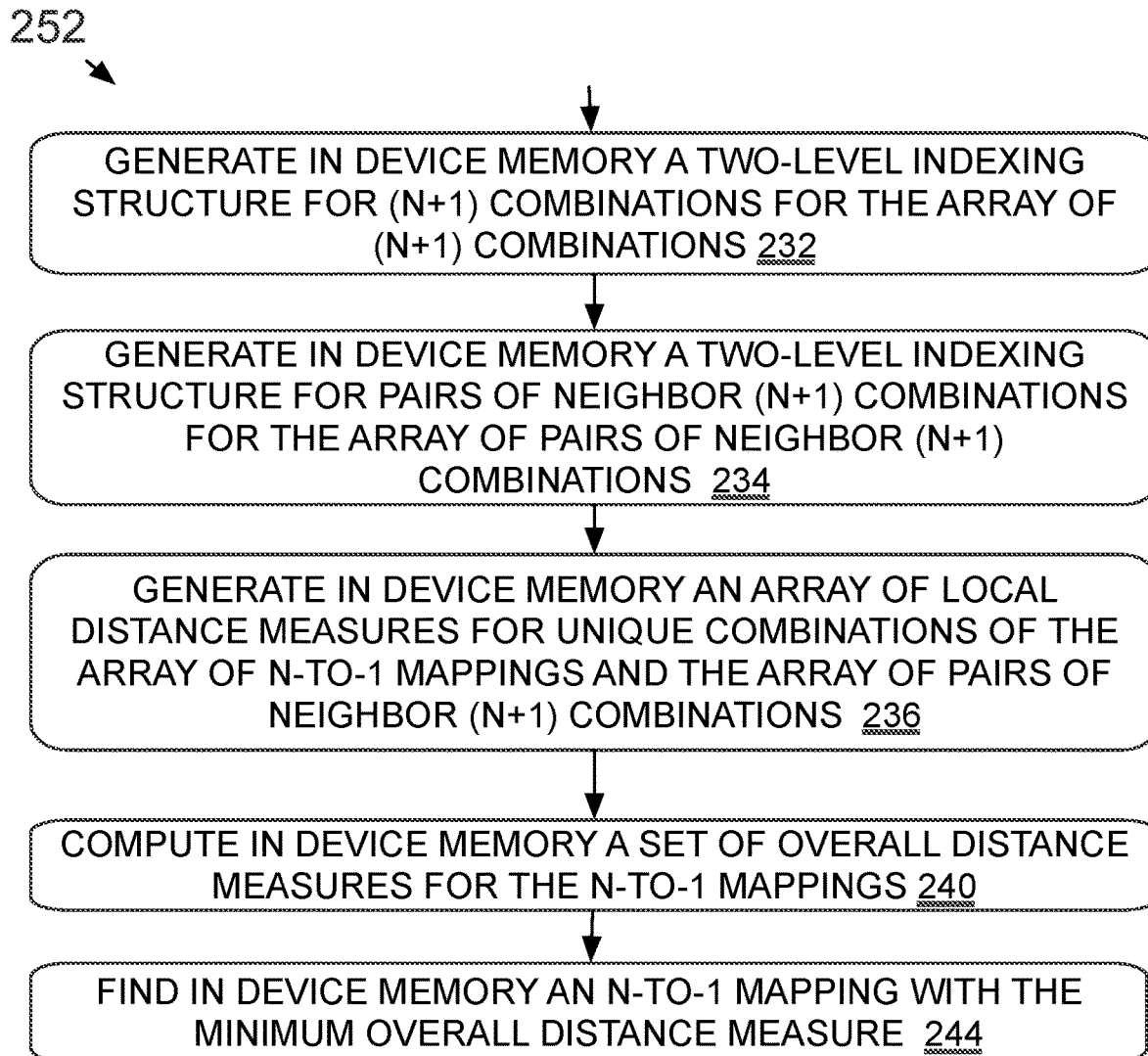
FIG. 14 shows a subprocess 252 that is the second part of a process for generating and evaluating N-to-1 mappings between two spatial point sets in nD, n=2 or 3, according to some embodiments.

FIGS. 13 and 14 shown two subprocesses 250 and 252 of an exemplary processes carried out by MU 100 shown in FIG. 9 and implemented on computing device 607 shown in FIG. 7 including coprocessor 612 for generating and evaluating N-to-1 mappings. It is written with NVIDIA® CUDA® terminology, however similar processes shall be applicable to other data-parallel coprocessors.

At step 160, computing device 607 receives in host memory 606 a first and a second spatial point sets where there is no isolated points in the first point set, a portion divider that divides the first spatial point set into a first non-isolated portion of non-isolated points and a second portion of constrained points, an array of fixed correspondents for the constrained portion as shown in FIG. 2 or FIG. 12, and a CCISS or padded CCISS between the members of the first non-isolated portion and the second spatial point set as shown in FIG. 3 or 4. Together, the first and spatial point sets, the portion divider, the array of fixed correspondents, the CCISS or the padded CCISS are referred to as a frame.

At step 164, the CPU thread creates a CUDA stream for processing the current frame. According to one embodiment, all of the following kernels that are executed on the coprocessor and memory copying between the host and the coprocessor are associated with this stream. Alternatively multiple streams can be used, for example one for the operations up to step 174, and another one for those after step 174.

At step 166, it allocates necessary data structures to hold the frame in the coprocessor's memory, and copies the frame to the data structures. As one skilled in the art knows, data structures need to be allocated in the device memory either explicitly or implicitly for example with Unified Memory before data can be copied from the host to the device, and they shall be freed after all relevant operations have been performed on them either explicitly or implicitly. Similarly data structures need to be allocated in the host memory before they are copied from the device memory to the host memory. Such sub-steps of allocating in the host memory or in the device memory are sometimes not explicitly mentioned as one skilled in the art shall already know.

At step 168, MU 100 uses PGU 105 to generate in either the host memory or the device memory an array of (n+1) combinations and an array of one or more pairs of neighbor (n+1) combinations referencing into the array of (n+1) combinations. PGU 105 receives all the points of the first spatial point set of the current frame, and generates a triangulation using all the points, it then uses the triangulation to generate the array of (n+1) combinations and the array one or more pairs of neighbor (n+1) combinations referencing the plurality of (n+1) combinations as described earlier in this document.

At step 170, if the array of (n+1) combinations is not generated in device memory 610, it allocates the necessary data structures to hold the array of (n+1) combinations in the coprocessor's device memory, and copies it to the data structures. Same operations are performed regarding the array of one or more pairs of neighbor (n+1) combinations.

At step 172, it computes the sizes of the required data structures to be constructed at the later steps using the input frame and the data structures generated by the above steps. For the size of the two-level indexing structure for (n+1) combinations, it involves steps 770 and 772 in FIG. 15b. For the size of the two-level indexing structures for pairs of neighbor (n+1) combinations, it involves steps 970 and 972 in FIG. 18b. For the number of N-to-1 mappings, it is computed by multiplying together the number of candidate correspondences of each of the separate sets of candidate correspondences in the CCISS or padded CCISS, and it can be computed either iteratively by the one or more CPU threads using the general purpose processors, or launching another kernel to run a parallel reduction to multiply the elements of array of bases 361 or 832. It also computes the sizes of the array of local distance measures and the array of solving structures for example as shown in FIG. 17. Although the exact formulas for computing the byte sizes of some of the data structures are not explicitly given, those skilled in the art shall have no problem deriving them from the memory layouts and components' byte sizes.

At step 174, the CPU thread block on the stream until all the kernel operations that have been pushed into the stream so far are finished. Alternatively if there has been no kernel operations so far, then this step can be omitted. If it's a CUDA device, it does the blocking for example by calling "cudaStreamSynchronize" at this step, or by calling "cudaEventRecord" to push in an event after step 172 and then calling "cudaStreamWaitEvent" to synchronize on the event at this step. In OpenCL the host can block by calling "clWaitForEvents" on a list of events associated with the kernels enqueued at the previous steps.

At step 176, it allocates all the data structures required by the later steps that haven't already been allocated by the previous steps in the device memory except for those that are dynamically allocated by other kernels if there is any. In one embodiment it allocates the memories for the array of solving structures, the two-level indexing structure for (n+1) combinations, the two-level indexing structure for pairs of neighbor (n+1) combinations, the array of N-to-1 mappings, and the array of local distance measures, all of which are to be described in the following steps. For example step 774 in FIG. 15b and step 974 in FIG. 18b are carried out at this step.

At step 178, it generates in the allocated memory an array of solving structures for the array of (n+1) combinations using in addition the first spatial point set. According to one embodiment, it launches a one dimensional grid by the coprocessor, where the size of the grid is greater than or equal to the number of (n+1) combinations. A hardware thread of the grid receives a global thread index, does a necessary boundary checking, maps the global thread index into an (n+1) combination index for example by treating the global thread index as an (n+1) combination index, retrieves the corresponding (n+1) combination using the (n+1) combination index from the array of (n+1) combinations, retrieves the coordinates of the members of the (n+1) combination from the first spatial point set, uses ACU 112 to compute a solving structure for the (n+1) combination, and stores the solving structure to the array of solving structures allocated at step 176 at the offset of the (n+1) combination index. Please refer to my previous U.S. application Ser. No. 16/783,959 filed on Feb. 6, 2020 for examples of using shared memories for generating and storing the array of solving structures.

At step 180, MU 100 passes a reference of the CCISS or padded CCISS of the frame to MGU 106 and uses it to generate in the allocated memory an array of N-to-1 mappings between the members of the first non-isolated portion of the first spatial point set and the members of the second spatial point set, where each of the N-to-1 mapping contains for each member of the first non-isolated portion an index into an element in the member's corresponding segment or padded segment in the CCISS or padded CCISS.

At step 182, it continues to first second subprocess 252.

At step 232, MU 100 passes references of the frame and a set of data structures generated in the device memory at earlier steps for the current frame to ICU 108, the set of data structures including the array of (n+1) combinations and the array of solving structures, and uses ICU 108 to generate in the allocated memory a two-level indexing structure for (n+1) combinations.

At step 234, MU 100 passes references of the frame and a set of data structures generated in the device memory at earlier steps for the current frame to ICU 108, the set of data structures including: the array of (n+1) combinations, the array of pairs of neighbor (n+1) combinations, and the two-level indexing structure for (n+1) combinations, to generate in the allocated memory a two-level indexing structure for pairs of neighbor (n+1) combinations.

At step 236, MU 100 passes references of the frame and a set of data structures generated in the device memory at earlier steps for the current frame to MEU 109, the set of data structures including the array of N-to-1 mappings, the array of pairs of neighbor (n+1) combinations, and the two-level indexing structure for pairs of neighbor (n+1) combinations, and uses MEU 109 to generate in the allocated memory an array of local distance measures for unique combinations of the members of the array of N-to-1 mappings and the members of the array of pairs of neighbor (n+1) combinations.

At step 240, MEU 109 computes in the allocated memory an array of overall distance measures using the array of local distance measures, where one overall distance measure is computed for each of the array of N-to-1 mappings.

At step 244, MU 100 passes a reference of the array of overall distance measures and a reference of the array of N-to-1 mappings generated in the device memory at earlier steps for the current frame to OU 110, and uses OU 110 to find an optimal N-to-1 mapping among the array of N-to-1 mappings with the minimum overall distance measure in the array of overall distance measures. The optimal N-to-1 mapping comprises a tuple of indices of candidate correspondences in their separate sets for the points in the first non-isolated portion in the first spatial point. The indices and the point ids of the points that the indices are associated with in the first spatial point set are then used to retrieve their respective correspondents in the second spatial point set from the CCISS or the padded CCISS. Together, the correspondents and the point ids of the points that the correspondent's respective indices are associated with, and the input array of fixed correspondents for the constrained points in the first spatial point set define an optimal N-to-1 mapping for each point in the first spatial point set.

In this and other steps, as one skilled in the art knows, one can replace a one dimensional grid with a two or three dimensional grid, as long as the number of hardware threads of the two or three dimensional grid meets the same requirement of the size of the one dimensional grid.

Processes II

FIG. 20 shows an exemplary process 1280 carried out by MU 100 shown in FIG. 9 and implemented on computing device 607 shown in FIG. 7 including coprocessor 612 for generating and evaluating N-to-1 mappings in multi-levels. It uses subprocesses 250 and 252 shown in FIGS. 13 and 14.

At step 1282, MU 100 receives a frame with an extended array of fixed correspondents. The frame includes a first and a second spatial point sets where there is no isolated points in the first spatial point set, a portion divider that divides the first spatial point set into a first non-empty non-isolated portion of non-isolated points and a second constrained portion of constrained points, a CCISS or padded CCISS between the members of the first non-empty non-isolated portion and the second spatial point set as shown in FIG. 3 or 4, and an extended array of fixed correspondents for the first spatial point set. The extended array of fixed correspondents has a first not-yet-fixed portion of not-yet-fixed elements for the members of the first non-empty non-isolated portion of the first spatial point set, and a second fixed portion for the members of the second constrained portion of the first spatial point set.

At step 1284, MU 100 then divides the members of the first non-empty non-isolated portion of the first spatial point set into l, l≥2, sub-portions denoted by $m_1$ indexed by $i \in \{0, 1, \ldots, l-1\}$, where $m_i \cap m_j = \emptyset$ whenever $i \neq j$. Let $g_i = \cup_{j=i}^{l-1} m_j$, thus $g_0$ contains all the non-isolated points in the first point set, $g_{i+1}$ is a subset of $g_i$ where $l-2 \geq i \geq 0$, until $g_{l-1}$ is a subset of $g_{l-2}$. We use $|m_i|$ to denote that number of points in $m_i$, and $|g_i|$ to denote the number of points in $g_i$. We use $S_i$ to denote a triangulation whose vertices consist of the union of $g_i$ and the second constrained portion of the first spatial point set.

MU 100 divides the sub-portions using sub-portion dividers $p_i$ for $i \in \{1, \ldots, l-2\}$, such that for any specific i, $p_1$ contains the offset of the first point in $m_{i+1}$ relative to the start of the first non-empty non-isolated portion of the first spatial point set. When it's clear from the context, sometimes we use "portion divider" and "sub-portion divider" inter-changeably, and also we sometimes use "portion" and "sub-portion" inter-changeably. The sub-portion dividers can also be used to divide the CCISS or padded CCISS into l sub-portions $c_i$, $i \in \{0, 1, \ldots, l-1\}$ such that for any specific i, sub-portion $c_i$ contains all the segments or padded segments and bases for all the points in $m_i$, and divide the first not-yet-fixed portion of the extended array of fixed correspondents into l sub-portions $f_i$, $i \in \{0, 1, \ldots, l-1\}$ such that sub-portion $f_j$ contains the elements that are used to store the resultant correspondents of the members of $m_j$ computed at later steps.

In some embodiments, especially when the application has knowledge of the maximum base it generates according to how it generates the candidate correspondences, and the amount of device memory that's available for MU 100, MU 100 in addition receives a positive integer t from the application, where t is the number of elements in each $m_i$ except for maybe subset $m_0$ that may contain less than t points.

Alternatively MU 100 computes t by itself according to the memory layouts of the various data structures as well as the amount of device memories that are allocated for the various data structures of MU 100. In 2D, using Euler's relation for planar graph, it is well known that the number of triangles in a triangulation of |V| vertices is bounded above by $|T| \leq 2|V|-4$, and the number of edges is bounded by $|E| \leq 3|V|-6$. Thus the size of some of the data structures in this document, for example an array of (n+1) combinations, an array of pairs of neighbor (n+1) combinations, an array of solving structures, and a spatial point set, can be bounded by a linear function of |V|.

Still in 2D, other data structures include multiple segments or padded segments, for example array at the second level 753 that is shown in FIG. 15a and array at the second level 930 shown in FIG. 18a. The sizes of such data structures depend in addition on the padded length of the padded segments or the sums of the lengths of the segments. One can either compute the padded length as described earlier in this document, or alternatively as a quick fix multiplying together the n+1 or n+2 largest bases of all the points in the first point set and round the result up to satisfy the alignment requirement. One who is skilled in the art will be able to work out the detailed calculations.

In 3D, as I'm aware of, the upper bounds of the number of tetrahedra are quadratic functions of the number of vertices, while the expected numbers are linear. This means if one uses the quadratic upper bounds, significant portions of memories may be wasted. I contemplate that one can instead divide the points in the first non-empty non-isolated portion of a first spatial point set into small mini-batches, where the number of the points in a mini-batch can be taken for example as the number of CPU cores that are used for the triangulation task. Then PGU 105 inserts the mini-batches one mini-batch at a time in parallel for example using the parallel increment insertion algorithm described in "Parallel geometric algorithms for multi-core computers" by Batista. After the insertion of each mini-batch, MU 100 checks the number of tetrahedra and the number of common triangles and use these to compute the memory requirements of the various hypothetical data structures. Once the total memory requirement (considering optional reusage as discussed shortly after) exceeds its quota or alternatively if the memory requirement of each individual data structure exceeds its quota, the lastly inserted mini-batch is removed from the triangulation. This insertion-then-removal approach is applied to the first non-empty non-isolated portion of the first spatial point set to determine a first sub-portion $m_0$, then it's applied again to the remaining points of the first non-empty non-isolated portion of the first spatial point set to determine a second sub-portion $m_1$, and so on until all the points in the non-isolated portion of the first spatial point set are consumed. This approach can be applied to both 2D and 3D.

For the above insertion-then-removal approach to work, the triangulations must be Delaunay. Examples of algorithms that remove a point from a Delaunay triangulation including the ear queue algorithm and the triangulate-and-sew algorithm. Both algorithms work in 2D and 3D, and both algorithms involve first deleting the triangles/tetrahedra that are incident to the point that's being removed to create a cavity. The ear queue algorithm then iteratively cut off Delaunay ears from the cavity using a priority queue. For more details of the ear queue algorithm please refer to "On deletion in Delaunay triangulations" by Devillers. On the other hand, the triangulation-and-sew algorithm then triangulates the cavity, and sew resultant 2D or 3D Delaunay triangulation back after removing unnecessary simplices. Referring to "Vertex Deletion for 3D Delaunay Triangulations" by Buchin et al., it discusses improvements to the triangulation-and-sew algorithm to avoid generating unnecessary simplices and to speed up point location, and it also has an overview of the various approaches for Delaunay vertex deletion. In 2D, referring to "Vertex removal in two-dimensional Delaunay triangulation: Speedup by low degrees optimization" by Devillers, when the degree of a point that is to be removed is small, i.e., <7, the low-degree optimization approach uses hard wired algorithms based on decision trees to speed vertex removal. Other approaches include the flip algorithm in 2D and the boundary completion algorithm in 2D and 3D. In CGAL version 5.1 (I didn't check but I think it's also in some earlier versions) the "Delaunay_triangulation_3" class implements "remove" and "remove-cluster" methods that can be used to remove either a single point or a mini-batch of points. Similarly in CGAL 5.1, the "Delaunay_triangulation_2" class implements method "remove" that can be used to remove a single point in 2D. According to "Vertex Deletion for 3D Delaunay Triangulations" by Buchin et al., "For Delaunay vertex deletions in 2D, Cgal [5] implements low-degree optimization for vertices of degree 7 or less. For higher degrees, it uses fipping. In 3D, the current implementation offers triangulate-and-sew. A previous version used a simplified ear queue algorithm with running time O(dk)."

In 2D or in 3D, the memories allocated for one data structure may be repurposed for another data structure once the first data structure is no longer needed. For example, the memory allocated for a two-level indexing structure for (n+1) combinations can be reused for storing local distance measures collected by MEU 109 once it has been used to construct a two-level indexing structure for pairs of neighbor (n+1) combinations. As another example, the memory allocated for a 2D or 3D triangulation may be reused for storing a part or more of a two-level indexing structure for (n+1) combinations, a part or more of a two-level indexing structure for pairs of neighbor (n+1) combinations, and/or local distance measures collected by MEU 109 once an array of (n+1) combinations and an array of pairs of neighbor (n+1) combinations have been generated from the triangulation.

Referring to FIG. 19, it shows an exemplary frame in 2D with an extended array of fixed correspondents where the number of sub-portions I=3. It includes a first spatial point set 1200, a second spatial point set (not shown), an extended array of fixed correspondents 1230, a padded CCISS that comprises a scalar array 1240, an array of bases 1270, and a padded length 1260.

First spatial point set 1200 is stored either as an SoA or as an AoS. The elements of first spatial point set 1200 are divided into four sub-portions 1212, 1214, 1216, and 1218. Sub-portions 1212, 1214, and 1216 together constitute the first non-empty non-isolated portion 1222 of first spatial point set 1200. Sub-portion 1218 is also the second constrained portion of first spatial point set 1200. Each point in second constrained portion 1218 is associated with a constraint, the point id of whose end point in the second spatial point set is stored at a respective element in second fixed portion 1238 of extended array of fixed correspondents 1230 as we'll discuss soon below.

FIG. 19 also shows sub-portion dividers 1204, 1206, and 1208. Sub-portion dividers 1204, 1206, and 1208 are scalars that store the offsets of the first elements of sub-portions 1214, 1216, and 1218 relative to the start of first spatial point set 1200. Sub-portion divider 1208 is also referred to as portion divider 1208 as it divides first non-empty non-isolated portion 1222 and second constrained portion 1218.

Extended array of fixed correspondents 1230 contains a second fixed portion 1238 that stores the unique correspondents of the members of second constrained portion 1218 in first spatial point set 1200. Second fixed portion 1238 is similar to array of fixed correspondents 130 in FIG. 2 or array of fixed correspondents 291 in FIG. 12. It also contains a first not-yet-fixed portion 1239 comprising sub-portions 1232, 1234, and 1236.

Sub-portions 1232, 1234, 1236 are used to store the resultant correspondents of the members of sub-portions 1212, 1214, and 1216 respectively after process 1280 is finished. For example the correspondent of the point in first non-empty non-isolated portion 1222 at offset i relative to the start of first non-empty non-isolated portion 1222 is stored at the element whose offset is i in first not-yet-fixed portion 1239 relative to the start of first not-yet-fixed portion 1239, and the correspondent of the point whose offset in sub-portion 1212 (resp: 1214, 1216) is j relative to the start of the sub-portion in the first spatial point set is stored at the element whose offset in sub-portion 1232 (resp: 1234, 1236) is j relative to the start of the sub-portion in the extended array of fixed correspondents.

Scalar array 1240 contains a first portion 1242, a second portion 1244, and a third portion 1246. Block 1250 is a detailed view of first portion 1242. Block 1250 concatenates one or more non-overlapping segments and their paddings. In this example, it includes a first segment 1252, a first padding 1254, a second segment 1256, a second padding 1258, a collection of segments and paddings 1262, a last segment 1264, and a last padding 1266. First segment 1252 and first padding 1254 together is referred to as the first padded segment of array 1240, second segment 1256 and second padding 1258 together is referred to as the second padded segment of array 1240 and so on.

Scalar array 1240 is similar to scalar array 820 in FIG. 4. The number of segments in array 1240 is equal to the number of the points in first non-empty non-isolated portion 1222 in the first spatial point set, and the indices (not offsets) of the padded segments are the same as the point ids of their respective members in the first non-empty non-isolated portion 1222 in first spatial point set 1200, i.e., an offset i that is used to access the coordinates of the point whose point id is i in first non-empty non-isolated portion 1222 is used as a padded segment index to access the point's respective padded segment in scalar array 1240, and the segment of the padded segment contains the point ids of the end points in the second spatial point set of point i's separate set of candidate correspondences. An offset j that is used to access the coordinates of the point whose offset in sub-portion 1242 (resp: 1244, 1246) relative to the start of the sub-portion in scalar array 1240 is used as a padded segment index to access the point's respective padded segment in sub-portion 1212 (resp: 1214, 1216) relative to the start of the sub-portion in first non-empty non-isolated portion 1222.

Padded length 1260 is similarly to padded length 850 in FIG. 4, and it is for all the segments in scalar array 1240.

In this example in FIG. 19, $m_2$ refers to sub-portion 1216, $m_1$ refers to sub-portion 1214, and $m_0$ refers to sub-portion 1212. $c_2$ (resp: $c_1$, $c_0$) refers to not only sub-portion 1246 (resp: 1244, 1242) of scalar array 1240, but also the corresponding sub-portion 1276 (resp: 1274, 1272) in array of bases 1270. $f_2$ (resp: $f_1$, $f_0$) refers to sub-portion 1236 (resp: 1234, 1232).

FIG. 19 also shows an array of bases 1270 that is similarly to array of bases 832 in FIG. 4. Array of bases 1270 is divided into three sub-portions 1272, 1274, and 1276. Sub-portion 1272 (resp: 1274 or 1276) stores the bases for the segments in sub-portion 1242 (resp: 1244 or 1246) such that segment index i that is used to access the i-th padded segment relative to the start of the sub-portion in scalar array 1240 is also used as an offset to access the bases of the padded segment in sub-portion 1272 (resp: 1274 or 1276) relative to the start of the sub-portion in array of bases 1270.

At step 1286, it repeats steps 1288 and 1290 using iteration variable j as j takes on values l−1 through 0 in increments of −1. For the example in FIG. 19, j goes from 2 to 1 to 0.

At step 1288, it creates a subframe for the current iteration j, where the subframe comprises a first spatial point set for the current iteration j that starts at the start of $m_j$ and ends at the end of the second constrained portion of the first spatial point set, a portion divider for the current iteration j that contains the offset of either the first element of $m_j+1$ when j<l−1, or the first element of the constrained portion of the first spatial point set when j=l−1, where the portion divider is chosen from sub-portion dividers 1204, 1206, and 1208, an array of fixed correspondents for the current iteration j that starts at either the start of sub-portion $f_j+i$ when j<l−1 or the start of the second fixed portion of the extended array of fixed correspondents when j=l−1 and in both cases end at the end of the extended array of fixed correspondents, the second spatial point set, a CCISS or a padded CCISS for the current iteration j that starts at the start of $c_j$ and ends at the end of $c_j$. Here when we say that an array starts at the start of a sub-portion, it means the first element of the sub-portion has offset 0 and the second element of the sub-portion has offset 1 and so on in the context of the subframe. Then it passes the subframe as an input frame to MU 100 to compute an optimal n-to-1 mapping for $m_j$ using subprocess 250 and 252.

Using the data structures in FIG. 19 as an example, when j=2, the subframe for the current iteration j=2 comprises a first spatial point set for the current iteration j=2 that consists of sub-portion 1216 as its first non-empty non-isolated portion and second constrained portion 1218 as its second constrained portion, a portion divider for the current iteration j=2 consists of portion divider 1208, an array of fixed correspondents for the current iteration j=2 consists of second fixed portion 1238 of extended array of fixed correspondents 1230, a padded CCISS for the current iteration j=2 that consists of sub-portion 1276 of array of bases 1270, sub-portion 1246 of scalar array 1240, and padded length 1260; when j=1, the subframe for the current iteration j=1 comprises a first spatial point set for the current iteration j=1 that consists of sub-portion 1214 as its first non-empty non-isolated portion, and sub-portion 1216 together with second constrained portion 1218 as its second constrained portion, a portion divider for the current iteration j=1 consists of sub-portion divider 1206, an array of fixed correspondents for the current iteration j=1 consists of sub-portion 1236 (updated at iteration j=2 at step 1290) and second fixed portion 1238 of extended array of fixed correspondents 1230, a padded CCISS for the current iteration j=1 that consists of sub-portion 1274 of array of bases 1270, sub-portion 1244 of scalar array 1240, and padded length 1260; and when j=0, the subframe for the current iteration j=0 comprises a first spatial point set for the current iteration j=0 that consists of sub-portion 1212 as its first non-empty non-isolated portion, sub-portions 1214 and 1216 together with second constrained portion 1218 as its second constrained portion, a portion divider for the current iteration j=0 consists of sub-portion divider 1204, an array of fixed correspondents for the current iteration j=0 consists of sub-portions 1234 (updated at iteration j=1 at step 1290) 1236 and second fixed portion 1238 of extended array of fixed correspondents 1230, a padded CCISS for the current iteration j=0 that consists of sub-portion 1272 of array of bases 1270, sub-portion 1242 of scalar array 1240, and padded length 1260.

Instead of allocating and deallocating the various data structures in device memory at each iteration, according to one embodiment it receives a reference to a pre-allocated memory region in the device memory, where the region is reused by all the iterations and thus avoids repetitive allocations and deallocations directly from the device memory. MU 100 and its sub-units instead use sub-regions inside the preallocated memory region to hold the various data structures, where the starting byte offsets of the various data structures relative to the start of the memory region can either be fixed or computed according to the sizes of the data structures and their alignment requirements. In the former case, $|m_j|$s are chosen such that for each j the sizes of the various data structures are bounded by their application and hardware predetermined fixed quotas counting in their alignment requirements and optional reusages. In the latter case, $|m_j|$s are chosen such that for each j the sum of the sizes of the various data structures, counting in the alignment requirements and optional reusages, is smaller than or equal to the total size of the memory region. In some embodiments two preallocated memory regions in the data-parallel coprocessor are used for any two consecutive frames so that data transferring and computation can be carried out in parallel.

One approach to generate a triangulation for each iteration is to independently generate a triangulation using PGU 105. An alternative approach involves using the incremental insertion algorithm to generate finer ones from coarser ones in iterations. For the example corresponding to FIG. 19, at j=2 the vertices of triangulation $S_2$ generated at step 1288 consists of the members of sub-portion 1216 and the second constrained portion 1218. Then at j=1, triangulation $S_1$ generated at step 1288 is generated by inserting all the members of sub-portion 1214 into $S_2$ using the incremental insertion algorithm either sequentially or concurrently using multiple CPU cores for example according to "Parallel geometric algorithms for multi-core computers" by Batista. Then at j=0, triangulation $S_0$ is generated at step 1288 by inserting all the members of sub-portion 1212 into $S_1$ using the incremental insertion algorithm.

The optimal n-to-1 mapping computed for $m_j$ at step 1288 comprises for each member of $m_j$ an index in the member's separate set of candidate correspondences, where the index can be translated into a correspondent of the member using $c_j$. For example, for the member of $m_j$ whose offset relative to the start of $m_j$ is p, its correspondent is retrieved from the padded segment whose index is p relative to the start of $c_j$ at the element whose offset relative to the start of the segment of the padded segment is the member's respective index in the optimal N-to-1 mapping. At step 1290, MU 100 retrieves $m_j$'s members' correspondents from $c_j$ according to the optimal N-to-1 mapping for $m_j$ and store them into the respective elements in sub-portion $f_j$.

Referring to the example in FIG. 19, sub-portion 1236 of the extended array of fixed correspondents is updated to store the translated correspondents of the members of sub-portion 1216 of the first spatial point set after the first iteration where iteration variable j is 2; sub-portion 1234 of the extended array of fixed correspondents is updated to store the translated correspondents of the members of sub-portion 1214 of the first spatial point set after the second iteration where iteration variable j is 1; and sub-portion 1232 of the extended array of fixed correspondents is updated to store the correspondents of the members of sub-portion 1212 of the first spatial point set after the third iteration where iteration variable j is 0, The application may sort the points in the first non-empty non-isolated portion of the first spatial point set in the ascending order of their importances before generating the CCISS or padded CCISS and pass them to MU 100. According to one embodiment where gating areas are used to determine candidate correspondences, points with smaller gating areas/volumes are regarded as more important. In another embodiment where the distances between feature vectors are used to generate candidate correspondences, points with smaller distances to their farthest correspondents in the points' respective separate sets of candidate correspondences are regarded as more important. Some other embodiments comprise the step of sorting the points in the first non-empty non-isolated portion of the first spatial point set in the ascending order of their ranks for example according to the circle-growth method and its variations introduced in "EFFICIENT SETTLEMENT SELECTION FOR INTERACTIVE DISPLAY" by Kreveld, M. V. and R. V. Oostrum. Here given a set of points and their respective importances, each point is associated with a circle whose area is proportional to its importance, which, as described above, can be either the area/volume of the point's gating area or the distance between the point and the point's farthest correspondent. Then all circles grow and earlier dominated circles are assign lower ranks until only one circle remains. The implementations are based on Voronoi diagrams and Weighted Voronoi diagrams. I contemplate the circle-growth method can be extended to 3D using 3D Voronoi diagrams.

In this and other steps, as one skilled in the art knows, one can replace a one dimensional grid with a two or three dimensional grid, as long as the number of hardware threads of the two or three dimensional grid meets the same requirement of the size of the one dimensional grid.

Alternatively instead of distance measures, embodiments may compute weights instead of local distance measures and overall weights instead of overall distance measures. Thus they return N-to-1 mappings with maximum overall weights instead. Referring to my previous U.S. Application Ser. No. 16,428,970 filed on Jun. 1, 2019 and U.S. Application Ser. No. 16,442,911 filed on Jun. 17, 2019, a Weight Computation Unit (WCU) receives local distance measures and computes weights that are inversely related to them. Let $d_1, \ldots, d_M$ be the local distance measures or overall distance measures, and $w_1, \ldots, w_M$ be the corresponding weights or overall weights. There are various approaches to compute weights from local distance measures and overall weights from overall distance measures. In one embodiment, $w_i = \max_{j=1}^{M}(d_j) - d_i$. In another embodiment, $w_i = \max_{j=1}^{M}(d_j)/d_i$. In yet another embodiment, $w_i = 1 - \text{softmax}(d_i)$, where "softmax" refers to the softmax function:

$$(d_i) = \frac{\text{Exp}(d_i)}{\Sigma_j \text{Exp}(d_j)}.$$

Alternatively according to another embodiment, the data structures are allocated and filled in the host memory and multiple CPU threads access the data structures in the host memory. A data grid is decomposed into multiple chunks containing consecutive elements where each CPU thread handles one of the chunks.

One skilled in the art will appreciate that, for this and other processes, the steps may be implemented in different orders. Furthermore, the steps are only provided as examples. thus some steps may be optional, combined into fewer steps, split into multiple steps, or expanded into additional steps. Further, the outlined functional units are provided as examples. That is, functional units may be combined, sub-functional-units may be organized in different ways, or parent functional units may be expanded to include additional functional units without distracting from the essence of the disclosed embodiments. Multiple kernels can be combined or a kernel can be divided into multiple ones by partitioning either the data or the steps. Various steps can be carried out on the general purpose processors or on the data-parallel coprocessor. One skilled in the art also knows that when retrieving data from the device memory at some steps, shared memories can optionally be used as intermediaries. Alternative to launching a grid whose size is at least that of the size of an input array, embodiments may use block partitioning or cyclic partitioning so that a hardware thread may process two or more data elements.

One skilled in the art will also appreciate that a set of offsets may be offseted by another offset to accommodate for example an omitted first element in array 320 shown in FIG. 3 or a certain amount of front padding in for example the offsets of all the elements in a padded segment of an array at the second level. In Matlab and Fortran (by default), array indices start from 1 instead of 0 as in C/C++, when this happens various steps disclosed in this document may need to be adjusted accordingly. Also a set of offsets may be translated into another set of offsets for example by providing an array whose elements are indexed by the first set of offsets and their values are the second set of offsets, or for example by using hash-tables.

Hash Tables for Data-Parallel Coprocessors

Hash tables implemented on data-parallel coprocessors can be used to provide alternative indexing mechanisms whenever an offset is used to retrieve a certain value from an array on a data-parallel coprocessor where offsets can be regarded as specific cases of indices. For example as described previously, hash tables can be used when a two-level indexing structure contains two or more arrays at the second level. Referring to "Building an Efficient Hash Table on the GPU" by Alcantara et al., it uses multiple (for example four in the paper) hash functions that can be used to compute multiple insertion locations for an input key, where the hash functions are used in a round-robin fashion. After receiving a new key and value pair, a hardware thread uses one of the hash functions to compute a first storage location. If a resident key and value pair is not already stored at that location, the new key and value pair is stored at the first storage location and the insertion succeeds. Otherwise the new key and value pair is swapped with the resident key and value pair. It then computes a second storage location using the next hash function and try to store the key and value pair that has just been swapped out into the second storage location and so on. This scheme is referred to as "cuckoo hashing". The swap operation is implemented using atomics, thus multiple new key and value pairs can be inserted concurrently by multiple hardware threads. If after a maximum number of iterations it doesn't succeed, the hash table is rebuilt. On the other hand, when queried with a new input key, it uses the hash functions to compute multiple storage locations, compares the keys stored at the multiple storage locations with the new input key, and either returns a value if a match is found or reports not found.

One issue with the above method is that the hash table needs to be rebuilt every time an insertion fails. Referring to "More Robust Hashing: Cuckoo Hashing with a Stash" by Kirsch et al., it discusses an improvement that uses a small memory called a stash to reduce the frequency of rebuilding hash table. The stash serves as a temporary storage for outstanding key and value pairs. Referring to "Overview of CUDPP hash tables" retrieved from cudpp.github.io/cudpp/2.0/hash_overview.html on Dec. 20, 2019, the CUDPP library implements cuckoo hashing with a stash for CUDA devices, the code can be downloaded from http://cudpp.github.io/ or https://github.com/cudpp/cudpp. The library implements in addition for example a parallel reduction algorithm and a prefix scan algorithm.

I claim:
1. A system for generating and evaluating N-to-1 mappings between spatial point sets in n-D, n=2 or 3, the system comprising:
   a programmable general purpose processor;
   a programmable data-parallel coprocessor coupled with the programmable general purpose processor;
   a memory coupled with the programmable general purpose processor and the programmable data-parallel coprocessor, and the memory embodying information indicative of instructions that cause the programmable general purpose processor or the programmable data-parallel coprocessors or both to perform first operations comprising:
   (a) receiving in the memory a first and a second spatial point sets in n-D, each of the spatial points comprising n coordinates, the first spatial point set comprising a first non-empty non-isolated portion of non-isolated points and a second constrained portion of constrained points;
   (b) receiving in the memory an extended array of fixed correspondents, wherein the extended array of fixed correspondents comprises a first not-yet-fixed portion and a second fixed portion, all the members of the second constrained portion of the first spatial point set have their respective correspondents stored in the second fixed portion of the extended array of fixed correspondents, and the first not-yet-fixed portion of the extended array of fixed correspondents is received in order to store the correspondents of the points in the first non-empty non-isolated portion of the first spatial point set;
   (c) receiving in the memory a plurality of candidate correspondences grouped into a plurality of separate sets according to their end points in the first non-empty non-isolated portion, wherein all the members of each of the separate sets have a common end point in the first non-empty non-isolated portion, and the plurality of candidate correspondences are indexed in their separate set by a plurality of in-separate-sets indices;
   (d) receiving in the memory a plurality of bases for the first non-empty non-isolated portion of the first spatial point set, wherein each point of the first non-empty non-isolated portion has a respective base in the plurality of bases, the base being the size of the point's respective separate set in the plurality of separate sets;
   (e) dividing the first non-empty non-isolated portion into l, l≥2, non-empty and non-overlapping sub-portions denoted by $m_i$, $0 \le i \le l-1$, accordingly dividing the first not-yet-fixed portion of the extended array of fixed correspondents into l non-empty and non-overlapping sub-portions denoted by $f_i$, $0 \le i \le l-1$, accordingly dividing the plurality of separate sets into l non-empty and non-overlapping sub-portions denoted by $c_i$, $0 \le i \le l-1$, and accordingly dividing the array of bases into l non-empty and non-overlapping sub-portions denoted by $b_i$, $0 \le i \le l-1$, wherein $f_i$ is used to store the correspondents of the members of $m_i$, $c_i$ contains the separate sets whose end points in the first spatial point set's point ids are in $m_i$, and $b_i$ contains the bases of the separate sets in $c_i$;
   (f) as j takes on values j=l-1 through 0 in decrements of 1 iteratively performing second operations comprising:
      generating in the memory a plurality of collections of in-separate-sets indices for the current iteration j with a plurality of respective overall distance measures for the current iteration j based on all the sub-portions $m_k$ where $j \le k \le l-1$ and the second constrained portion of the first spatial point set, sub-portion $c_j$ of the plurality of separate sets, the second spatial point set, all the sub-portions $f_k$ where $j+1 \le k \le l-1$ and the second fixed portion of the extended array of fixed correspondents, sub-portion $b_j$ of the array of bases, and a predetermined mapping scheme for the current iteration j, wherein each of the plurality of collections of in-separate-sets indices for the current iteration j comprises one of the plurality of in-separate-sets indices for each member of sub-portion $m_j$ of the first spatial point set, wherein the member of sub-portion $m_j$ of the first spatial point set is the end point in the first spatial point set of the in-separate-sets index's respective candidate correspondence, whereby each of the plurality of collections of in-separate-sets indices for the current iteration j represents an N-to-1 mapping between the members of sub-portion $m_j$ of the first spatial point set and the members of the second spatial point set;
      generating in the memory an optimal collection of in-separate-sets indices for the current iteration j of the plurality of collections of in-separate-sets indices for the current iteration j, wherein the optimal collection of in-separate-sets indices for the current iteration j has the lowest overall distance measure in the plurality of overall distance measures for the current iteration j; and updating sub-portion $f_j$ of the extended array of fixed correspondents according to the optimal collection of in-separate-sets indices for the current iteration j.

2. The system of claim 1, wherein the second operations further comprises generating in the memory a triangulation for the current iteration j whose vertices consist of the members of all the sub-portions $m_k$ where j≤k≤l−1 and the members of the second constrained portion of the first spatial point set, the members of all the sub-portions $m_k$ where j≤k≤l−1 together with the members of the second constrained portion of the first spatial point set are referenced respectively by the members of a first set of point ids for the current iteration j comprising a first portion of point ids for the current iteration j and a second portion of point ids for the current iteration j, the members of sub-portion $m_j$ are referenced respectively by the members of the first portion of point ids for the current iteration j, the members of all the sub-portions $m_k$ where j+1≤k≤l−1 together with members of the second constrained portion are referenced respectively by the members of the second portion of point ids for the current iteration j, and the generating in the memory the plurality of collections of in-separate-sets indices for the current iteration j with the plurality of respective overall distance measures for the current iteration j comprises:

generating in the memory a plurality of (n+1) combinations for the current iteration j having a plurality of respective (n+1) combination indices for the current iteration j that reference the plurality of (n+1) combinations for the current iteration j based on the triangulation for the current iteration j, each of the plurality of (n+1) combinations for the current iteration j comprising n+1 of the first set of point ids for the current iteration j referencing n+1 distinct members in either the sub-portions $m_k$ where j≤k≤l−1 or the second constrained portion of the first spatial point set, wherein the n+1 point ids are ordered according to the predetermined mapping scheme;

generating in the memory one or more pairs of neighbor (n+1) combinations for the current iteration j having one or more respective pair indices for the current iteration j that reference the one or more pairs of neighbor (n+1) combinations for the current iteration j based on the triangulation for the current iteration j, each of the one or more pairs of neighbor (n+1) combinations for the current iteration j comprising two of the plurality of (n+1) combination indices for the current iteration j;

generating in the memory one or more collections of n+2 distinct point ids for the current iteration j of the first set of point ids for the current iteration j for the one or more pairs of neighbor (n+1) combinations for the current iteration j and a plurality of between-digits mappings for the current iteration j based on the predetermined mapping scheme for the current iteration j, the one or more pairs of neighbor (n+1) combinations for the current iteration j, and the plurality of (n+1) combinations for the current iteration j, wherein for each of the one or more pairs of neighbor (n+1) combinations for the current iteration j, the n+2 components of its respective collection in the one or more collections of n+2 distinct point ids for the current iteration j are ordered according to the predetermined mapping scheme, and the n+2 components are mapped to the two n+1 components of the two (n+1) combinations of the pair of neighbor (n+1) combinations in the plurality of (n+1) combinations for the current iteration j according to the pair of neighbor (n+1) combinations' respective between-digits mapping in the plurality of between-digits mappings for the current iteration j; and generating in the memory the plurality of collections of in-separate-sets indices for the current iteration j and the plurality of overall distance measures for the current iteration j based on the first and the second portions of point ids for the current iteration j, all the sub-portions $m_k$ where j≤k≤l−1 and the second constrained portion of the first spatial point set, the second spatial point set, the plurality of (n+1) combinations for the current iteration j, the one or more pairs of neighbor (n+1) combinations for the current iteration j, sub-portion $c_j$ of the plurality of separate sets, all the sub-portions $f_k$ where j+1≤k≤l−1 and the second fixed portion of the extended array of fixed correspondents, the plurality of between-digits mappings for the current iteration j, sub-portion $b_j$ of the plurality of bases, and the one or more collections of n+2 distinct point ids for the current iteration j.

3. The system of claim 2, wherein said generating in the memory the plurality of collections of in-separate-sets indices for the current iteration j and the plurality of overall distance measures for the current iteration j comprises:

(1) generating in the memory a plurality of collections of necessary components of affine transformations for the current iteration j of a plurality of affine transformations for the current iteration j based on the first and second portions of point ids for the current iteration j, the plurality of (n+1) combinations for the current iteration j, sub-portion $c_j$ of the plurality of separate sets, all the sub-portions $f_k$ where j+1≤k≤l−1 and the second fixed portion of the extended array of fixed correspondents, all the sub-portions $m_k$ where j≤k≤l−1 and the second constrained portion of the first spatial point set, the second spatial point set, sub-portion $b_j$ of the plurality of bases, the plurality of collections of necessary components of affine transformations for the current iteration j being selected from the group consisting of the components of the left-submatrices of the plurality of affine transformations for the current iteration j and the non-trivial components of the plurality of affine transformations for the current iteration j;

(2) in a concurrent manner generating in the memory a plurality of local distance measures for the current iteration j based on the first and second portions of point ids for the current iteration j, sub-portion $b_j$ of the plurality of bases, the one or more pairs of neighbor (n+1) combinations for the current iteration j, the plurality of between-digits mappings for the current iteration j, and the plurality of collections of necessary components of affine transformations for the current iteration j using the data-parallel coprocessor;

(3) in a concurrent manner generating in the memory the plurality of collections of in-separate-sets indices for the current iteration j based on sub-portion $b_j$ of the plurality of bases using the data-parallel coprocessor; and (4) in a concurrent manner generating in the memory the plurality of overall distance measures for the current iteration j based on the first and second portions of point ids for the current iteration j, the plurality of collections of in-separate-sets indices for the current iteration j, the plurality of local distance measures for the current iteration j, the one or more collections of n+2 distinct point ids for the current iteration j, and the one or more pairs of neighbor (n+1) combinations for the current iteration j using the data-parallel coprocessor.

4. The system of claim 3, wherein item (1) comprises for each of the plurality of (n+1) combinations for the current iteration j performing the following necessary-components-generating operations: retrieving n+1 bases, wherein for the members of the n+1 combination that are also members of the first portion of point ids for the current iteration j, their respective bases are retrieved from sub-portion $b_j$ of the plurality of bases, and otherwise the respective bases are set to 1; generating one or more (n+1) local indices using the n+1 bases, wherein each of the one or more (n+1) local indices comprises n+1 of the plurality of in-separate-sets indices whose n+1 respective candidate correspondences' n+1 end points in the first spatial point set's point ids are the members of the (n+1) combination; and generating in the memory one or more of the collections of necessary components of affine transformations for the current iteration j indexed by the combinations of the (n+1) combination index of the (n+1) combination on one hand and each of the one or more (n+1) local indices on the other hand based on the first and second portions of point ids for the current iteration j, sub-portion $c_j$ of the plurality of separate sets, sub-portion $b_j$ of the plurality of bases, the one or more (n+1) local indices, all the sub-portions $f_k$ where $j+1 \leq k \leq l-1$ and the second fixed portion of the extended array of fixed correspondents, all the sub-portions $m_k$ where $j \leq k \leq l-1$ and the second constrained portion of the first spatial point set, and the second spatial point set.

5. The system of claim 3, wherein item (2) comprises for each of the one or more pairs of neighbor (n+1) combinations for the current iteration j performing the following local-distance-measures-generating operations by one or more SIMD cores of the data-parallel coprocessor:

retrieving n+2 bases, wherein for the members of the n+2 distinct point ids of the pair of neighbor (n+1) combinations that are also members of the first portion of point ids for the current iteration j, their respective bases are retrieved from sub-portion $b_j$ of the plurality of bases, and otherwise the respective bases are set to 1;

generating one or more (n+2) local indices using the n+2 bases, wherein each of the one or more (n+2) local indices comprises n+2 of the plurality of in-separate-sets indices whose n+2 respective candidate correspondences' n+2 end points in the first spatial point set's point ids are the pair of neighbor (n+1) combinations' n+2 distinct members;

grouping each of the one or more (n+2) local indices into two (n+1) local indices of the two (n+1) combinations of the pair of neighbor (n+1) combinations according to the pair of neighbor (n+1) combinations' respective between-digits mapping in the plurality of between-digits mappings for the current iteration j;

for each of the one or more (n+2) local indices retrieving two of the plurality of collections of necessary components of affine transformations for the current iteration j based on the two (n+1) combination indices of the pair of neighbor (n+1) combinations, sub-portion $b_j$ of the plurality of bases, and the two (n+1) local indices grouped from the (n+2) local index; and for each of the one or more (n+2) local indices computing in the memory one of the plurality of local distance measures for the current iteration j indexed by the combination of the pair index of the pair of neighbor (n+1) combinations on one hand and the (n+2) local index on the other hand based on the two collections of necessary components of affine transformations and sub-portion $b_j$ of the plurality of bases.

6. The system of claim 5, wherein the plurality of collections of necessary components of affine transformations for the current iteration j comprises the collections of the components of the left-submatrices of the plurality of affine transformations for the current iteration j, and the computing in the memory one of the plurality of local distance measures for the current iteration j based on the two collections of necessary components of affine transformations comprises computing the Frobenius norm of the differences of the respective components of the two left-submatrices stored in the two collections of necessary components of affine transformations.

7. The system of claim 6, wherein item (1) comprises for each of the plurality of (n+1) combinations for the current iteration j performing the following necessary-components-generating operations: retrieving n+1 bases, wherein for the members of the n+1 combination that are also members of the first portion of point ids for the current iteration j, their respective bases are retrieved from sub-portion $b_j$ of the plurality of bases, and otherwise the respective bases are set to 1; generating one or more (n+1) local indices using the n+1 bases, wherein each of the one or more (n+1) local indices comprises n+1 of the plurality of in-separate-sets indices whose n+1 respective candidate correspondences' n+1 end points in the first spatial point set's point ids are the members of the (n+1) combination; and generating in the memory one or more of the collections of necessary components of affine transformations for the current iteration j indexed by the combinations of the (n+1) combination index of the (n+1) combination on one hand and each of the one or more (n+1) local indices on the other hand based on the first and second portions of point ids for the current iteration j, sub-portion $c_j$ of the plurality of separate sets, sub-portion $b_j$ of the plurality of bases, the one or more (n+1) local indices, all the sub-portions $f_k$ where $j+1 \leq k \leq l-1$ and the second fixed portion of the extended array of fixed correspondents, all the sub-portions $m_k$ where $j \leq k \leq l-1$ and the second constrained portion of the first spatial point set, and the second spatial point set.

8. The system of claim 5, wherein item (4) comprises for each of the plurality of collections of in-separate-sets indices for the current iteration j performing the following overall-distance-measures-generating operations by one or more SIMD cores of the data-parallel coprocessor to generate an overall distance measure of the plurality of overall distance measures for the current iteration j:

determining a determined (n+2) local index for each of the one or more pairs of neighbor (n+1) combinations for the current iteration j using the pair of neighbor (n+1) combinations' respective collection of n+2 distinct point ids in the one or more collections of n+2 distinct point ids for the current iteration j, wherein for each component of the respective collection of n+2 distinct point ids, if the component is a member of the first portion of point ids for the current iteration j, its respective component in the (n+2) local index is retrieved from the collection of in-separate-sets indices using the component of the pair of neighbor (n+1) combinations' respective collection of n+2 distinct point ids, and otherwise its respective component in the (n+2) local index is set to 0;

retrieving one or more local distance measures from the plurality of local distance measures for the current iteration j based on the pair indices of the one or more pairs of neighbor (n+1) combinations for the current iteration j, sub-portion $b_j$ of the plurality of bases, and the determined (n+2) local indices; and summarizing the one or more local distance measures to compute the overall distance measure.

9. The system of claim 3, wherein item (4) comprises for each of the plurality of collections of in-separate-sets indices for the current iteration j performing the following overall-distance-measures-generating operations by one or more SIMD cores of the data-parallel coprocessor to generate an overall distance measure of the plurality of overall distance measures for the current iteration j:

determining a determined (n+2) local index for each of the one or more pairs of neighbor (n+1) combinations for the current iteration j using the pair of neighbor (n+1) combinations' respective collection of n+2 distinct point ids in the one or more collections of n+2 distinct point ids for the current iteration j, wherein for each component of the respective collection of n+2 distinct point ids, if the component is a member of the first portion of point ids for the current iteration j, its respective component in the (n+2) local index is retrieved from the collection of in-separate-sets indices using the component of the pair of neighbor (n+1) combinations' respective collection of n+2 distinct point ids, and otherwise its respective component in the (n+2) local index is set to 0;

retrieving one or more local distance measures from the plurality of local distance measures for the current iteration j based on the pair indices of the one or more pairs of neighbor (n+1) combinations for the current iteration j, sub-portion $b_j$ of the plurality of bases, and the determined (n+2) local indices; and summarizing the one or more local distance measures to compute the overall distance measure.

10. The system of claim 1, wherein each of the members of the first non-empty non-isolated portion has an importance measure, and the members of the first non-empty non-isolated portion are sorted by their ranks using the circle-growth method according to their importance measures.

11. A method for generating and evaluating N-to-1 mappings between spatial point sets in n-D, n=2 or 3, the method comprising:

providing a computing device comprising a programmable general purpose processor and a programmable data-parallel coprocessor coupled with the programmable general purpose processor;

receiving, by the computing device, a first and a second spatial point sets in n-D, each of the spatial points comprising n coordinates, the first spatial point set comprising a first non-empty non-isolated portion of non-isolated points and a second constrained portion of constrained points;

receiving, by the computing device, an extended array of fixed correspondents, wherein the extended array of fixed correspondents comprises a first not-yet-fixed portion and a second fixed portion, all the members of the second constrained portion of the first spatial point set have their respective correspondents stored in the second fixed portion of the extended array of fixed correspondents, and the first not-yet-fixed portion of the extended array of fixed correspondents is received in order to store the correspondents of the points in the first non-empty non-isolated portion of the first spatial point set;

receiving, by the computing device, a plurality of candidate correspondences grouped into a plurality of separate sets according to their end points in the first non-empty non-isolated portion, wherein all the members of each of the separate sets have a common end point in the first non-empty non-isolated portion, and the plurality of candidate correspondences are indexed in their separate sets by a plurality of in-separate-sets indices;

receiving, by the computing device, a plurality of bases for the first non-empty non-isolated portion, wherein each point of the first non-empty non-isolated portion has a respective base in the plurality of bases, the base being the size of the point's respective separate set in the plurality of separate sets;

dividing, by the computing device, the first non-empty non-isolated portion into l, l≥2, non-empty and non-overlapping sub-portions denoted by $m_i$, 0≤i≤l−1, accordingly dividing the first not-yet-fixed portion of the extended array of fixed correspondents into l non-empty and non-overlapping sub-portions denoted by $f_i$, 0≤i≤l−1, accordingly dividing the plurality of separate sets into l non-empty and non-overlapping sub-portions denoted by $c_i$, 0≤i≤l−1, and accordingly dividing the array of bases into l non-empty and non-overlapping sub-portions denoted by $b_i$, 0≤i≤l−1, wherein $f_i$ is used to store the correspondents of the members of $m_i$, $c_i$ contains the separate sets whose end points in the first spatial point set's point ids are in $m_i$, and $b_i$ contains the bases of the separate sets in $c_i$;

as j takes on values j=l−1 through 0 in decrements of 1, iteratively performing by the computing device second operations comprising:

generating, by the computing device, a plurality of collections of in-separate-sets indices for the current iteration j with a plurality of respective overall distance measures for the current iteration j based on all the sub-portions $m_k$ where j≤k≤l−1 and the second constrained portion of the first spatial point set, sub-portion $c_j$ of the plurality of separate sets, the second spatial point set, all the sub-portions $f_k$ where j+1≤k≤l−1 and the second fixed portion of the extended array of fixed correspondents, sub-portion $b_j$ of the array of bases, and a predetermined mapping scheme for the current iteration j, wherein each of the plurality of collections of in-separate-sets indices for the current iteration j comprises one of the plurality of in-separate-sets indices for each member of sub-portion $m_j$ of the first spatial point set, where the member of sub-portion $m_j$ of the first spatial point set is the end point in the first spatial point set of the in-separate-sets index's respective candidate correspondence, whereby each of the plurality of collections of in-separate-sets indices for the current iteration j represents an N-to-1 mapping between the members of sub-portion $m_j$ of the first spatial point set and the members of the second spatial point set;

generating, by the computing device, an optimal collection of in-separate-sets indices for the current iteration j of the plurality of collections of in-separate-sets indices for the current iteration j, wherein the optimal collection of in-separate-sets indices for the current iteration j has the lowest overall distance measure in the plurality of overall distance measures for the current iteration j; and updating, by the computing device, sub-portion $f_j$ of the extended array of fixed correspondents according to the optimal collection of in-separate-sets indices for the current iteration j.

12. The method of claim 11, wherein the second operations further comprises generating a triangulation for the current iteration j whose vertices consist of the members of all the sub-portions $m_k$ where $j \leq k \leq l-1$ and the members of the second constrained portion of the first spatial point by the computing device, the members of all the sub-portions $m_k$ where $j \leq k \leq l-1$ together with the members of the second constrained portion of the first spatial point set are referenced respectively by the members of a first set of point ids for the current iteration j comprising a first portion of point ids for the current iteration j and a second portion of point ids for the current iteration j, the members of sub-portion $m_j$ are referenced respectively by the members of the first portion of point ids for the current iteration j, the members of all the sub-portions $m_k$ where $j+1 \leq k \leq l-1$ together with the members of the second constrained portion are referenced respectively by the members of the second portion of point ids for the current iteration j, and the generating the plurality of collections of in-separate-sets indices for the current iteration j with the plurality of respective overall distance measures for the current iteration j comprises using the computing device for:

generating a plurality of (n+1) combinations for the current iteration j having a plurality of respective (n+1) combination indices for the current iteration j that reference the plurality of (n+1) combinations for the current iteration j based on the triangulation for the current iteration j, each of the plurality of (n+1) combinations for the current iteration j comprising n+1 of the first set of point ids for the current iteration j referencing n+1 distinct members in either sub-portions $m_k$ where $j \leq k \leq l-1$ or the second constrained portion of the first spatial point set, wherein the n+1 point ids are ordered according to the predetermined mapping scheme;

generating one or more pairs of neighbor (n+1) combinations for the current iteration j having one or more respective pair indices for the current iteration j that reference the one or more pairs of neighbor (n+1) combinations for the current iteration j based on the triangulation for the current iteration j, each of the one or more pairs of neighbor (n+1) combinations for the current iteration j comprising two of the plurality of (n+1) combination indices for the current iteration j;

generating one or more collections of n+2 distinct point ids for the current iteration j of the first set of point ids for the current iteration j for the one or more pairs of neighbor (n+1) combinations for the current iteration j and a plurality of between-digits mappings for the current iteration j based on the predetermined mapping scheme for the current iteration j, the one or more pairs of neighbor (n+1) combinations for the current iteration j, and the plurality of (n+1) combinations for the current iteration j, wherein for each of the one or more pairs of neighbor (n+1) combinations for the current iteration j, the n+2 components of its respective collection in the one or more collections of n+2 distinct point ids for the current iteration j are ordered according to the predetermined mapping scheme, and the n+2 components are mapped to the two n+1 components of the two (n+1) combinations of the pair of neighbor (n+1) combinations in the plurality of (n+1) combinations for the current iteration j according to the pair of neighbor (n+1) combinations' respective between-digits mapping in the plurality of between-digits mappings for the current iteration j; and generating the plurality of collections of in-separate-sets indices for the current iteration j and the plurality of overall distance measures for the current iteration j based on the first and the second portions of point ids for the current iteration j, all the sub-portions $m_k$ where $j \leq k \leq l-1$ and the second constrained portion of the first spatial point set, the second spatial point set, the plurality of (n+1) combinations for the current iteration j, the one or more pairs of neighbor (n+1) combinations for the current iteration j, sub-portion $c_j$ of the plurality of separate sets, all the sub-portions $f_k$ where $j+1 \leq k \leq l-1$ and the second fixed portion of the extended array of fixed correspondents, the plurality of between-digits mappings for the current iteration j, sub-portion $b_j$ of the plurality of bases, and the one or more collections of n+2 distinct point ids for the current iteration j.

13. The method of claim 12, wherein said generating the plurality of collections of in-separate-sets indices for the current iteration j and the plurality of overall distance measures for the current iteration j comprises:

(1) generating, using the computing device, a plurality of collections of necessary components of affine transformations for the current iteration j of a plurality of affine transformations for the current iteration j based on the first and second portions of point ids for the current iteration j, the plurality of (n+1) combinations for the current iteration j, sub-portion $c_j$ of the plurality of separate sets, all the sub-portions $f_k$ where $j+1 \leq k \leq l-1$ and the second fixed portion of the extended array of fixed correspondents, all the sub-portions $m_k$ where $j \leq k \leq l-1$ and the second constrained portion of the first spatial point set, the second spatial point set, sub-portion $b_j$ of the plurality of bases, the plurality of collections of necessary components of affine transformations for the current iteration j being selected from the group consisting of the components of the left-submatrices of the plurality of affine transformations for the current iteration j and the non-trivial components of the plurality of affine transformations for the current iteration j;

(2) generating, in a concurrent manner using the data-parallel coprocessor, a plurality of local distance measures for the current iteration j based on the first and second portions of point ids for the current iteration j, sub-portion $b_j$ of the plurality of bases, the one or more pairs of neighbor (n+1) combinations for the current iteration j, the plurality of between-digits mappings for the current iteration j, and the plurality of collections of necessary components of affine transformations for the current iteration j;

(3) generating, in a concurrent manner using the data-parallel coprocessor, the plurality of collections of in-separate-sets indices for the current iteration j based on sub-portion $b_j$ of the plurality of bases; and (4) generating, in a concurrent manner using the data-parallel coprocessor, the plurality of overall distance measures for the current iteration j based on the first and second portions of point ids for the current iteration j, the plurality of collections of in-separate-sets indices for the current iteration j, the plurality of local distance measures for the current iteration j, the one or more collections of n+2 distinct point ids for the current iteration j, and the one or more pairs of neighbor (n+1) combinations for the current iteration j.

14. The method of claim 13, wherein item (1) comprises for each of the plurality of (n+1) combinations for the current iteration j performing the following necessary-components-generating operations: retrieving using the computing device n+1 bases, wherein for the members of the n+1 combination that are also members of the first portion of point ids for the current iteration j, their respective bases are retrieved from sub-portion $b_j$ of the plurality of bases, and otherwise the respective bases are set to 1; generating using the computing device one or more (n+1) local indices using the n+1 bases, wherein each of the one or more (n+1) local indices comprises n+1 of the plurality of in-separate-sets indices whose n+1 respective candidate correspondences' n+1 end points in the first spatial point set's point ids are the members of the (n+1) combination; and generating using the computing device one or more of the collections of necessary components of affine transformations for the current iteration j for the combinations of the (n+1) combination index of the (n+1) combination on one hand and each of the one or more (n+1) local indices on the other hand based on the first and second portions of point ids for the current iteration j, sub-portion $c_j$ of the plurality of separate sets, the one or more (n+1) local indices, all the sub-portions $f_k$ where $j+1 \leq k \leq l-1$ and the second fixed portion of the extended array of fixed correspondents, all the sub-portions $m_k$ where $j \leq k \leq l-1$ and the second constrained portion of the first spatial point set, and the second spatial point set.

15. The method of claim 13, wherein item (2) comprises in a concurrent manner for each of the one or more pairs of neighbor (n+1) combinations for the current iteration j performing the following local-distance-measures-generating operations by one or more SIMD cores of the data-parallel coprocessor:
retrieving n+2 bases, wherein for the members of the n+2 distinct point ids of the pair of neighbor (n+1) combinations that are also members of the first portion of point ids for the current iteration j, their respective bases are retrieved from sub-portion $b_j$ of the plurality of bases, and otherwise the respective bases are set to 1;
generating one or more (n+2) local indices using the n+2 bases, wherein each of the one or more (n+2) local indices comprises n+2 of the plurality of in-separate-sets indices whose n+2 respective candidate correspondences' n+2 end points in the first spatial point set's point ids are the pair of neighbor (n+1) combinations' n+2 distinct members;
grouping each of the one or more (n+2) local indices into two (n+1) local indices of the two (n+1) combinations of the pair of neighbor (n+1) combinations according to the pair of neighbor (n+1) combinations' respective between-digits mapping in the plurality of between-digits mappings for the current iteration j;
for each of the one or more (n+2) local indices computing one of the plurality of local distance measures for the current iteration j for the combination of the pair index of the pair of neighbor (n+1) combinations on one hand and the (n+2) local index on the other hand based on the two collections of necessary components of affine transformations generated for the two combinations of each of the two (n+1) combination indices of the pair of neighbor (n+1) combinations on one hand and their respective (n+1) local indices in the two (n+1) local indices grouped from the (n+2) local index on the other hand.

16. The method of claim 15, wherein the plurality of collections of necessary components of affine transformations for the current iteration j comprises the collections of the components of the left-submatrices of the plurality of affine transformations for the current iteration j, and the computing one of the plurality of local distance measures for the current iteration j based on the two collections of necessary components of affine transformations comprises computing the Frobenius norm of the differences of the respective components of the two left-submatrices stored in the two collections of necessary components of affine transformations.

17. The method of claim 16, wherein item (1) comprises for each of the plurality of (n+1) combinations for the current iteration j performing the following necessary-components-generating operations: retrieving using the computing device n+1 bases, wherein for the members of the n+1 combination that are also members of the first portion of point ids for the current iteration j, their respective bases are retrieved from sub-portion $b_j$ of the plurality of bases, and otherwise the respective bases are set to 1; generating using the computing device one or more (n+1) local indices using the n+1 bases, wherein each of the one or more (n+1) local indices comprises n+1 of the plurality of in-separate-sets indices whose n+1 respective candidate correspondences' n+1 end points in the first spatial point set's point ids are the members of the (n+1) combination; and generating using the computing device one or more of the collections of necessary components of affine transformations for the current iteration j for the combinations of the (n+1) combination index of the (n+1) combination on one hand and each of the one or more (n+1) local indices on the other hand based on the first and second portions of point ids for the current iteration j, sub-portion $c_j$ of the plurality of separate sets, the one or more (n+1) local indices, all the sub-portions $f_k$ where $j+1 \leq k \leq l-1$ and the second fixed portion of the extended array of fixed correspondents, all the sub-portions $m_k$ where $j \leq k \leq l-1$ and the second constrained portion of the first spatial point set, and the second spatial point set.

18. The method of claim 15, wherein item (4) comprises for each of the plurality of collections of in-separate-sets indices for the current iteration j performing the following overall-distance-measures-generating operations by one or more SIMD cores of the data-parallel coprocessor to generate an overall distance measure of the plurality of overall distance measures for the current iteration j:
determining a determined (n+2) local index for each of the one or more pairs of neighbor (n+1) combinations for the current iteration j using the pair of neighbor (n+1) combinations' respective collection of n+2 distinct point ids in the one or more collections of n+2 distinct point ids for the current iteration j, wherein for each component of the respective collection of n+2 distinct point ids, if the component is a member of the first portion of point ids for the current iteration j, its respective component in the (n+2) local index is retrieved from the collection of in-separate-sets indices using the component of the pair of neighbor (n+1) combinations' respective collection of n+2 distinct point ids, and otherwise its respective component in the (n+2) local index is set to 0; and
summarizing the one or more local distance measures generated for the combinations of each of the pair indices of the one or more pairs of neighbor (n+1) combinations for the current iteration j on one hand and their respective determined (n+2) local indices on the other hand to compute the overall distance measure.

19. The method of claim 13, wherein item (4) comprises for each of the plurality of collections of in-separate-sets indices for the current iteration j performing the following overall-distance-measures-generating operations by one or more SIMD cores of the data-parallel coprocessor to generate an overall distance measure of the plurality of overall distance measures for the current iteration j:

determining a determined (n+2) local index for each of the one or more pairs of neighbor (n+1) combinations for the current iteration j using the pair of neighbor (n+1) combinations' respective collection of n+2 distinct point ids in the one or more collections of n+2 distinct point ids for the current iteration j, wherein for each component of the respective collection of n+2 distinct point ids, if the component is a member of the first portion of point ids for the current iteration j, its respective component in the (n+2) local index is retrieved from the collection of in-separate-sets indices using the component of the pair of neighbor (n+1) combinations' respective collection of n+2 distinct point ids, and otherwise its respective component in the (n+2) local index is set to 0; and summarizing the one or more local distance measures generated for the combinations of each of the pair indices of the one or more pairs of neighbor (n+1) combinations for the current iteration j on one hand and their respective determined (n+2) local indices on the other hand to compute the overall distance measure.

20. The method of claim 11, wherein each of the members of the first non-empty non-isolated portion has an importance measure, and the members of the first non-empty non-isolated portion are sorted by their ranks using the circle-growth method according to their importance measures.

\* \* \* \* \*